(12) United States Patent
Chandler

(10) Patent No.: US 6,181,976 B1
(45) Date of Patent: Jan. 30, 2001

(54) ADEPT DATA PROCESSOR IMPLEMENTING FUNCTION SIMILATION WITH INVERSE DEVIATION VARIATION WEIGHTING

(76) Inventor: Larry Stephen Chandler, 1738 Anderson Rd., Falls Church, VA (US) 22043

(*) Notice: Under 35 U.S.C. 154(b), the term of this patent shall be extended for 0 days.

(21) Appl. No.: 09/056,637

(22) Filed: Apr. 8, 1998

Related U.S. Application Data

(60) Provisional application No. 60/044,717, filed on Apr. 18, 1997.

(51) Int. Cl.[7] .................................................. G05B 13/02
(52) U.S. Cl. ............................ 700/52; 700/42; 700/43; 700/67; 702/27; 702/85
(58) Field of Search ................................ 700/43, 49, 50, 700/51, 52, 53, 67, 91, 181, 246, 28, 29, 31, 48, 293, 32, 33; 702/27, 85

(56) References Cited

U.S. PATENT DOCUMENTS

| | | | |
|---|---|---|---|
| 5,568,400 | * 10/1996 | Stark et al. | 702/85 |
| 5,619,432 | * 4/1997 | Candler | 702/189 |
| 5,652,713 | * 7/1997 | Chandler | 702/190 |

OTHER PUBLICATIONS

Bo et al., "An Inverse–Deviation Threshold Approach In Neural Network Controllers" IEEE., pp. 407–409, 1997.*
Tzes et al., "adaptive Fuzzy Control For Flexible–Link Manipulators: a Hybrid Frequency–Time Domain Scheme" IEEE., pp. 122–127, 1993.*
Kyriakides et al., "Adaptive Fuzzy Dominant–Pole Placement Control" IEEE., pp. 2517–2522, 1992.*
El–Masry et al., "Analog VLSI Current Mode Implementation of Artificial Neural Networks" IEEE., pp. 1275–1278, 1993.*
Nagy, "Neural Network—Then And Now" IEEE., pp. 316–318, 1991.*
Scharf, "Statistical Signal Processing", Addison–Wesley, New York, pp. 495–496 (1991).
Press et al., "Numerical Recipes", Cambridge University Press, N.Y., pp. 504–515 (1986).
Hull, "Encyclopedia of Science & Technhology", McGraw–Hill, vol. 9, pp. 648–649 (1987).
York, *Can. J. Phys.*, vol. 44, pp. 1079–1086 (1966).
Reed, *Am. J. Phys.*, vol. 57, No. 7, pp. 642–646 (1989).
Clutton–Brock, *Technometrics*, vol. 9, No. 2, pp. 261–269 (1967).
Neri et al., *J. Phys. E: Sci. Instrum.*, vol. 22, pp. 215–217 (1989).
Ross, *Am. J. Phys.*, vol. 48, p. 409 (1980).

* cited by examiner

*Primary Examiner*—William Grant
*Assistant Examiner*—McDieun Marc
(74) *Attorney, Agent, or Firm*—Evenson, McKeown, Edwards & Lenahan, P.L.L.C.

(57) ABSTRACT

A coefficient generator, data processing system and method of data reduction in correspondence with multiple-term parametric relationships, and particularly provides for data reduction in correspondence with approximative descriptions which include multiple dependent-variable terms whose higher order derivatives do not vanish. Forms of inverse of deviation variations are implemented to provide weighting which will correct for nonlinear function variations. The forms of inverse deviation weighting are implemented for representing forms of residual weighting and forms of implied squared residual weighting. Represented phases of function simulation establish adept equations and implement forms of data processing and representing. Adept data processors correspondingly provide for characterizing approximating relationships in correspondence with provided data.

37 Claims, 20 Drawing Sheets

Microfiche Appendix Included
(3 Microfiche, 168 Pages)

ADEPT DATA PROCESSOR IMPLEMENTING FUNCTION SIMILATION WITH INVERSE DEVIATION VARIATION WEIGHTING

CROSS-REFERENCE TO RELATED APPLICATION

This application claims priority from co-pending U.S. provisional patent application No. 60/044,717 filed Apr. 18, 1997.

MICROFICHE APPENDIX

This application includes computer program listing appendices A through W submitted in the form of a microfiche appendix consisting of 3 microfiche including a total of 168 frames.

STATEMENT OF DISCLOSURE COPYRIGHT

Copyright materials contained herein may be reproduced for purposes of present invention patent disclosure. Unauthorized reproduction for other purposes is prohibited. Unpublished work ©1998 L. Chandler

BACKGROUND OF THE INVENTION

1. Field of the Invention

The present invention relates to automated forms of data processing, more particularly to data reduction in correspondence with multiple-term parametric relationships.

2. Brief Description of Related Art

Heretofore, efforts to fit nonlinear parametric relationships to experimental data have relied heavily upon approximations that incorporate least-squares data reduction techniques in formulating independent equations by minimizing sums of parametrically represented squared residuals or squared deviations with respect to included fitting parameters. Equations, which are thus formulated, will not consistently compensate for significant errors in variables which are included in more than a single term of a parametrically represented approximating relationship. Even considering forms of "Discriminate Reduction Data Processing" (ref. L. Chandler, U.S. Pat. Nos. 5,652,713 & 5,619,432), and least-squares techniques which provide for the evaluating of over-determined systems of equations, as may be represented by minimum norm solutions of "Total Least Squares" analysis (ref. L. Scharf, *Statistical Signal Processing*, Addison-Wesley, New York, pp 495–496, 1991), or by originally conceived forms of "Conformal Analysis" (ref. L. Chandler, ibid.), the prior art of establishing independent equations for parameter evaluating seems to offer no generally valid techniques for providing inherently appropriate analytically represented data function similitude as statistically represented by multiple nonlinear, generally non-orthogonal terms of approximating relationships. The terminology "least-squares techniques" herein refers to those techniques which are incorporated in processes which involve establishing form for entire sets of independent equations by minimizing representations of sums of squared residuals or represented squared deviations which may or may not be individually weighted.

The art of generating weight factors, or weighting coefficients, for providing weighted sums to be considered or utilized for data reduction applications, has been limited (by applied arithmetic functions which represent absolute values and squares of values) to the generating of positive values and constant proportions thereof to provide relative or proportionate weighting.

The heretofore art of generating weight factors, or weighting coefficients for application of least-squares techniques has been limited to the generating of positive values to provide relative or proportionate weighting of squared residuals or represented squared deviations. Corresponding forms of weighting coefficients (as provided for weighting of squared residuals or represented squared deviations) have been limited to a few known forms which are characterized by representations which include the following:

1. positive weight factors representing the squares of uncertainties in dependent variable measurements (ref. W. Press, B. Flannery, S. Teukolsky, W. Vetterling, *Numerical Recipes*, Cambridge University Press, N.Y., pp. 504–515, 1986);
2. positive weight factors representing the weights of measurements of a dependent variable (ref. M. Hull, *Encyclopedia of Science & Technology*, McGraw-Hill, Vol. 9, pp. 648–649, 1987);
3. positive factors which establish weighting of squared deviations, including representing squares of perpendicular distances between represented data points and approximating lines as proposed in 1878 by Adcock, referred to by York (ref. D. York, Can. J. Phys., Vol. 44, pp 1079–1086, 1966);
4. positive weight factors representing the product of components of variable weighting divided by the sum of said components of variable weighting (ref. D. York, ibid.), and generally considered to represent the inverse of a effective variance (ref. B. Reed, Am. J. Phys., Vol. 57, No. 7, pp 642–646, 1989);
5. positive weight factors representing the inverse of estimated variances or squared deviations as proposed in 1967 by Clutton-Brock (ref. M. Clutton-Brock, Technometrics, Vol. 9, No. 2, pp. 261–269, 1967);
6. positive weight factors which include estimated uncertainty in providing representations for sums of one dimensional squared deviations representing distances between experimental data points and approximating lines (ref. F. Neri, G. Saitta, and S. Chiofalo, J. Phys. E: Sci. Instrum., Vol. 22, pp. 215–217, 1989);
7. certain characterized forms of coordinate related coefficients and constant proportions thereof for weighting of squared residuals in correspondence with represented datum coordinates, including positive weight factors comprising precision weight factor coordinate normalizing proportions and positive weight factors comprising transformation weight factor coordinate normalizing proportions (ref. L. Chandler, ibid.).

Six formidable features of the least-squares approach to data reduction are:

1. Nonlinear applications of least-squares techniques are often based upon a false assumption that a minimum value for the sum of squared residuals or represented squared deviations will correspond to an appropriate data representation.
2. Least-squares techniques do not comprise means to represent the direct weighting of residuals nor to include direct residual-component weighting in the form of either represented variable-related proportions or represented term-related proportions.
3. Least-squares techniques do not provide means for including representation for the residua of represented sums of parametrically expressed and biased residuals in the formulating of independent equations.
4. Least-squares techniques do not provide for the inclusion of residual weighting coefficients which are comprised of component normalizing proportions which correspondingly weight individual components of represented multi-dimensional residuals.

5. Implementing of least-squares techniques with included weighting of squared residuals or represented squared deviations inherently requires and includes identical said weighting in the formulating of each and every independent equation in a represented set of independent equations.

6. Least-squares techniques do not provide for an optional selecting or a generating of more than a single form of weighting coefficient to be included in the formulating of a single set of independent equations.

Discriminate reduction data processing as introduced by earlier patent applications of present inventor (ref. L. Chandler, ibid.) provides an advanced form of data processing which is valid for a wide variety of two parameter applications and for multiple-parameter applications which can be represented without error in the included independent variables. Implied squared residual weighting is therein represented by including transformation weight factor coordinate normalizing proportions which are generated by a final stage discriminate rectifier which provides positive numerical correspondence to derivatives by means of absolute value rectification. Discriminate reduction data processing as implemented for multiple-parameter applications provides for the evaluating of approximating parameters which are generated by means of searching for minimum values for a represented sum of weighted squared deviations. This method of evaluating forces representation of evaluated approximating parameters to correspond to encountered minimum values for said represented sum without explicit regard to a true convergent solution to the represented equations. Discriminate reduction data processing thus provides inaccurate solutions for certain applications in which the provided weight factors are generated functions of the represented fitting parameters.

Also, least-squares techniques as established by prior art do not provide for the inclusion of multi-term variable related coefficients or providing forms of inverse deviation variation weighting which will establish indistinguishableness between fitting parameters that relate multiple variables which hypothetically have equivalent measured values, and fitting parameters that relate multiple representations of single variables whose measured values are considered to be correspondingly equivalent to hypothetical said equivalent measured values as would be included by a corresponding fitting function form.

SUMMARY OF THE INVENTION

Function simulation as herein disclosed provides adept equations to be used in conjunction with or as replacement for certain equations which might be determined by alternate reduction techniques. Assuming a relationship between a variation and represented variables to be governed by natural laws, and also assuming that said relationship may be expressed in correspondence with an inherent similitude, the spellings, simulation and similator, are herein coined to imply correspondence to said inherent similitude, or more specifically, the representing of approximating equations which are generated as herein disclosed to approximately replicate inherent correspondence to said natural laws or in general, to establish at least seemingly appropriate approximating relationships which relate characterized variation to variables in correspondence with provided data.

In accordance with the present invention, an adept equation is an equation that is represented to include at least three sums comprising evaluated addends multiplied by corresponding weighting coefficients, said weighting coefficients being represented and included to implement inverse deviation variation weighting, said equation being included in a system comprising representation of at least three independent equations, said system being configured to represent evaluations of at least three fitting parameters in compliance with said at least three independent equations, said addends being evaluated in correspondence with a value which is represented as including error, said value representing numerical correspondence to at least one independent variable, said at least three independent equations not representing viable form for evaluating approximating parameters which substantially minimize represented sums of weighted squared residuals as represented to include weighting of transformation weight factor coordinate normalizing proportions.

Any equation so rendered, even as represented by designating or functional components of a processing system for the formulating of a solution of represented said at least three independent equations by a single matrix equation, or alternate viable reduction techniques, is considered to be an adept equation in accordance with the present invention.

It should be noted in accordance with the present invention that minimizing operations which do not include minimizing with respect to all fitting parameters as included in the weighting coefficients of a represented sum of weighted error-affected addends do not constitute means to generate values for said fitting parameters which substantially minimize said represented sum.

In view of the foregoing, it is an object of the present invention to provide automated or semi-automated function similation which will formulate candidate and likely equations, and if necessary include representation of estimated residua, in order to establish a set or sets of independent equations as represented by functional components of a data processing system; and to provide corresponding means to activate said functional components of said data processing system thereby representing data for applications which characterize or implement analytic form in correspondence with a represented variation as considered to be a function of at least one variable.

It is an object of this invention to provide accurate forms of data processing which may be implemented for analysis of either analog or digitally represented data of either represented bivariate or multivariate forms.

It is an object of this invention to provide means for representing maximum likelihood.

It is an object of this invention to provide means for generating and summing correspondingly weighted residual term functions as may be included in the formulating of represented independent equations.

It is another object of this invention to provide means for generating or representing residua of correspondingly weighted residual sums as may be included in the formulating of represented independent equations.

It is another object of this invention to provide for the generating of weighting coefficients, including coordinated related coefficients, multi-term variable related coefficients, cross term minimizing (CTM) coefficients, and corresponding weighting coefficients which might include representation of effective variance, as may be implemented in providing forms of inverse deviation variation weighting.

It is a further object of this invention to provide means for representing independent equation term functions as sums of represented correspondingly weighted residual term functions and to implement resolution of sets of independent equations which may include representation of said sums of correspondingly weighted residual term functions.

It is another object of this invention to provide means for representing independent equation term functions as sums of products of represented residual term functions similarly multiplied by weighting coefficients to implement resolution of sets of independent equations which represent implied squared residual weighting.

It is another object of this invention to provide for acquisition of real time data which may include evaluating of independent equation term functions as represented by integral sums which may be provided by analog circuitry.

In phase one of a process of function similation as implemented for providing residual weighting, pertinent representation of estimated residua may be provided as estimates of the sum of evaluated correspondingly weighted residuals or in a substantially equivalent form which includes estimating the sum of evaluated residual term functions multiplied by corresponding fitting parameters.

During phase two, estimates of independent equation term functions are generated in correspondence with provided data. Each of the two mentioned phases of function similation, and corresponding phases of data function similation as may be represented, may include operations for generating evaluated independent equation term functions which are represented sums of evaluated correspondingly weighted residual term functions. For certain embodiments of the present invention, and including some embodiments which provide real time data acquisition, representation of evaluated independent equation term functions may be generated one time for both of these two phases of operation. In accordance with the present invention, phase one and phase two of function similation may be combined to include a single evaluating of term functions. It is another object of this invention to provide for acquisition of real time data which may include a single evaluating of term functions which are represented by integral sums as may be provided by analog circuitry.

It is a further object of this invention to provide such data processing which accounts for errors that are associated with represented data, even when a provided analytical description includes the representing of multiple error-affected independent-variable terms.

In accordance with the present invention for each provided form of a represented fitting function there exists a significant number of independent and valid parametric equations, which accurately relate fitting parameters by expressions and alternate forms of expressions which include sums and sums of products of represented residual term functions and coefficients. Validity is assumed to be established for represented function related weighting when both the sum of correspondingly weighted residuals and the sum of the absolute value of correspondingly weighted residuals significantly vanish when evaluated utilizing nearly error-free data. If both the sum of correspondingly weighted residuals and the sum of absolute value of correspondingly weighted residuals can be assumed to vanish in correspondence with error-free data, then it can also be assumed that correspondingly weighted error-affected residuals can be represented as bivariate or multivariate Taylor series expansions without including representation of correspondingly weighted function related deviations which can be assumed to accordingly vanish for an appropriate analytic representation of the provided data with correspondingly appropriate weighting of residual components as expressed in terms of error-affected variables which include errors that are characterized by non-skewed uncertainty distributions.

Improved data representations may be achieved for data which requires multiple-term analytical representation by replacing certain equations or entire sets of equations, which establish analysis procedures as heretofore determined by least-squares or alternate sum minimizing techniques, with equations being chosen for application by criteria which includes the following:

1. They are established as representative of simulated error-free data of a form similar to the data that is to be analyzed.
2. They are closely representative of simulated error-affected data of a form similar to the data that is to be analyzed.
3. The selection will provide a sufficient number of independent equations to determine solution sets of fitting parameters which are assumed to be descriptive of represented data.

A further object of this invention is to provide characteristic form iterations to provisionally account for error related higher order nonlinear affects, and to provide forms of conformal analysis with option for including zeta parameter iterations to train channeled convergence.

Another object of the present invention is to provide accurate data reductions by characterizing form for said data and representative uncertainty with simulations which can provide simulated data for characteristic form iterations, or which can be used to establish the validity of a set of independent equations as related to estimated, simulated, or parametrically represented residua.

In accordance with the present invention correspondingly weighted representation of simulated or estimated residua (which may include numeric or parametric representation of simulated or estimated residua) may be included as represented terms of independent equations to compensate for errors in provided datum variables. The increased number of terms as included in a correspondingly increased number of independent equations, will provide for the optional relative evaluating of all term coefficients, including a relative coefficient for the dependent variable or dependent term function. The evaluating of relative values for all coefficients and subsequent normalizing of coefficients on a single coefficient (which is generally the coefficient of a dependent variable) will allow at least proportionate variability in estimated residua as represented by characterized errors. It is an object of this invention to provide means to include pertinent representation of estimated residua in the formulating of certain represented independent equations.

Multiple simulations of error-affected data may be required to establish a preferred set of independent equations. A preferred set of independent equations as represented to include numerical estimates of residua will provide relative or no change (or approximately relative or minimal change) in simulated residua in correspondence with substantial change in simulated error. It is an object of this invention to provide simulated forms of error-free data and simulated forms of error-affected data as may be useful to establish form for independent equations.

It is a further object of the present invention to provide means for accessing representation of both typical data and simulated data (including simulated error-free data and simulated error-affected data which can be used for either or both equation validation and/or residuum estimation), and to provide alternate forms of data processing as may be implemented in establishing form for data representations, including representations of simulated error-free and simulated error-affected data, or alternate representations of variation.

In accordance with the preferred embodiment of the present invention provisional simulation generators and automated or interactive data simulation systems are included to provide functions and simulated data which can approximately replicate numerical correspondence (or approximately establish proportionate numerical correspondence) to residua which would be formulated by representing actual data in correspondence with the sum of approximating equation residuals as represented to include appropriately represented fitting parameters. Also, in accordance with the present invention, representative data as established by experimenting may be provided for access by said simulation generators or automated or interactive data simulation systems to further provide means to evaluate residuals, verify equations, estimate residua, or generate data representations.

Still another object of the present invention is to provide means for generating weighting coefficients in represented forms (which may include analog or digital forms) that may be selected and included in the formulating of specified independent equations. In accordance with the present invention a select coefficient generator may comprise means for generating coefficients which may be implemented to provide weighting in the formulating of adept and select equations which may be considered or implemented in formulating approximating relationships, or parametrically representing relationships which characterize representative approximative equations.

A further object of the present invention is to provide means for implementing a variety of analog and digital forms of weighting. In accordance with the present invention a select coefficient generator may comprise means for generating and implementing analog weighting coefficients that are distinguished as providing forms of residual weighting or implied forms squared residual weighting as implemented to provide corresponding weighting in the formulating and representing of equations, which are represented as adept equations as included in a set of independent equations.

Another object of the present invention is to provide means for representing a variety of alternately formulated weighting coefficients in represented forms (which may include analog or digital forms) that may be individually selected and included in representing independent equations. In accordance with the present invention an adept alternate coefficient generator may comprise means for representing weighting coefficients by alternate, means which might include sign discrimination or even power rectification, or by means which might include directly generating negative representation of a value without first generating corresponding positive representation of said value. Said adept alternate coefficient generator may also include means for designating alternate formulating of adept equations for implementing forms of weighting, such as residual weighting or implied squared residual weighting, as may be represented in a set of independent equations for evaluating represented fitting parameters.

Still another object of this invention is to provide means for producing data representations which establish values, implement means of control, or characterize generated parameters and product output in forms including memory, registers, media, machine with memory, or graphical representations.

Produced data representations including data representations as generated and implemented in substance, in accordance with the present invention, may serve purposes such as to preserve, display, utilize, act upon, transport, act in correspondence with, contain, and/or store approximating data representations which may include but are not limited to data representations of any combination of the following: weighting coefficients, estimated residua, estimated term functions, evaluated or proportionately represented fitting parameters, represented equation selections, represented equation selection criteria, representations of variation which corresponds to provided information, and forms of designated operation control for representing functions and resolving related equations.

The foregoing objects and other objects, advantages and features of this invention will be more fully understood by reference to the following detailed description of the invention when considered in conjunction with the accompanying drawings and the included appendices.

BRIEF DESCRIPTION OF THE DRAWINGS

In order that the present invention may be clearly understood, it will now be described, by way of example, with reference to the accompanying drawings, wherein like numbers indicate the same or similar components as configured for a corresponding application and wherein.

DETAILED DESCRIPTION OF THE INVENTION

Reduction Techniques and Related Terminology

Figure 1:
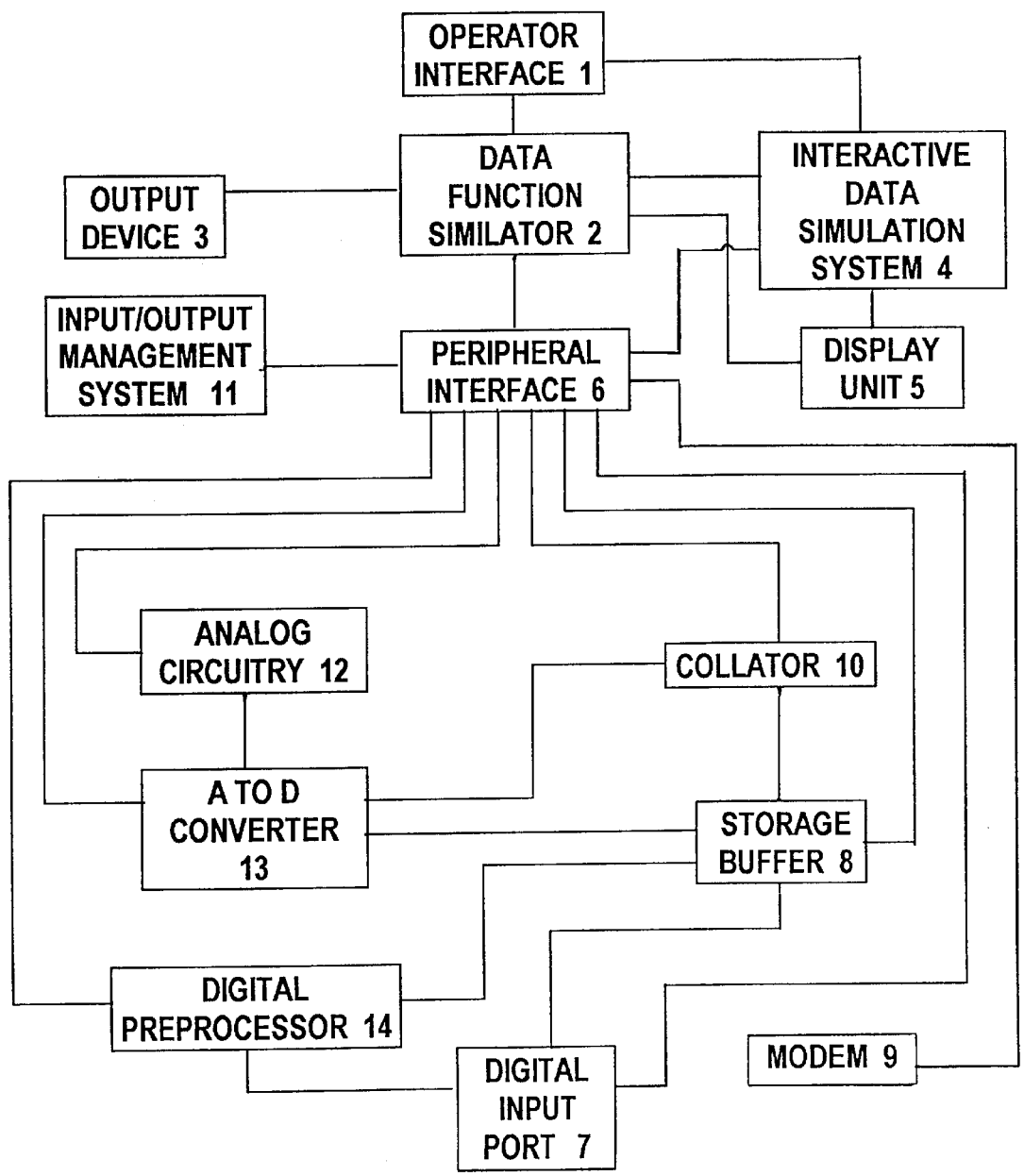
FIG. 1 is a block diagram of a typical data function similation system in accordance with the present invention.

Automated or semi-automated processes whereby at least one adept equation is established, verified, and included in the implementing of at least one set of independent equations in providing form or forms of controlled data reduction to evaluate at least one plurality of parameters which are included in the representing of at least one approximating relationship as characterized by represented variables, are herein referred to by the inventor as function similation.

Automated or semi-automated processes which implement resolution of at least one set of independent equations in order to represent relative or direct correspondence for at least one fitting parameter as included in characterizing represented approximating form for at least one adept equation are referred to herein as adept data processing. Data processing systems which implement forms of adept data processing are referred to in accordance with the present invention as adept data processors.

In accordance with this invention, a base equation may be established by equating an expression which parametrically represents the sum of approximating equation residuals (which may be individually weighted by including residual weighting coefficients) to a corresponding estimated (or simulated or parametrically represented) sum, which sum is referred to herein as an estimated base equation residuum. In accordance with the present invention, an estimated base equation residuum is estimated (or simulated) numerical or parametric correspondence (which may be relative correspondence) for a sum of base residuals, which are correspondingly weighted said approximating equation residuals as evaluated in correspondence with provided, representative, or simulated data. The same terminology, estimated residuum, or the plural form, estimated residua, may also refer to estimated subordinate equation residua, which are considered herein to provide approximate relative correspondence to parametrically expressed sums of subordinate residuals as included in represented subordinate equations.

Preferred forms of residual weighting coefficients, as included to provide residual weighting in the formulating of base equations, are intended to provide forms of normalization for which the sum of weighted approximating equation residuals can be assumed to statistically represent a correspondingly weighted sum of Taylor series terms which comprise even ordered partial derivatives of a represented function deviation multiplied by even powers of the error in the corresponding error-affected variables; said Taylor series terms being terms of bivariate or multivariate Taylor series approximations of said function deviation as if evaluated in correspondence with true values of said variables and unknown said error, as subject to the assumption that an ensemble of likely error, which might be related to each represented datum variable, would be correspondingly represented by a non-skewed probability distribution. Preferred forms of residual weighting coefficients as herein disclosed include preferred forms of coordinate related coefficients, preferred forms of multi-term variable related coefficients, and preferred forms of multi-term uncertainty-weighting coefficients.

In accordance with the present invention a fitting function is a parametric relationship corresponding to analytic form which relates a considered dependent variable to at least one independent variable. The relationship between dependent and independent variables may also be expressed in terms of alternately formulated parametric equations, or in the represented form of an approximative equation which is formulated specifically to relate all included terms and non-zero constants of a parametric fitting function or an alternately represented parametric equation to zero. In accordance with the present invention, a characterized fitting function or characterized parametric equation is a fitting function or parametric equation which is characterized by determined or estimated unique values for represented fitting parameters.

In accordance with the present invention, an approximative equation is a parametric equation which is expressed to equate represented sums or differences of dependent and independent variable related functions and included constants to zero. A characterized approximative equation as expressed to represent estimates or determined values for fitting parameters is referred to herein as An approximating equation.

In accordance with the present invention, a function deviation may be analytically represented by algebraically transferring all included terms and non-zero constants of an analytically characterized fitting function or characterized parametric equation to a single side of a resultant approximating equation. And, in accordance with the present invention, an analytically represented function deviation corresponding to a characterized parametric equation (or characterized fitting function as might be represented) is defined as said single side of said resultant approximating equation as characterized by including estimated or provided values for the represented fitting parameters, and as expressed to represent all included terms and non-zero constants of said characterized parametric equation.

In accordance with the present invention a functions and derivatives need not necessarily be analytically represented. approximative relationships may be of a form that cannot be readily expressed in analytic form, hence related functions and derivatives may be represented by alternate means, such as tables of corresponding numbers or represented operators. Represented function deviations, and other represented functional relationships may be established and implemented in correspondence with any provided form for representing related correspondence.

A function deviation as hypothetically considered to be evaluated using error-free data (that is, data without error) would represent function related deviations, which are deviations of the corresponding approximating equation from a true data representation at points corresponding to said error-free data. A function deviation as evaluated in correspondence with an error-affected datum is herein referred to as an approximating equation residual, said error-affected datum being a considered data point as represented by measures of a plurality of variables, said measures including error-affected measurement of at least one of said variables. An approximating equation residual represents both the function related deviation of the approximating equation (as including values for fitting parameters) and the deviation which is caused by errors in the represented datum variables.

Fitting parameters are parameters which may be approximately or accurately represented by relative or direct numerical or alternate correspondence (as estimated, evaluated, or provided) to characterize approximating relationships in correspondence with represented information and reduction restraints. Evaluated fitting parameters, estimated fitting parameters, and fitting parameters that are determined by, or are assumed to be determined in correspondence with, or in order to satisfy, imposed reduction restraints, are referred to herein as approximating parameters. Approximating parameters may be alternately expressed by any form of determinate representation (e.g. Known values for approximating parameters may be expressed by represented correspondence, or relative measure which may be directly interpreted or evaluated; unknown values for approximating parameters may be represented by estimates or successive approximations, or determinate sets of independent equations). In accordance with the present invention, approximating parameters are considered to be determined parameters, and will be held constant during minimizing and maximizing operations (e.g. such as might be related to maximum likelihood estimation).

Fitting parameters that have not yet been subjected to reduction restraints, are herein referred to as approximative parameters. Approximative parameters may be considered as variable during minimizing or maximizing operations.

In accordance with the present invention, function deviations, fitting functions, residuals (including base residuals, subordinate residuals and approximating equation residuals), and residual sums are parametrically represented (or expressed in parametric form) by representing approximative parameters in place of approximating parameters (i.e. by representing fitting parameters which are not yet subjected to reduction restraints in place of included constants or determined parameters).

In accordance with this invention, for equations which are formulated so as to include weighting of residuals, the terminology "correspondingly weighted residuals" refers to corresponding residuals multiplied by corresponding weighting coefficients. For equations which are formulated without including weighted residuals, the same terminology, "correspondingly weighted residuals", refers to corresponding residuals without included weighting. Similarly, the terminology "correspondingly weighted sum" herein applies to sums comprising either weighted or non-weighted addends which are either weighted in correspondence with at least one set of proportionate weighting coefficients, or are not weighted at all.

Automated or semi-automated processes which generate representation for estimated residua as corresponding to the sum of base or subordinate residuals (as formulated with or without included weighting) are herein referred to as equation residuum estimation or select equation residuum estimation as applied to select equations. Alternate forms of equation residuum estimation include simulated residual sum evaluation, Taylor series residuum expansion evaluation, and parametrically expressed residuum formulation. The process of simulated residual sum evaluation includes the effectuating of steps whereby represented addends or correspondingly weighted residuals (or whereby included terms or term functions of represented addends or correspondingly weighted residual) are evaluated in correspondence with (or in relative correspondence with) representative or simulated data and summed in order to provide estimation (or proportionate estimation) for select equation residua in correspondence with represented fitting parameters. The terminology "select equation residuum" and the plural form "select equation residua" is herein applied to refer to estimated base equation residua, or estimated subordinate equation residua, as may be represented in the formulating of select equations.

Taylor series residuum expansion evaluation involves evaluating representation of corresponding proportion to the sum of correspondingly weighted non-vanishing or assumed more predominate term contributions of bivariate or multivariate expansions (which generally may be represented as Taylor series expansions) of a represented function deviation as evaluated in correspondence with simulated or represented data and simulated error in order to establish numerical correspondence or proportionate numerical correspondence for an estimated select or summed residual equation residuum. Alternate forms for representing residua may certainly be established by including constant factors, or by dividing represented predominate or included terms of Taylor series expansions by divisors such as represented fitting parameters or estimated sums of represented even powers of related error. Simulated error may be represented by a single value or a multiplicity of values which are representative or proportionately representative of estimated error, simulated error, represented uncertainty, or characterized error distributions. In accordance with the present invention, uncertainty may be represented by root mean squared values, mean absolute values, or other alternately representative error value estimates including estimates for mean value of represented error raised to an exponential power.

Parametrically expressed residuum formulation involves establishing parametric representation of residua in the formulating of independent equations as represented by functional components of a data processing system.

A term function is the variable portion of a single term as represented without included parametric or numeric coefficient. A single term may include a single function, or a plurality of functions multiplied by a single coefficient or the resolute. A single term is separated, or isolated and thereby distinguished, from other terms on a single side of an expression or equation by represented addition or subtraction, as may be included or implied by or in said expression or said equation. An isolated term function is a term function which can be represented by or included in an isolated (or single) term (multiplied by a same coefficient or resolute) of an expression or equation. Term functions as considered herein include:

1. term functions (of represented equations, fitting functions, and function deviations) which are represented as variables or as variable functions;

2. term functions of represented residuals which are represented with or without included weighting and evaluated in correspondence with provided or simulated data;

3. term functions of represented select equations, represented base equations, represented subordinated equations, formulated independent equations, or any other term functions which are represented as sums of evaluated residual term functions or alternately formulated addends which are represented with or without included weighting and are evaluated in correspondence with provided or simulated data, including any evaluated term functions which may be rendered for representing correspondence to non-vanishing residua.

For applications in which represented fitting parameters are included in approximating equations as coefficients of term functions, a plurality of evaluated and correspondingly weighted base residual term functions (as represented and formulated with or without residual weighting, and evaluated in correspondence with provided data) may be summed to provide correspondingly evaluated term functions as coefficients of included fitting parameters in formulating representation for base equations.

It should be noted that alternate representations of base residuals may be formulated in correspondence with alternate forms of a parametric equation or represented fitting function. Also, variable coefficients may be combined with approximative equations to establish alternate approximative equations of a same general form. Considered and evaluated term-related coefficients, which are functions of specified term included variables, or any other evaluated coefficients or evaluated functions of any combination of variables, may be multiplied times a parametric representation represented base equation. Consider the following example: Assume a represented fitting function or parametric equation to be of a form which can be expressed by Equation 1, $$P_2 Y = -P_1 - \sum_{i=3}^{I} P_i F_i, \tag{1}$$

wherein the variable parameter Y represents a dependent variable, or a dependent variable function. The slanted parameters, P, represent undetermined fitting parameters, and the $F_i$ represent independent-variable-included term functions. (In accordance with this invention, independent-variable-included term functions are term functions which are either functions of independent variables or functions of both dependent and independent variables.) Assume a corresponding approximating equation comprising I non-zero terms as represented by Equation 2, $$P_1 + P_2 Y + \sum_{i=3}^{I} P_i F_i = 0, \tag{2}$$

wherein the erected parameters, $P_i$, represent determined fitting parameters. The subscripts, 1, 2, and i, distinguish corresponding fitting parameters which are either multiplied times unity or multiplied times correspondingly included term functions of the represented approximative equation. A corresponding plurality of alternately represented approximating equations is expressed by Equations 3, $$\sum_{i=1}^{I} P_i Q_{ij} = 0, \tag{3}$$

wherein the $Q_{ij}$ either represent included term functions of variable terms or they represent unity in correspondence with included constant terms. The subscripts, j, of approximating equation residuals to establish approximating equation residuals of alternately represented forms. Also, in accordance with the present invention, alternate forms for approximating equation residuals corresponding to a single represented fitting function or parametric equation may be readily established by algebraically applying functional operations to said represented fitting function or parametric equation and by establishing corresponding representations for alternate approximating equations and related approximating equation residuals in terms of alternately represented forms of said fitting function or parametric equation.

In accordance with the present invention represented alternate forms of base residuals include:

1. initially or alternately formulated approximating equation residuals without included weighting, including approximating equation residuals which are formulated by multiplying approximating equation residuals by evaluated variable or function coefficients, and 2. residuals which are formulated by multiplying initially formulated or alternately formulated approximating equation residuals by corresponding residual weighting coefficients, said corresponding residual weighting coefficients being generated in correspondence with represented said alternately formulated approximating equation residuals and correspondingly alternate formulations of represented function deviations.

In accordance with the present invention a plurality of independent, alternately formulated, base equations, each corresponding to a single represented fitting function or parametric equation, may comprise or be included in a set of independent equations. An advantage of including a plurality of independent base equations in a single set of independent equations is that preferred forms of residual weighting coefficients may be correspondingly represented and optionally included in the formulating of each correspondingly distinguish each represented equation.

For this example, each distinguished alternately represented approximating equation is represented as being comprised of I assumed non-zero terms, where the capitalized parameter, I, also corresponds to the number of non-zero terms included in the initially established approximating equation as expressed by Equation 2. (It might be noted that representing equations which include the same number of terms is convenient for this example, but is not necessarily characteristic of all applications of the present invention.) The included terms of each equation are correspondingly represented as designated by the lower case subscript, i, which for this example, varies between 1 and I for each represented equation. Represented functions which establish parametric form for the related analytically represented function deviations, $v_j$, as pertaining to this particular example and corresponding applications, are expressed by Equations 4, $$v_j = \sum_{i=1}^{I} P_i Q_{ij}. \quad (4)$$

Equations 4 represent function deviations corresponding to both initially established approximating equations as expressed by Equation 2, and alternately represented approximating equations as expressed by Equations 3. Equations 4 represent both constant and variable terms as included by the subscripted products $P_i Q_{ij}$. The $A_1$ and $A_2 Y$, as included in Equations 1 and 2, may for example be represented when j=1 by allowing $Q_{11}$ to represent unity, and $Q_{21}$ to represent the dependent variable or dependent variable function. Correspondingly weighted residuals, $r_{jk}$, as represented for this example, are expressed by Equations 5, $$r_{jk} = \sum_{i=1}^{I} W_{jk} P_i Q_{ijk}, \quad (5)$$

wherein the included subscript, k, designates the datum that is represented in evaluating the corresponding residual. The represented residuals as expressed by Equations 5 are defined to include optional weighting. The $W_{jk}$ represent optional weighting coefficients which may be either omitted or included to establish corresponding form for residuals. Assuming representation of residuals as expressed by Equations 5, corresponding over-determined sets of independent equations may be represented by the Matrix Equation 6, $$\begin{bmatrix} \sum_{k=1}^{K} W_{1k} Q_{11k} & \sum_{k=1}^{K} W_{1k} Q_{21k} & \cdots & \sum_{k=1}^{K} W_{1k} Q_{I1k} \\ \sum_{k=1}^{K} W_{2k} Q_{12k} & \sum_{k=1}^{K} W_{2k} Q_{22k} & \cdots & \sum_{k=1}^{K} W_{2k} Q_{I2k} \\ \cdots & \cdots & \cdots & \cdots \\ \sum_{k=1}^{K} W_{jk} Q_{1jk} & \sum_{k=1}^{K} W_{jk} Q_{2jk} & \cdots & \sum_{k=1}^{K} W_{jk} Q_{Ijk} \\ \cdots & \cdots & \cdots & \cdots \end{bmatrix} \begin{Bmatrix} P_1 \\ P_2 \\ \cdots \\ P_I \end{Bmatrix} = \begin{Bmatrix} R_1 \\ R_2 \\ \cdots \\ R_j \\ \cdots \end{Bmatrix}, \quad (6)$$

wherein the capitalized parameter, K, corresponds to the number of represented data points. Determinate matrix equations, which represent appropriate numbers of independent equations, may be correspondingly established by representing determinate sets of independent equations.

Selecting of a preferred determinate set of independent equations may be a simple matter of choice, or a matter of selecting more easily formulated equations. For more sophisticated applications selecting may necessarily involve comparative manipulations and representing alternately formulated approximating equation residuals which for some applications may include variations in the number of represented terms. Assuming a selected determinate set of I independent equations as expressed by equations 7, $$\sum_{i=1}^{I} P_i \sum_{k=1}^{K} W_{jk} Q_{ijk} = R_j, \quad (7)$$

the relative values for the represented fitting parameters, $P_i$, are proportionately expressed in form of a determinant by equations 8.

$$P_i \propto \begin{vmatrix} \sum_{k=1}^{K} W_{1k} Q_{11k} & \cdots & \sum_{k=1}^{K} W_{1k} Q_{i-1,1k} & R_1 & \sum_{k=1}^{K} W_{1k} Q_{i+1,1k} & \cdots & \sum_{k=1}^{K} W_{1k} Q_{I1k} \\ \sum_{k=1}^{K} W_{2k} Q_{12k} & \cdots & \sum_{k=1}^{K} W_{2k} Q_{i-1,2k} & R_2 & \sum_{k=1}^{K} W_{2k} Q_{i+1,2k} & \cdots & \sum_{k=1}^{K} W_{2k} Q_{I2k} \\ \cdots & \cdots & \cdots & \cdots & \cdots & \cdots & \cdots \\ \sum_{k=1}^{K} W_{Ik} Q_{1Ik} & \cdots & \sum_{k=1}^{K} W_{Ik} Q_{i-1,Ik} & R_I & \sum_{k=1}^{K} W_{Ik} Q_{i+1,Ik} & \cdots & \sum_{k=1}^{K} W_{Ik} Q_{IIk} \end{vmatrix}, \quad (8)$$

It should be noted that in equations 8 the designated number of fitting parameters, I. Corresponds to the number of independent equations, thus providing solution for a determinate set of equations. This type example provides for relative resolution of all term coefficients including the coefficient of a dependent term function or variable. Normalization can be provided with respect to any one of the coefficients, $P_i$, without involving or requiring solution to a traditional coefficient matrix. The subscripted $W_{jk}$, as represented in the Matrix Equation 6, and in equations 7 through 11, may either be omitted or included to represent optional residual or alternate weighting coefficients as may be provided. The subscripted $R_j$ represent values for estimated residua as may also be included.

If the represented weighting coefficients are separately formulated for each residual in correspondence with the respective approximative equation and corresponding function deviation to weight each included approximating equation residual term function in correspondence with the indicated subscripts, j and k, as represented for example by the Matrix Equation 6 or by the exemplary independent Equations 7, or by represented actual or relative solutions as implied by Equations 8, then the correspondingly represented equations are hereby considered to be base equations.

Represented values of estimated residua may be correspondingly established by Equations 9, $$R_j = C \sum_{i=1}^{I} E_i \sum_{l=1}^{L} W_{jl} Q_{ijl}, \qquad (9)$$

wherein the $E_i$ are assumed to represent numerical correspondence, characteristic estimates, initial estimates, progressive estimates, or successive approximations of considered values or considered proportionate representation of values for fitting parameters that are included to evaluate corresponding proportionate Estimates of residua in correspondence with L represented or simulated data points. The subscripts I designate the corresponding data points, where L represents the number of provided data points that are correspondingly included in the simulated representation. The arbitrary constant, C, is included in the expression to imply need for only a proportionate representation of residua to establish relative values for fitting parameters. A represented constant, C, as characterized, may either be included in or omitted from corresponding representations.

Correspondingly proportionate values for estimated residua may also be determined as estimated sums of pertinent correspondingly weighted uncertainty-biased expansion or series terms, $S_{ijlm}$, as represented by Equations 10, $$R_j = C \sum_{i=1}^{I} E_i \sum_{l=1}^{L} W_{jl} \sum_{m=1}^{M_{ij}} S_{ijlm}, \qquad (10)$$

The $E_i$ still represent estimates for fitting parameters, however the $Q_{ijl}$ has been replaced by a sum of series term functions. The subscripted $M_{ij}$ correspond to the number of included and evaluated expansion or series term functions that combine with said estimates for fitting parameters and with (or without) optionally included weighting, $W_{jl}$, to provide correspondingly weighted addends which approximately represent non-vanishing contributions of the correspondingly represented residual sums as expressed by Equations 9, wherein the represented residual term functions are designated by the i subscripts. The represented approximating equation is designated by the j subscripts; and the expansion or series term function is designated by the m subscript. Represented estimates of residua as provided by Equations 9 and 10 may be directly included in the Matrix Equation 6 or in linear equations such as Equations 7, as are thereby represented.

Correspondingly proportionate Estimates of residua may be similarly expressed to include parametric representation by Equations 11, $$R_j = C \sum_{i=1}^{I} A_i \sum_{l=1}^{L} W_{jk} \sum_{m=1}^{M_{ij}} S_{ijkm}, \qquad (11)$$

The k subscript designates a respective datum of the K represented data points. The $S_{ijkm}$ represent evaluated expansion or series term functions, or factors of the same, that combine with the parametrically represented fitting parameters, $A_i$, and with (or without) optionally included weighting, $W_{jk}$, to provide correspondingly weighted, parametrically expressed, addends which represent non-vanishing contributions of the correspondingly represented residual sums. In accordance with the present invention, an estimated expansion or series term function, which might be represented as a sum of products comprising represented errors which are raised to a power and multiplied by evaluated functions, may also be represented by an approximation which can be expressed as proportional to a sum of said evaluated functions, or as a ratio or mean value (which may include representation for said errors as raised to said power) multiplied by a sum of said evaluated functions.

The $A_i$ are included fitting parameters which may equivalently or proportionately correspond to certain fitting parameters of the represented approximating equation. For example, if the arbitrary constant, C, is set equal to the inverse of one of the parameters, $A_i$, then one or more systems of independent linear equations may be established which will determine relative values for all enlargethispage3.5ex included fitting parameters as related to assumed spurious values for the I-1 non-unity constant products, $CE_i$, for which $C \neq 1/A_i$. Optional inclusion of weighting coefficients along with accurate estimates for correspondingly weighted sums of pertinent (or biased) expansion or series term functions as included to represent values or mean values for pertinent even powers of represented errors or characteristic uncertainties should generally provide for the evaluating of correspondingly appropriate values for the represented fitting parameters.

In accordance with the present invention, three preferred analytic forms for representing residual weighting coefficients in correspondence with provided data are proportionately represented by Equations 12 through 14. These include:

1. preferred forms of coordinate related coefficients as expressed by Equations 12, $$W_{jk} \propto \left| \prod_{n=1}^{N} \frac{\partial v_j}{\partial X_n} \right|_k^{(-\frac{1}{N})}, \qquad (12)$$

wherein the N represents the number of independent variables (corresponding to the N pertinent degrees of freedom) that are included in the represented fitting function or initially established approximating equation, the $X_n$ represent said variables, the subscript n designates a particular variable, and the subscript k designates the datum that is represented in evaluating the corresponding weighting coefficient;

2. preferred forms of multi-term variable related coefficients as expressed by Equations 13, $$W_{jk} \propto \left| \prod_{i=1}^{I} \prod_{h=1}^{H_{ij}} \frac{\partial v_j}{\partial X_{ih}} \right|_k^{\left(\sum_{i=1}^{I} \sum_{h=1}^{H_{ij}} 1\right)^{-1}}, \qquad (13)$$

wherein the parameters $H_{ij}$ represent the number of independent variables that are included in the corresponding term of the represented approximating equation, the subscripted $X_{ih}$ represent said variables as hypothetically considered (at least while taking derivatives) to be independent of same variables that may be included in ether terms, The subscript i designates the term, and the subscript h designates a term included variable; and 3. preferred forms of multi-term uncertainty-weighting coefficients as expressed by Equations 14, $$W_{jk} \propto \left| \prod_{t=1}^{T_j} U_{jkt} \right|_k^{\left(-\frac{1}{T_j}\right)}, \quad (14)$$

wherein the parameters $T_j$ represent the number of term functions that are included in the correspondingly subscripted approximating equation, the subscript t designates the corresponding term function, and the $U_{jkt}$ represent proportionate estimates of uncertainty, which are assumed to characterize the error distribution of the designated said term function as evaluated in correspondence with the represented datum as indicated by the subscript, k. The symbol, $\alpha$, as included in Equations 8, and also in Equations 12 through 16, specifies a proportionality which may be represented by an equality or an approximation, or which may be represented by an arbitrary constant or relationship which will correspondingly establish direct or approximate proportionality. Considered proportionality as represented for either the weighting of residuals or the normalizing of fitting parameters should be consistent for all represented sums and all correspondingly represented equations.

preferred forms of coordinate related coefficients may also be expressed to include representation of heterogeneous uncertainty as represented by Equations 15, $$W_{jk} \propto \left| \prod_{n=1}^{N} U_n \frac{\partial v_j}{\partial X_n} \right|_k^{\left(-\frac{1}{N}\right)}, \quad (15)$$

wherein the $U_n$ are the represented uncertainties corresponding to the variables, $X_n$.

Similarly, preferred forms of multi-term variable related coefficients may be expressed to include heterogeneous uncertainty as represented by Equations 16.

$$W_{jk} \propto \left| \prod_{i=1}^{I} \prod_{h=1}^{H_{ij}} U_{ih} \frac{\partial v_j}{\partial X_{ih}} \right|_k^{\left(\sum_{i=1}^{I} \sum_{h=1}^{H_{ij}} 1\right)^{-1}}, \quad (16)$$

wherein the $U_{ih}$ are the represented uncertainties corresponding to the datum variables, $X_{ih}$. Uncertainties as represented in Equations 14, may be repeatedly included in correspondence with said variables as said variables might be included in more than a single term of the represented approximating equation and considered to be independent of same variables in other terms while taking derivatives.

A variety of alternate coefficients may be represented by replacing exponents as included in Equations 10 through 14 with other represented exponential powers. Represented weighting coefficients need not be normalized to provide relative weighting.

Also, in accordance with the present invention, a plurality of independent base equations, each representing the same form of a single represented approximating equation, may for some applications, be established by including a plurality of represented forms for residual weighting coefficients. Other represented coefficients that might be considered to provide residual weighting may be similarly implemented as in Matrix Equation 6 or in the formulating of determinate sets of independent equations.

Residual weighting coefficients are weighting coefficients that are implemented by a process whereby they are included as coefficients of residual terms or residual term functions so as to provide corresponding residual weighting in the representing of a sum or sums of weighted residual terms or weighted residual term functions, or whereby they are included as coefficients of residuals to provide corresponding residual weighting in representing of a sum or sums of weighted residuals. Residual weighting coefficients are correspondingly related to uncertainty, or other inherent or assumed analytically represented characteristics corresponding to the represented residuals or deviations for which they provide weighting. They represent evaluated proportions or assumed relatively proportionate quantities which may be included as or with represented coefficients to provide corresponding residual weighting. They may independently represent single proportions or they may represent combined products of proportions.

A residual weighting coefficient as herein defined is distinguished either by:
1. being included as a weighting coefficient to provide residual weighting in correspondence with a plurality of weighting coefficients in the formulating of an estimate for a weighted sum (which may be parametrically expressed, numerically corresponding, or proportionately represented) which is implemented to represent a residuum as the sum of correspondingly weighted residuals; or
2. by being included in and providing residual weighting in relative proportion with a plurality of weighting coefficients in the formulating of a sum (or proportionately represented sum) of weighted residuals, weighted residual terms, or weighted residual term functions; or in the formulating of a sum of weighted parametrically represented residuals or residual terms, or corresponding proportions of the same.

In accordance with the present invention, residual weighting is a process which involves quantifying, representing, and multiplying evaluated terms or evaluated term functions of residuals by weighting coefficients in order to provide a correspondingly weighted representation, discounting multiplication of derivatives by coefficients during in minimizing or maximizing operations and discounting all processes which establish only implied forms of residual weighting for which said multiplying is not effectuated nor implemented to be effectuated.

In conjunction, the weighting of represented variances, squared residuals, squared deviations, or any other form of represented non-zero addends as included in equations which represent derivatives or partial derivatives of correspondingly weighted sums which are equated to zero for providing minimized representation, is not considered to be residual weighting in accordance with the present invention.

Weighting which is distinguished by being correspondingly included in the formulating of each and every equation of a set of independent equations in which said each and every equation as included in said set of independent equations collectively represent fitting parameters which characterize a sum of correspondingly weighted squared residuals, is not herein considered to be residual weighting.

Considering minimized sums of addends as heretofore provided by least-squares or alternate sum minimizing techniques, The weighting of included and assumed non-zero addends (such as represented variances, squared deviations, absolute values, or conceived deviations), as included in minimizing and representing minimized sums in direct correspondence to fitting parameters, is not herein considered to represent application of residual weighting, and therefore, is not considered in accordance with the present invention to be residual weighting.

Residual weighting as herein defined is not intended nor represented to establish minimizing operations involving sums comprising assumed non-zero valued weighted addends, and hence implementing of residual weighting does not inherently require inclusion of the same plurality of weighting coefficients (or direct proportions thereof) in the formulating and subsequent representing of each and every equation of a provided set of independent equations for representing reduction restraints.

In accordance with the present invention, an approximating equation residual is a residual which represents a deviation vector with components which may be defined either in terms of variable-related coordinates or in terms of hypothetically considered term-typifying coordinates. Variable-related coordinates correspond to actual datum variables or variables that are represented functions of said datum variables with represented variable error preferably characterized by non-skewed uncertainty distributions. Coordinate related coefficients may be included as residual weighting to provide separate residual-component weighting proportions in correspondence with each established variable-related coordinate.

In accordance with the present invention, term-typifying coordinates characterize assumed orthogonality between represented term-related components of an approximating equation residual. Term-typifying coefficients include multi-term variable related coefficients and multi-term uncertainty-weighting coefficients. The coined phraseology "multi-term" is herein considered to be descriptive of constituent single terms of multiple-term expressions or equations. With similar regard in accordance with this invention, a multi-term variable is a variable which is considered independently as it is represented in a single term of a multiple-term expression or equation.

Represented multi-term variable related coefficients may be included for residual or alternate forms of weighting to provide separate residual-component weighting proportions in correspondence with each multi-term variable as hypothetically considered to be orthogonally distinct from other representations of the same variable which may be included in other terms of the same residual.

Represented multi-term uncertainty-weighting coefficients may be included for residual or alternate forms of weighting to provide separate residual-component weighting proportions in correspondence with estimated uncertainty of each included non-constant term of a represented residual.

Each represented residual component may be assumed to include a correspondingly represented component of function related deviation plus a correspondingly represented component of datum error. However, the included and represented components of function related deviations may not be proportionately related as represented by the approximating equation, and hence, may require individual component weighting to establish a uniform distribution of represented function related deviations which can be assumed to vanish when included in a statistically represented sum. In accordance with the present invention, residual-component weighting coefficients establish weighting of represented residual components (which may include either coordinate related components or term typifying components). Preferred forms of residual-component weighting coefficients are assumed to provide normalization of the represented coordinates of each individual deviation in order to establish equivalent weighting of related components of all included function related deviations. Uncertainty which is invariant with respect to variable related coordinates need not be included in represented weighting coefficients which provide appropriate function related deviation normalization. Alternately, heterogeneous uncertainties as assumed to be represented by non-skewed error distributions should generally be included. For both applications (that is, with or without including uncertainty in the formulating of weighting coefficients) the associated bias error of non-vanishing contributions of represented nonlinear error-affected terms which are included in representing a residual sum may be correspondingly represented by an estimated residuum.

Residual-component weighting coefficients as referred to herein are either coordinate related coefficients or term typifying coefficients which are generated and implemented to provide residual weighting of represented forms for approximating equation residuals as originally or alternately represented.

In accordance with the present invention, residual weighting coefficients are not limited to a single designated analytic form in formulating distinctly represented equations of a corresponding set of independent equations. Different forms of weighting coefficients, as considered to provide residual weighting in accordance with the present invention, may be independently represented in the formulating of correspondingly different residual equations. Representation for any analytically distinct form of weighting coefficients may be included to provide weighting in the formulating of summed residual equations of any subset comprising one or more summed residual equation(s) as included in a set of independent equations without necessarily being included in the formulating of each and every equation of the entire said set of independent equations. Also, a plurality of analytically distinct forms of weighting coefficients may be included to provide weighting in the formulating of summed residual equations as included in a corresponding plurality of subsets of a single set of independent equations.

In accordance with this invention, a single base equation or a plurality of base equations may comprise, or be included in or with, a set of independent equations which determine values for corresponding fitting parameters. Additional independent equations, if any, which are included to complete the set, are herein referred to as subordinate equations. Subordinate equations may be formulated in correspondence with alternate reduction techniques and be individually included in sets, or included as subsets of sets, of independent equations. Subordinate equations may be formulated to include represented fitting parameters along with various combinations and forms of represented term functions, and various forms of weighting as represented by any included factors and/or coefficients. Preferably, subordinate equations are established as sums of parametrically represented residuals (which may be weighted by included said factors and/or coefficients) which are equated either to zero or to represented estimates of subordinate residua. Said parametrically represented residuals, and similar parametrically expressed addends, whose term functions are evaluated in correspondence with represented data, and then summed and included in the formulating of subordinate equations are referred to herein as subordinate residuals.

Equations that relate parametrically represented sums of base or subordinate residuals to represented correspondingly weighted estimates of residua are herein referred to as summed residual equations. Estimates of subordinate equation residua are assumed to directly correspond to (that is, they are considered to be at least approximately equivalent to or nearly proportional to) parametric said sums of subordinate residuals as represented to include appropriate fitting parameters when evaluated in correspondence with provided data.

In accordance with the present invention, it is important to estimate each included residuum with sufficient accuracy to establish an appropriate ratio between all represented residual sums. Preferred equation selections establish assumed relative or minimal change in simulated residua in correspondence with distinguishable change in simulated error. If an estimated residuum is considered to be effectively zero, or quite small in proportion to other included residua, it need not be included in the corresponding base or subordinate equation.

In accordance with the present invention, alternate forms of base and subordinate equations may also be referred to as summed residual equations. A summed residual equation is rendered as a select equation by either including an assumed non-zero representation of estimated residuum (or relative proportion thereof), or by including representation of at least one plurality of residual weighting coefficients in the formulating of at least one evaluated term function of said equation. Any equation not so rendered is not considered to be a select equation in accordance with the present invention. Any equation so rendered, even as represented by functional components of a data processing system for representing of a solution to a an equation or system of equations or in the formulating of a solution to a matrix equation, is also considered to be a select in accordance with the present invention. A select equation which is rendered by including at least one represented plurality of residual weighting coefficients in the formulating of at least one evaluated term function, may also include, but is not necessarily required to include, non-zero representation of residuum, and conversely, select equations which include represented residua may or may not necessarily include residual weighting.

In accordance with the present invention, representation of estimated residuum may be included in a summed residual equation as represented by functional components of a data processing system either as a represented numerical estimate or in parametric form which may include representation of unevaluated parameter estimates or parameter estimates that may later be provided or evaluated. For some applications, corresponding proportionately estimated residua may best be represented to include parametric ratios of assumed predominate Taylor series term coefficients.

In accordance with the present invention, an adept equation may be a summed residual equation, a considered base equation, a considered subordinate equation, or an alternately formulated equation that is included in a set of independent equations as represented. Such a set of independent equations may include coordinate related coefficients and even represent maximum likelihood without representing convergence to a minimum sum for correspondingly weighted squared deviations; or such a set of independent equations may include certain multi-term variable related coefficients as represented to provide for said convergence.

Inverse Deviation Variation Weighting

One of the problems that has continued to thwart attempts to provide nonlinear forms of parameter evaluating is cause by the bias that is introduced by nonlinearly related variables. In accordance with the present invention, this problem can be resolved by representing forms of residual weighting including forms of implied squared residual weighting in correspondence with the inverse of represented deviation variations. Function deviations as expressed by the following may represent multiple dimension deviations corresponding to any number of degrees of freedom.

$$v = \sum_{i=1}^{I} P_i Q_i. \tag{17}$$

In accordance with the present invention, the weight of each such deviation as expressed in terms of fundamental variables, $\chi_n$, and considered with respect to other function related deviations can be represented as being inversely proportional to a locally defined incremental deviation variation which is considered with respect to $\aleph$ designated root proportions of variables as independently represented. Said deviation variation, $\zeta$, as here defined to establish corresponding function related deviation weighting for two or more dimensions, may be expressed by the general form of Equation 18, $$\zeta \equiv \left| \prod_{\hbar=1}^{\aleph} \frac{\partial v}{\partial X_\hbar} \right|^{\frac{1}{\aleph}}, \tag{18}$$

Wherein each representation of each considered variable, $X_\hbar$, may correspond to:
1. a variable, e.g. $\chi_n$, which is only included in one term of the function deviation,
2. a single independently represented variable, e.g. $\chi_n$, which is included in one or more terms of the function deviation, or
3. a hypothetically-considered-to-be-independent variable as may be alternately represented in one or more terms of the function deviation.

The $\aleph$ indicates the number of represented root proportions, the subscript, $\hbar$, designates the correspondingly considered variables as represented. The $v$ represents the corresponding function related deviation. In accordance with the present invention, a hypothetically-considered-to-be-independent variable is a variable that is represented in a plurality of terms, but is considered for analysis purposes to be independent as included in a subset of said plurality of terms.

The inverse of deviation variations as so expressed are assumed to provide unique weighting such that error-free function deviations, as weighted and integrated over the considered variable related $\aleph$ dimensional space, $$\prod_{\hbar=1}^{\aleph} X_\hbar,$$

are assumed to be directly proportional to the corresponding dimensions of that space, thus providing space proportionate weighting which will correct for nonlinear function variations.

In accordance with the present invention inverse deviation variation weighting is weighting which includes representing and including forms of inverse deviation variation as might be characterized by equation 18 for providing either direct or implied weighting of either residuals or squared residuals, including:
1. forms of residual weighting as represented by coordinate related coefficients.
2. forms of residual weighting as represented by multi-term variable related coefficients,
3. forms of residual weighting as represented by two-variable and bivariate forms of CTM weighting coefficients, and 4. corresponding forms of weighting coefficients which may be implemented by including the square of inverse deviation variation to provide implied forms of squared residual weighting or alternate forms of maximum likelihood estimating.

Representing Maximum Likelihood

In accordance with the present invention data reductions which include both inverse approximative-parameter-independent deviation variation weighting and inverse approximative-parameter-dependent variance weighting may be channeled to convergence by representing a maximum likelihood estimator which is dependent upon both datum variable uncertainty and deviation variation as represented for N pertinent degrees of freedom and evaluated in correspondence with represented data. Assume a Gaussian distributions of errors in the measure of the N fundamental variables as weighted over the range and domain of the provided data by the inverse of the datum variable uncertainty, $U_{x_{nk}}$. Also assume that each deviation is weighted by the inverse of the ratio of the function related deviation variations to the sum of inverse deviation variations which correspond to each included deviation. With this assumption, a likelihood probability, L, that the measured values, $x_{nk}$, of fundamental variables, $\chi_{nk}$, correspond within the range ($\chi_{nk}, \chi_{nk}+\Delta x_{nk}$) to adjusted variables, $X_{nk}$, may be expressed by Equation 19.

$$L = \left( \prod_{k=1}^{K} \frac{\frac{1}{\varsigma_k \sqrt{2\pi}^N}}{\sum_{k=1}^{K} \frac{1}{\varsigma_k}} \sum_{n=1}^{N} \frac{\Delta x_{nk}}{U_{x_{nk}}} \right) \exp \frac{-1}{2} \sum_{k=1}^{K} \left( \frac{\frac{1}{\varsigma_k^2}}{\sum_{k=1}^{K} \frac{1}{\varsigma_k}} \right)^2 \sum_{n=1}^{N} \left( \frac{x_{nk} - X_{nk}}{U_{x_{nk}}} \right)^2, \quad (19)$$

wherein the inverse of the deviation variations, $1/\varsigma_k$, as normalized on the corresponding sum of inverse deviation variations, $\Sigma_{k=1}^{K}=1/\varsigma_k$, may be represented as proportional to the square root of a coordinate related coefficient, $\sqrt{W_k}$, for providing forms of implied squared residual weighting. and similarly proportional to the preferred form for coordinate related coefficients as considered for providing residual weighting in terms of fundamental variables.

$$\sqrt{W_k} \propto \left| \prod_{h=1}^{N} \frac{\partial v}{\partial X_h} \right|_k^{(-\frac{1}{N})} \propto \sum_{n=1}^{N} \left( \frac{\frac{1}{\varsigma_k}}{\sum_{k=1}^{K} \frac{1}{\varsigma_k}} \right). \quad (20)$$

The parameter to be subjected to minimizing operations, S, in order to establish maximum likelihood is proportionately represented by Equation 21, $$S \propto \frac{1}{2} \sum_{k=1}^{K} W_k \sum_{n=1}^{N} \left( \frac{x_{nk} - X_{nk}}{U_{x_{nk}}} \right)^2, \quad (21)$$

as subject to the restraints of the weighting coefficient, $W_k$, being held constant during the minimizing operations, and Equation 17 being assumed equal to zero when evaluated in correspondence with the adjusted variables, $X_{1k}, \ldots, X_{Nk}$.

An example providing form for minimizing a linear bivariate expression for representing maximum likelihood is provided by York as previously referenced. In accordance with the present invention, similar techniques may be implemented to include inverse deviation variation weighting as exemplified by the following derivation:

Equating the total derivative of S to zero, will yield Equation 22.

$$\delta S \propto -\sum_{k=1}^{K} W_k \sum_{n=1}^{N} \frac{(x_{nk} - X_{nk})\delta X_{nk}}{U_{x_{nk}}^2} = 0. \quad (22)$$

Similarly, equating the total derivative of Equation 17 to zero will yield Equations 23

$$\delta v_k = \sum_{i=1}^{I} \left[ Q_i \delta P_i + \sum_{n=1}^{N} P_i \frac{\partial Q_i}{\partial X_n} \delta X_{nk} \right]_{X_{1k},\ldots,X_{Nk}} = 0. \quad (23)$$

Multiplying each of Equations 23 by an undetermined multiplier, $\lambda_k$, and adding the ensuing equations will yield Equation 24.

$$\sum_{k=1}^{K} \sum_{n=1}^{N} \delta X_{nk} \left[ -\frac{W_k(x_{nk} - X_{nk})}{U_{x_{nk}}^2} + \sum_{i=1}^{I} \lambda_k P_i \frac{\partial Q_i}{\partial X_n} \right]_{X_{1k},\ldots,X_{Nk}} + \quad (24)$$

$$\sum_{k=1}^{K} \sum_{i=1}^{I} \lambda_k [Q_i \delta P_i]_{X_{1k},\ldots,X_{Nk}} = 0.$$

Equating coefficients to zero will yield Equations 25 and 26.

$$\sum_{k=1}^{K} \lambda_k Q_i \Big|_{X_{1k},\ldots,X_{Nk}} = 0. \quad (25)$$

$$x_{nk} - X_{nk} = \frac{\lambda_k}{W_k} \sum_{i=1}^{I} P_i U_{x_{nk}}^2 \frac{\partial Q_i}{\partial X_n} \Big|_{X_{1k},\ldots,X_{Nk}} = \frac{\lambda_k}{W_k} \sum_{i=1}^{I} P_i U_{x_{nk}}^2 \quad (26)$$

$$\left[ \frac{\partial Q_i}{\partial X_n} - \frac{(x_{nk} - X_{nk})}{2} \frac{\partial^2 Q_i}{\partial X_n^2} + \frac{(x_{nk} - X_{nk})^2}{6} \frac{\partial^3 Q_i}{\partial X_n^3} - \ldots \right]_{X_{1k},\ldots,X_{Nk}}$$

Assuming the adjusted variables to approximate true values, and considering a first order Taylor series expansion of approximation deviation as given by Equation 17 and evaluated in correspondence with provided data will yield Equation 27.

$$(P_i Q_i)_{X_{1k},\ldots,X_{Nk}} \approx \left[ P_i Q_i + \sum_{n=1}^{N} P_i (x_{nk} - X_{nk}) \frac{\partial Q_i}{\partial X_n} + \ldots \right]_{X_{1k},\ldots,X_{Nk}}. \quad (27)$$

Replacing $Q_{ik} |x_{1k}, \ldots, x_{Nk}$ of Equation 17 with correspondingly evaluated functions of Equation 27, representing higher order terms by Taylor's series as evaluated in correspondence with provided data, and imposing the restraint that $v(X_{1k}, \ldots, X_{Nk})=0$, will yield Equation 28.

$$v(X_{1k}, \ldots, X_{Nk}) = \sum_{i=1}^{I} P_i Q_i \Big|_{x_{1k},\ldots,x_{Nk}} - \quad (28)$$

$$\left\{\sum_{n=1}^{N}(x_{nk}-X_{nk})\sum_{i=1}^{I}P_i\left[\frac{\partial Q_i}{\partial X_n}-(x_{nk}-X_{nk})\frac{\partial^2 Q_i}{\partial X_n^2}\right]_{x_{1k},\ldots,x_{Nk}}\right\}-$$

$$\left[\sum_{n=1}^{N}(x_{nk}-X_{nk})\sum_{i=1}^{I}P_i\frac{3(x_{nk}-X_{nk})^2}{2}\frac{\partial^3 Q_i}{\partial X_n^3}-\ldots\right]_{x_{1k},\ldots,x_{Nk}}$$

Combining Equation 26 with Equation 28 will yield Equation 29.

$$\sum_{i=1}^{I}P_iQ_i\Big|_{x_{1k},\ldots,x_{Nk}}- \quad (29)$$

$$\left[\sum_{n=1}^{N}\frac{\lambda_k}{W_k}\sum_{i=1}^{I}P_iU_{x_{nk}}^2\frac{\partial Q_i}{\partial X_n}\sum_{i=1}^{I}P_i\frac{\partial Q_i}{\partial X_n}\right]_{x_{1k},\ldots,x_{Nk}}+\ldots=0,$$

which can be written $$\lambda_k \approx \frac{W_k}{V_k}\sum_{i=1}^{I}P_iQ_i\Big|_{x_{1k},\ldots,x_{Nk}}. \quad (30)$$

where $V_k$ is the approximative-parameter-independent effective variance, which is approximated in accordance with the present invention by Equations 31.

$$V_k \approx \left[\sum_{n=1}^{N}\sum_{i=1}^{I}P_iU_{x_{nk}}^2\frac{\partial Q_i}{\partial X_n}\sum_{i=1}^{I}P_i\frac{\partial Q_i}{\partial X_n}\right]_{x_{1k},\ldots,x_{Nk}}= \quad (31)$$

$$\sum_{n=1}^{N}U_{x_{nk}}^2\left(\frac{\partial v}{\partial X_n}\right)^2\Big|_{x_{1k},\ldots,x_{Nk}}$$

Combining Equations 25 through 28 with additional Taylor series representations, after some manipulation, will yield Equations 32, $$\sum_{k=1}^{K}\left[\frac{W_k}{V_k}Q_j\left(\sum_{i=1}^{I}P_iQ_i\right)-\frac{1}{2}\left(\sum_{i=1}^{I}P_iQ_i\right)^2\frac{W_k}{V_k^2}\frac{\partial V_k}{\partial P_j}\Big|_{P_1\ldots P_I}\right]_{x_{1k},\ldots,x_{Nk}} \approx 0, \quad (32)$$

wherein the included approximative-parameter-dependent variance, $v_k$ is represented by Equations 33.

$$\mathcal{V}_k = \left[\sum_{n=1}^{N}\sum_{i=1}^{I}P_iU_{x_{nk}}^2\frac{\partial Q_i}{\partial X_n}\sum_{i=1}^{I}P_i\frac{\partial Q_i}{\partial X_n}\right]_{x_{1k},\ldots,x_{Nk}}+\ldots. \quad (33)$$

In accordance with the present invention, Equations 32, as combined with either Equations 31 or Equations 33, will establish form for sets of independent adept equations which can be implemented to evaluate fitting parameters which reflect at least one form of maximum likelihood estimating in correspondence with represented inverse deviation variation weighting. The included coordinate related coefficients, $W_k$, can be correspondingly represented as combined with the inverse of the effective variances and implemented as a composite form, providing inverse deviation variation weighting which can be implemented by an adept alternate coefficient generator. Said adept alternate coefficient generator may also comprise means for generating representation for the partial derivatives of effective variance, or the partial derivatives of the inverse of effective variance, as considered with respect to the represented fitting parameters, in order to implement representation of either approximative-parameter-independent or approximative-parameter-dependent effective variance.

Also, in accordance with the present invention, the effective variance as expressed in either parameter independent form by Equations 31, or as expressed in parameter dependent form by Equations 33, may be generated to include additional Taylor series terms that might have been but were not included in Equation 27. With such modification, Equations 31 and 33 can be expressed to include even powers of represented error as characterized by the form of Equations 34 and 35, respectively.

$$V_k = \left[\sum_{n=1}^{N}\sum_{i=1}^{I}P_iU_{x_{nk}}^2\frac{\partial Q_i}{\partial X_n}\sum_{i=1}^{I}P_i\frac{\partial Q_i}{\partial X_n}\right]_{x_{1k},\ldots,x_{Nk}}+ \quad (34)$$

$$\left[\sum_{n=1}^{N}\sum_{i=1}^{I}P_iU_{x_{nk}}^2\frac{(x_{nk}-X_{nk})^2}{2}\frac{\partial^2 Q_i}{\partial X_n^2}\sum_{i=1}^{I}P_i\frac{\partial^2 Q_i}{\partial X_n^2}\right]_{x_{1k},\ldots,x_{Nk}}+$$

$$\left[\sum_{n=1}^{N}\sum_{i=1}^{I}P_iU_{x_{nk}}^2\frac{5(x_{nk}-X_{nk})^2}{3}\frac{\partial Q_i}{\partial X_n}\sum_{i=1}^{I}P_i\frac{\partial^3 Q_i}{\partial X_n^3}\right]_{x_{1k},\ldots,x_{Nk}}+$$

$$\left[\sum_{n=1}^{N}\sum_{i=1}^{I}P_iU_{x_{nk}}^2\frac{9(x_{nk}-X_{nk})^4}{4}\frac{\partial^3 Q_i}{\partial X_n^3}\sum_{i=1}^{I}P_i\frac{\partial^3 Q_i}{\partial X_n^3}\right]_{x_{1k},\ldots,x_{Nk}}+$$

...

$$\mathcal{V}_k = \left[\sum_{n=1}^{N}\sum_{i=1}^{I}P_iU_{x_{nk}}^2\frac{\partial Q_i}{\partial X_n}\sum_{i=1}^{I}P_i\frac{\partial Q_i}{\partial X_n}\right]_{x_{1k},\ldots,x_{Nk}}+ \quad (35)$$

$$\left[\sum_{n=1}^{N}\sum_{i=1}^{I}P_iU_{x_{nk}}^2\frac{(x_{nk}-X_{nk})^2}{2}\frac{\partial^2 Q_i}{\partial X_n^2}\sum_{i=1}^{I}P_i\frac{\partial^2 Q_i}{\partial X_n^2}\right]_{x_{1k},\ldots,x_{Nk}}+$$

$$\left[\sum_{n=1}^{N}\sum_{i=1}^{I}P_iU_{x_{nk}}^2\frac{5(x_{nk}-X_{nk})^2}{3}\frac{\partial Q_i}{\partial X_n}\sum_{i=1}^{I}P_i\frac{\partial^3 Q_i}{\partial X_n^3}\right]_{x_{1k},\ldots,x_{Nk}}+$$

$$\left[\sum_{n=1}^{N}\sum_{i=1}^{I}P_iU_{x_{nk}}^2\frac{9(x_{nk}-X_{nk})^4}{4}\frac{\partial^3 Q_i}{\partial X_n^3}\sum_{i=1}^{I}P_i\frac{\partial^3 Q_i}{\partial X_n^3}\right]_{x_{1k},\ldots,x_{Nk}}+$$

...

Corresponding approximations may be provided by replacing the even powers of the error deviations, by mean values for said even powers, and dropping unrepresented terms of the included Taylor Series, e.g.

$$V_k \approx \left[ \sum_{n=1}^{N} \sum_{i=1}^{I} P_i U_{x_{nk}}^2 \frac{\partial Q_i}{\partial X_n} \sum_{i=1}^{I} P_i \frac{\partial Q_i}{\partial X_n} \right]_{x_{1k},\ldots,x_{Nk}} + \quad (36)$$

$$\left[ \sum_{n=1}^{N} \sum_{i=1}^{I} \frac{P_i (U_{x_{nk}}^2)^2}{2} \frac{\partial^2 Q_i}{\partial X_n^2} \sum_{i=1}^{I} P_i \frac{\partial^2 Q_i}{\partial X_n^2} \right]_{x_{1k},\ldots,x_{Nk}} +$$

$$\left[ \sum_{n=1}^{N} \sum_{i=1}^{I} \frac{5 P_i (U_{x_{nk}}^2)^2}{3} \frac{\partial Q_i}{\partial X_n} \sum_{i=1}^{I} P_i \frac{\partial^3 Q_i}{\partial X_n^3} \right]_{x_{1k},\ldots,x_{Nk}} +$$

$$\left[ \sum_{n=1}^{N} \sum_{i=1}^{I} \frac{9 P_i U_{x_{nk}}^2 \overline{(x_{nk} - X_{nk})^4}}{4} \frac{\partial^3 Q_i}{\partial X_n^3} \sum_{i=1}^{I} P_i \frac{\partial^3 Q_i}{\partial X_n^3} \right]_{x_{1k},\ldots,x_{Nk}} +$$

...

$$\mathcal{V}_k \approx \left[ \sum_{n=1}^{N} \sum_{i=1}^{I} P_i U_{x_{nk}}^2 \frac{\partial Q_i}{\partial X_n} \sum_{i=1}^{I} P_i \frac{\partial Q_i}{\partial X_n} \right]_{x_{1k},\ldots,x_{Nk}} + \quad (37)$$

$$\left[ \sum_{n=1}^{N} \sum_{i=1}^{I} \frac{P_i (U_{x_{nk}}^2)^2}{2} \frac{\partial^2 Q_i}{\partial X_n^2} \sum_{i=1}^{I} P_i \frac{\partial^2 Q_i}{\partial X_n^2} \right]_{x_{1k},\ldots,x_{Nk}} +$$

$$\left[ \sum_{n=1}^{N} \sum_{i=1}^{I} \frac{5 P_i (U_{x_{nk}}^2)^2}{3} \frac{\partial Q_i}{\partial X_n} \sum_{i=1}^{I} P_i \frac{\partial^3 Q_i}{\partial X_n^3} \right]_{x_{1k},\ldots,x_{Nk}} +$$

$$\left[ \sum_{n=1}^{N} \sum_{i=1}^{I} \frac{9 P_i U_{x_{nk}}^2 \overline{(x_{nk} - X_{nk})^4}}{4} \frac{\partial^3 Q_i}{\partial X_n^3} \sum_{i=1}^{I} P_i \frac{\partial^3 Q_i}{\partial X_n^3} \right]_{x_{1k},\ldots,x_{Nk}} +$$

...

Training Channeled Convergence

A second problem to be considered in providing nonlinear forms of data reductions is related either to the imposition of or lack of imposition of reduction channeling restraints. In accordance with the present invention, whether the reduction is linear or nonlinear, and whether or not the reduction requires iteration, the error that is associated with imposed or lack of imposed reduction restraints is herein referred to as channeled convergence error.

Corrections have been suggested which account for channeled convergence error and which may be implemented for simple applications in consideration of both "g on f" and "f on g" regression solutions. For example, Ross (ref. A. Ross. Am. J. Phys., Vol. 48, p 409, 1980) has suggested a method of extrapolating between the two regression line solutions by assuming a constant value for the ratio between the errors in the represented variables.

Alternately, iteration may be channeled to trained convergence during an actual reduction process by imposing certain channeling restraints. In accordance with the present invention at least five alternate techniques, any of which may be employed in order to train channeled convergence to a valid solution during a reduction process, these include:

1. representing inverse deviation variation weighting in implementing determinate sets of independent equations which establish channeled convergence as related to estimated residua;
2. implementing estimators which represent approximative-parameter-independent inverse deviation variation weighting to train convergence to a maximum likelihood solution not corresponding to a minimum value for the represented sum of weighted squared deviations;
3. representing inverse deviation variation weighting in providing conformal analysis as alternately implemented in accordance with the present invention to include zeta parameter restraints which train convergence to a solution not corresponding to a minimum value for a represented sum of weighted squared deviations;
4. representing inverse deviation variation weighting as implemented by multi-term variable related coefficients which will establish reduction restraints as corresponding to a minimum value for a correspondingly represented sum of squared deviations; and
5. implementing characteristic form iterations.

Viable Operations for Representing Solutions

A necessary consideration for appropriate implementation of reduction techniques is that of providing viable operations for representing solutions to sets of independent equations. Viable operations for solving ordinary sets of independent equations are generally understood and appropriately implemented. Viable operations as required for solving sets of transcendental equations must also be appropriately implemented. In the past at least two approaches have been taken in minimizing sums as characterized by various forms of likelihood estimators. These include either channeling convergence to a solution for a set of independent equations, or searching for minimum values. both are equally valid and should yield the same results within computational accuracy provided the represented independent equations establish constraints corresponding to said minimum values.

In accordance with the present invention, inverse deviation variation weighting as represented by coordinate related coefficients must be treated as fitting parameter independent during minimizing operations, hence, for applications in which coordinate related coefficients are represented as functions of fitting parameters, searching for minimum values for represented sums of squared residuals does not constitute viable operations for channeling convergence to an appropriate solution. Alternately, viable operations for channeling convergence to solutions for equations which are transcendental may be implemented by methods of extrapolation and methods of representing successive approximations. Convergence may be verified in accordance with the present invention by comparing represented approximations or extrapolated estimates to subsequently computed approximations.

In accordance with the present invention, residual equations as herein defined do not constitute viable forms for representing independent equations to determine values for approximating parameters which minimize correspondingly represented sums which might be assumed to represent sums of squares of coordinate-normalized datum variances.

In accordance with the present invention, equations which represent inverse deviation variation weighting by weighting coefficients which are functions of fitting parameters do not constitute viable forms for representing independent equations to determine values for approximating parameters which minimize correspondingly represented sums which might be assumed to represent sums of squares of coordinate-normalized datum variances.

Conformal Analysis

Conformal analysis as initially conceived and introduced (ref. L. Chandler, ibid.) was mistakenly considered to be a form of least-squares analysis, It was subsequently implemented and represented as a form of "Discriminate Reduction Data Processing" with included implementation software which establishes means of representing more than two approximating parameters by searching for minimum values for represented sums of weighted squared deviations. Forms of conformal analysis thus implemented are limited in application to inappropriate evaluations for represented sets of independent equations.

Conformal analysis (with exception of some degenerate form corresponding to forms of regression analysis) is not a form of least-squares analysis. Minimizing operations, as considered with respect to a designated parameter, involve imposing minimizing restraints by equating represented derivatives or partial derivatives to zero. Imposing minimizing restraints as considered with respect to approximative parameters which are jointly included along with resolute parameters or estimated values in representing a parametric expression does not establish convergence of said parametric expression to a minimum value as considered with respect to said resolute parameters or said estimated values. And conversely, searching for a minimum value for said parametric expression will not establish convergence in correspondence with said minimizing operations as so considered. Also, in accordance with the present invention, unit matching may need to be included in conformal analysis equation consolidation, especially when more than two independent equations are generated.

In accordance with the present invention, forms of data reductions utilizing sets of independent equations which might be formulated somewhat similarly as by conformal analysis may be alternately implemented to include unit matching in equation consolidation and to provide valid convergent solutions corresponding to reduction restraints as may be represented by values for included resolute coefficients and estimated zeta parameters.

In accordance with the present invention, conformal analysis as alternately implemented involves effectuating minimizing operations as considered with respect to all term coefficients of an expression, including resolute coefficients. Certain fitting parameters are represented as constants or held constant during the minimizing operations, and consequently, minimum values for the represented sum of weighted squared deviations are not established. Said conformal analysis as alternately implemented provides means for consolidating over-determined systems of equations so as to represent a determinate set of independent equations by including determined or estimated values for zeta parameters. Said zeta parameters are set, or evaluated, prior to or during a reduction in correspondence with established restraints. In accordance with the present invention represented values for zeta parameters as included in representing forms of conformal analysis may be alternately set to train convergence of weighted or non-weighted sums of squared deviations which are correspondingly represented by said over-determined systems of equations. Zeta parameters may be either predetermined or estimated and evaluated as successive approximations which may be established during zeta parameter iterations. In accordance with the present invention, successive zeta parameter approximations are estimated by zeta parameter estimators which may be included to evaluate and represent zeta parameters or successive estimates of zeta parameters in order to satisfy pertinent reduction restraints. Provisional algorithms, which are unique to a particular application, must be supplied in order to determine successive approximations for zeta parameters as based upon successive reductions in correspondence with said particular application. During iteration procedures which are provided by certain forms of function similation, zeta parameters are set to values which train convergence, i.e. zeta parameters are set to values which tend to establish corresponding reduction restraints more closely with continued iterations as limited by the implemented approximative relationship and represented weighting coefficients.

In accordance with the present invention considered forms of conformal analysis include forms of conformal analysis types 1 and 2 and forms of full conformal analysis types 1 and 2. Full conformal analysis differs from the forms of conformal analysis which are explicitly represented by prior art (ref. L. Chandler, ibid.) by combining an excess equation with all of the remaining equations of the over-determined set during equation consolidation.

Matrix equation form may be implemented for representing solution sets for corresponding forms of conformal analysis and full conformal analysis type 1 with either approximative-parameter-dependent or approximative-parameter-independent weighting coefficients. In accordance with the present invention, for an approximative-parameter-dependent function deviation of the form, $$D = P_0 + CQ_c + \sum_{i=1}^{I} P_i Q_i, \tag{38}$$

the following general form for matrix equations may be implemented for representing solution sets for corresponding forms of conformal analysis including full conformal analysis type 1.

$$\begin{bmatrix} \sum_{k=1}^{K}[W_k] & \sum_{k=1}^{K}[W_k]Q_{1k} & \cdots & \sum_{k=1}^{K}[W_k]Q_{Ik} \\ \sum_{k=1}^{K}[W_k]Q_{1k} & \sum_{k=1}^{K}[W_k]Q_{1k}Q_{1k} & \cdots & \sum_{k=1}^{K}[W_k]Q_{1k}Q_{Ik} \\ \cdots & \cdots & \cdots & \cdots \\ \sum_{k=1}^{K}[W_k]Q_{Ik} & \sum_{k=1}^{K}[W_k]Q_{1k}Q_{Ik} & \cdots & \sum_{k=1}^{K}[W_k]Q_{Ik}Q_{Ik} \end{bmatrix} \begin{Bmatrix} P_0 \\ P_1 \\ \cdots \\ P_I \end{Bmatrix} = \tag{39}$$

-continued $$\left\{\begin{array}{c}\dfrac{CS_{\epsilon_0}}{P_0} - \sum_{k=1}^{K}[W_k]CQ_{ck} - \sum_{k=1}^{K}\dfrac{1}{2}\dfrac{\partial W_k}{\partial P_0}\left(P_0 + CQ_c + \sum_{i=1}^{I}P_iQ_i\right)^2 \\ \dfrac{CS_{\epsilon_1}}{P_1} - \sum_{k=1}^{K}[W_k]CQ_{ck}Q_{1k} - \sum_{k=1}^{K}\dfrac{1}{2}\dfrac{\partial W_k}{\partial P_1}\left(P_0 + CQ_c + \sum_{i=1}^{I}P_iQ_i\right)^2 \\ \cdots \\ \dfrac{CS_{\epsilon_I}}{P_I} - \sum_{k=1}^{K}[W_k]CQ_{ck}Q_{Ik} - \sum_{k=1}^{K}\dfrac{1}{2}\dfrac{\partial W_k}{\partial P_I}\left(P_0 + CQ_c + \sum_{i=1}^{I}P_iQ_i\right)^2\end{array}\right\},$$

wherein the $W_k$ represent the included weighting coefficients. Terms representing partial derivatives of $\zeta_{\epsilon_i}$, approximative-parameter-independent weight factors need not be included. The parameter $S_{\epsilon_i}$ represents the partial derivative of the sum of weighted squared deviations, taken with respect to the considered resolute parameter, C, and multiplied by a corresponding zeta parameter, $$S_{\epsilon_i} = \sum_{k=1}^{N}W_k\varsigma_{\epsilon_i}Q_{ck}\left(P_0 + CQ_{ck} + \sum_{i=1}^{I}P_iQ_{ik}\right) + \sum_{k=1}^{N}\varsigma_{\epsilon_i}Q_{ck}\dfrac{\partial W_k}{\partial C}\left(P_0 + CQ_{ck} + \sum_{i=1}^{I}P_iQ_{ik}\right)^2. \quad (40)$$

The subscript, $\epsilon_i$, designates the values of $\zeta_{\epsilon_i}$ which impose restraints in correspondence with the degrees of freedom represented by the i subscripted term function. Terms representing partial derivatives of approximative-parameter-independent weight factors need not be included. The parameter $\zeta_{\epsilon_0}$ is generally set to zero. The subscript c on the Q designates the function cofactor, $Q_{ck}$, of the resolute parameter, C. Unit matching is established by multiplying the parameter $S_{\epsilon_i}$ by a corresponding ratio of term coefficients, e.g. $c/P_i$.

In accordance with the present invention corresponding forms for representing adept equations as may be represented by Matrix Equation 39 for N pertinent degrees of freedom may be expressed as by Equations 41 and 42, $$\sum_{k=1}^{K}\left[W_k\left(P_0 + CQ_{ck} + \sum_{i=1}^{I}P_iQ_i\right)\right]_{x_{1k},\ldots,x_{Nk}} = \dfrac{CS_{\epsilon_0}}{P_0}, \quad (41)$$

$$\sum_{k=1}^{K}\left[W_kQ_j\left(P_0 + CQ_{ck} + \sum_{i=1}^{I}P_iQ_i\right)\right]_{x_{1k},\ldots,x_{Nk}} + \dfrac{1}{2}\sum_{k=1}^{K}\left[\left(P_0 + CQ_{ck} + \sum_{i=1}^{I}P_iQ_i\right)^2\dfrac{\partial W_k}{\partial P_j}|_{P_1\ldots P_I}\right]_{x_{1k},\ldots,x_{Nk}} = \dfrac{CS_{\epsilon_j}}{P_j}, \quad (42)$$

or alternately represented in a somewhat more general form by Equations 43, $$\sum_{k=1}^{K}\left[W_kQ_j\left(\sum_{i=1}^{I}P_iQ_i\right) + \dfrac{1}{2}\left(\sum_{i=1}^{I}P_iQ_i\right)^2\dfrac{\partial W_k}{\partial P_j}|_{P_1\ldots P_I}\right]_{x_{1k},\ldots,x_{Nk}} = \dfrac{S_{\epsilon_j}}{P_j}, \quad (43)$$

wherein the weighting coefficients, $W_k$, that are represented in Equations 41 through 43, are represented to included inverse deviation variation weighting. Again, terms representing partial derivatives of approximative-parameter-independent weight factors need not be included.

Similarly, considering an approximative-parameter-dependent function deviation of the form $$D = P_0 + \sum_{t=1}^{T}P_tQ_t, \quad (44)$$

the following general form for matrix equations may be implemented for representing solution sets for corresponding forms of conformal analysis type 2 including full conformal analysis type 2.

$$\begin{bmatrix}\sum_{k=1}^{K}[W_k] & \sum_{k=1}^{K}[W_k]Q_{1k} & \cdots & \sum_{k=1}^{K}[W_k]Q_{Tk} \\ \sum_{k=1}^{K}[W_k]Q_{1k} & \sum_{k=1}^{K}[W_k]Q_{1k}Q_{1k} & \cdots & \sum_{k=1}^{K}[W_k]Q_{1k}Q_{Tk} \\ \cdots & \cdots & \cdots & \cdots \\ \sum_{k=1}^{K}[W_k]Q_{Tk} & \sum_{k=1}^{K}[W_k]Q_{1k}Q_{Tk} & \cdots & \sum_{k=1}^{K}[W_k]Q_{Tk}Q_{Tk}\end{bmatrix}\begin{Bmatrix}P_0 \\ P_1 \\ \cdots \\ P_T\end{Bmatrix} = \quad (45)$$

$$\left\{\begin{array}{c}\dfrac{S_{\epsilon_0}}{P_0} - \sum_{k=1}^{K}\dfrac{1}{2}\dfrac{\partial W_k}{\partial P_0}\left(P_0 + \sum_{t=1}^{T}P_tQ_t\right)^2 \\ \dfrac{S_{\epsilon_1}}{P_1} - \sum_{k=1}^{K}\dfrac{1}{2}\dfrac{\partial W_k}{\partial P_1}\left(P_0 + \sum_{t=1}^{T}P_tQ_t\right)^2 \\ \cdots \\ \dfrac{S_{\epsilon_T}}{P_T} - \sum_{k=1}^{K}\dfrac{1}{2}\dfrac{\partial W_k}{\partial P_{(h+1)}}\left(P_0 + \sum_{t=1}^{T}P_tQ_t\right)^2\end{array}\right\},$$

wherein the parameter $\zeta_{\epsilon_0}$ is generally set to zero. Terms representing the partial derivatives of approximative-parameter-independent weight factors need not be included.

In accordance with the present invention corresponding general forms for representing the adept equations as may be represented by Matrix Equation 45 may be expressed as by Equations 46.

$$\sum_{k=1}^{K}\left[W_k Q_j\left(\sum_{i=1}^{I} P_i Q_i\right) + \frac{1}{2}\left(\sum_{i=1}^{I} P_i Q_i\right)^2 \frac{\partial W_k}{\partial P_j}\bigg|_{P_1 \ldots P_I}\right]_{x_{1k},\ldots,x_{Nk}} = \frac{\varsigma_{\epsilon_j}}{P_j}, \quad (46)$$

wherein the weighting coefficients, $W_k$, are represented to include inverse deviation variation weighting. Terms representing partial derivatives of approximative-parameter-independent weight factors need not be included.

Full conformal analysis, as exemplified in correspondence with Matrix Equations 39 and 45, will provide a non-zero value for all zeta parameters, including a non-zero value for $\zeta_{\epsilon_0}$. Other forms of conformal analysis may represent values of zero for one or more zeta parameters, or they may exclude all terms that include zeta parameters. In accordance with the present invention terms whose values are to be represented as zero need not be included in representing the corresponding equation. Degenerate forms of conformal analysis, in which all zeta parameters are either omitted or set to zero are herein considered to represent forms of regression analysis.

Regression Analysis with Exclusions of Least-Squares Forms

Least-squares analysis is a form of analysis which provides for the evaluation of approximating parameters which substantially minimize parametric expressions assumed to represent sums of weighted squared deviations. In accordance with the present invention, regression analysis may have a much broader interpretation, if applied also to the evaluation of approximating parameters in correspondence with certain determinate sets of equations which do not establish representation for correspondingly minimized sums of weighted squared deviations.

Certain maximum likelihood estimators, least-squares estimators and degenerate forms of conformal analysis may all be considered to represent forms of regression analysis. In accordance with the present invention such forms of regression analysis as might represent degenerate forms of conformal analysis type 1, may, for example, be represented by the following matrix equation:

$$\begin{bmatrix} \sum_{k=1}^{K}[W_k] & \sum_{k=1}^{K}[W_k]Q_{1k} & \cdots & \sum_{k=1}^{K}[W_k]Q_{Ik} \\ \sum_{k=1}^{K}[W_k]Q_{1k} & \sum_{k=1}^{K}[W_k]Q_{1k}Q_{1k} & \cdots & \sum_{k=1}^{K}[W_k]Q_{1k}Q_{Ik} \\ \cdots & \cdots & \cdots & \cdots \\ \sum_{k=1}^{K}[W_k]Q_{Ik} & \sum_{k=1}^{K}[W_k]Q_{Ik}Q_{1k} & \cdots & \sum_{k=1}^{K}[W_k]Q_{Ik}Q_{Ik} \end{bmatrix} \begin{Bmatrix} P_0 \\ P_1 \\ \cdots \\ P_I \end{Bmatrix} = \quad (47)$$

-continued $$\begin{Bmatrix} -\sum_{k=1}^{K}[W_k]CQ_{ck} - \sum_{k=1}^{K}\frac{1}{2}\frac{\partial W_k}{\partial P_0}\left(P_0 + CQ_c + \sum_{i=1}^{I}P_i Q_i\right)^2 \\ -\sum_{k=1}^{K}[W_k]CQ_{ck}Q_{1k} - \sum_{k=1}^{K}\frac{1}{2}\frac{\partial W_k}{\partial P_1}\left(P_0 + CQ_c + \sum_{i=1}^{I}P_i Q_i\right)^2 \\ \cdots \\ -\sum_{k=1}^{K}[W_k]CQ_{ck}Q_{Ik} - \sum_{k=1}^{K}\frac{1}{2}\frac{\partial W_k}{\partial P_I}\left(P_0 + CQ_c + \sum_{i=1}^{I}P_i Q_i\right)^2 \end{Bmatrix},$$

wherein terms representing partial derivatives of approximative-parameter-independent weight factors need not be included.

Similarly, degenerate forms of conformal analysis type 2 wherein the zeta parameters are all set to zero may be alternately represented as forms of relative regression analysis by not including terms of Matrix Equation 45 which implement zeta parameters. Relative regression analysis represents minimizing operations as considered with respect to all term coefficients, including a coefficient of the dependent variable. At least one term representing a partial derivatives of at least one approximative-parameter-dependent weight factor needs to be included to prevent generating an over-determined system of equations and to establish a determinate solution. The resulting determinate solution as represented in relative form can generally be normalized on the resulting coefficient of the dependent variable. An advantage of relative regression analysis is that division by a coefficient matrix is not required, hence zero valued coefficients may be represented without introducing division by zero. In accordance with the present invention such forms of relative regression analysis may, for example, be represented by the following matrix equation:

$$\begin{bmatrix} \sum_{k=1}^{K}[W_k] & \sum_{k=1}^{K}[W_k]Q_{1k} & \cdots & \sum_{k=1}^{K}[W_k]Q_{Tk} \\ \sum_{k=1}^{K}[W_k]Q_{1k} & \sum_{k=1}^{K}[W_k]Q_{1k}Q_{1k} & \cdots & \sum_{k=1}^{K}[W_k]Q_{1k}Q_{Tk} \\ \cdots & \cdots & \cdots & \cdots \\ \sum_{k=1}^{K}[W_k]Q_{Tk} & \sum_{k=1}^{K}[W_k]Q_{1k}Q_{Tk} & \cdots & \sum_{k=1}^{K}[W_k]Q_{Tk}Q_{Tk} \end{bmatrix} \begin{Bmatrix} P_0 \\ P_1 \\ \cdots \\ P_T \end{Bmatrix} = \quad (48)$$

$$\begin{Bmatrix} -\sum_{k=1}^{K}\frac{1}{2}\frac{\partial W_k}{\partial P_0}\left(P_0 + \sum_{t=1}^{T}P_t Q_t\right)^2 \\ -\sum_{k=1}^{K}\frac{1}{2}\frac{\partial W_k}{\partial P_1}\left(P_0 + \sum_{t=1}^{T}P_t Q_t\right)^2 \\ \cdots \\ -\sum_{k=1}^{K}\frac{1}{2}\frac{\partial W_k}{\partial P_{(T)}}\left(P_0 + \sum_{t=1}^{T}P_t Q_t\right)^2 \end{Bmatrix}.$$

Formulated adept equations as may be represented by Equations 47 or 48 may be generally expressed by Equations 49.

$$\sum_{k=1}^{K}\left[W_k Q_j\left(\sum_{i=1}^{I} P_i Q_i\right) + \frac{1}{2}\left(\sum_{i=1}^{I} P_i Q_i\right)^2 \frac{\partial W_k}{\partial P_j}\bigg|_{P_1\ldots P_I}\right]_{x_{1k},\ldots,x_{Nk}} = 0, \quad (49)$$

wherein the weighting coefficients, $W_k$, are represented to include inverse deviation variation weighting. In accordance with the present invention, equations as represented by the form of Equation 49 which appropriately render forms of discriminate reduction data processing by viable operations are not of prescribed form to be considered adept equations.

Relative Representation of Squared Deviations

Relative representation of squared deviations can be provided by multiplying all terms of a fitting function or corresponding approximating equation by any non-zero constant value. The resulting coefficient of the considered dependent variable function, or dependent variable, as represented with an explicit or approximating value, is referred to herein as a resolute, or a resolute coefficient of the dependent variable. Resolute coefficients may be represented by the value one or any other non-zero constant value, or they may be represented by approximating parameters which are considered to be pre-determined or established by represented restraints.

Assume a determined fitting function or characterized parametric equation to be of such a form as might be expressed by Equation 50, $$G = \left(\sum_{i=1}^{I} A_i F_i\right) + B, \quad (50)$$

with a corresponding approximative equation comprising I+2 non-zero terms as represented by Equation 51, $$G - \left(\sum_{i=1}^{I} A_i F_i\right) - B = 0, \quad (51)$$

wherein the variable parameter G represents a dependent variable, or a dependent variable function, with a resolute coefficient of one. The parameters $A_i$ and B of Equation 50 represent included approximating parameters or determined fitting parameters. The slanted parameters, $A_i$ and B, of Equation 51 represent undetermined fitting parameters, or approximative parameters; and the $F_i$ represent independent-variable-included term functions. (In accordance with this invention, independent-variable-included term functions are term functions which are either functions of independent variables or functions of both dependent and independent variables.)

Equation 50 may be expressed in the relative form of Equation 52 by respectively multiplying the entire fitting function or approximating equation by a constant value.

$$\sum_{i=1}^{I} P_i Q_i = 0, \quad (52)$$

Equation 51 may be represented by a corresponding approximative equation that is of the relative form expressed by Equation 53, $$\sum_{i=1}^{I} P_i Q_i = 0, \quad (53)$$

wherein the subscripts i distinguish each of i represented terms, which for this example, include approximative parameters that are either multiplied times unity or multiplied times correspondingly included term functions of the approximative equation. A resolute coefficient has not been designated in Equation 53. The $Q_i$ either represent included term functions or they represent unity in correspondence with included constant terms. Considering the more general applications, any of the Q, which represent functions, may also include imbedded (or nested) fitting parameters which are not explicitly obvious in Equations 50 through 53 as presented. Represented deviation functions, D, which establish parametric form for related approximation deviations as pertaining to this particular example and corresponding applications, are expressed by Equation 54.

$$D = \sum_{i=1}^{I} P_i Q_i. \quad (54)$$

Equation 54 might also be written to include first order corrections to pre-determined estimates for nested parameters. These first order corrections may be included as additional coefficients and be evaluated during a reduction, e.g.

$$\left(D = \sum_{i=1}^{I} P_i Q_i + \sum_{i=1}^{I} \Delta P_i \left(\frac{\partial D}{\partial P_i}\right)\right)\bigg|_{P_1\ldots P_I}.$$

Successive iterations with corresponding adjustments to the represented estimates may correspondingly diminish the corrections, e.g. $\Delta P_n$, and finalize approximating representation for the included nested parameters, $P_n$.

The approximation deviations, $v$, as expressed in terms of determined fitting parameters, P, are represented by Equation 55.

$$v = \sum_{i=1}^{I} P_i Q_i. \quad (55)$$

In accordance with the present invention, determined fitting parameters or correspondingly represented approximating parameters are fitting parameters whose values are either provided or are determined by imposed reduction restraints.

Assuming non-skewed uncertainty in the measured values of dependent and independent variables, an assumed appropriate parametric form for a corresponding sum of weighted squared deviations, $\xi$, as evaluated in correspondence with data (designated by the k subscripts) can be expressed by Equation 56.

$$\xi = \sum_{k=1}^{K} W_k D_k^2 = \sum_{k=1}^{K} W_k \left[\sum_{i=1}^{I} P_i Q_{i_k}\right]^2, \quad (56)$$

where N represents the number of independent data points. The $W_k$ is written with san serif type to indicate weighting coefficients which may be alternately represented or included in various forms. Equation 56 may be alternately written to provide representation for first order corrections to nested parameters as included coefficients which may also be evaluated, e.g.

$$\xi = \sum_{k=1}^{K} W_k D_k^2 = \sum_{k=1}^{K} W_k \left[ \sum_{i=1}^{I} P_i Q_{i_k} + \sum_{i=1}^{I} \Delta P_i \frac{\partial D_k}{\partial P_i} \bigg|_{P_1 \ldots P_I} \right]^2.$$

Explicit form for the sum of the squares of evaluated approximation deviations, $\in$, expressed in terms of the determined approximating parameters by Equation 57.

$$\varepsilon = \sum_{k=1}^{K} W_k v_k^2 = \sum_{k=1}^{K} W_k \left[ \sum_{i=1}^{I} P_i Q_{i_k} \right]^2. \quad (57)$$

CTM Weighting Coefficients

In accordance with the present invention, cross term minimizing (CTM) weighting coefficients are weighting coefficients that are included as coefficients of squared deviations in order to diminish sums of odd power error cross products that are inherently included in representing explicit form for the sum of unweighted squared deviations. Appropriate form for CTM weighting coefficients can sometimes be established by:

1. utilizing a Taylor series expansion to approximately represent the evaluated approximation deviations in terms of partial derivatives and represented error;
2. isolating terms which include odd powers of represented error; and
3. formulating weighting coefficients as coefficients which can be assumed to diminish the sums of said terms which include odd powers of represented error.

A first order Taylor series expansion of the evaluated approximation deviation, v, as evaluated in correspondence with a provided datum, $x_1, \ldots, x_N$ and expanded around assumed appropriate fundamental variables, $X_1, \ldots, X_N$, may be expressed by Equation 58.

$$v(X_1 + \Delta x_1, \ldots, X_N + \Delta x_N) \approx v(X_1, \ldots, X_N) + \sum_{\eta=1}^{N} \Delta x_\eta \frac{\partial v}{\partial X_\eta}. \quad (58)$$

Assuming that $(x_1, \ldots x_N) \approx (X_1 + \Delta x_1, \ldots X_N + \Delta x_N)$, and that $v(X_1, \ldots X_N)$ can be considered to vanish, then (for small error) Equation 57 can be written in the approximate form which is expressed by Equation 59.

$$\varepsilon \approx \sum_{k=1}^{K} W_k \left[ \sum_{\eta=1}^{N} \Delta x_{\eta k} \partial v / \partial X_\eta \bigg|_{x_{1k}, \ldots, x_{\eta k}} \right]^2. \quad (59)$$

By assuming homogeneous precision and by including the appropriate CTM weighting coefficients, $\omega_k$, the explicit form for the sum of the squares of evaluated approximation deviations can sometimes be expressed to diminish the odd power error cross terms. For two dimensional applications the expression will reduce to the form that is represented by Equation 60.

$$\varepsilon \approx \sum_{k=1}^{K} \omega_k \Delta x_{1k}^2 \left[ \left( \frac{\partial v}{\partial X_1} \right)^2 \right]_{x_{1k}, x_{2k}} + \quad (60)$$

$$\sum_{k=1}^{K} 2\omega_k \Delta x_{1k} \Delta x_{2k} \left[ \left( \frac{\partial v}{\partial X_1} \right) \left( \frac{\partial v}{\partial X_2} \right) \right]_{x_{1k}, x_{2k}} +$$

$$\sum_{k=1}^{K} \omega_k \Delta x_{2k}^2 \left[ \left( \frac{\partial v}{\partial X_2} \right)^2 \right]_{x_{1k}, x_{2k}}.$$

For a large number of data points with non-skewed error distributions, the sum of the odd power error cross terms can be assumed to vanish provided the included coefficients of said odd power error cross terms can be considered to be constant. A first order approximation for bivariate CTM weighting coefficients that will render said coefficients as constant is expressed by Equations 61, $$\omega_k \approx \frac{C}{\left| \left[ \left( \frac{\partial v}{\partial X_1} \right) \left( \frac{\partial v}{\partial X_2} \right) \right]_{x_{1k}, x_{2k}} \right|}, \quad (61)$$

wherein the included C may represent any arbitrary constant. In accordance with the present invention CTM weighting coefficients as expressed by Equations 61 represent a bivariate form of inverse deviation variation weighting. Corresponding precision normalized forms for said bivariate CTM weight factors, $\underline{\omega}$, may be expressed by including CTM precision weighting, $\omega$, as the inverse of a composite product comprising coordinate related components of precision uncertainty, $U_x$.

$$\underline{\omega}_k \equiv \omega_k \omega_k \approx \frac{C}{U_{x_{1k}} U_{x_{2k}} \left| \left[ \left( \frac{\partial v}{\partial X_1} \right) \left( \frac{\partial v}{\partial X_2} \right) \right]_{x_{1k}, x_{2k}} \right|}. \quad (62)$$

than two degrees of freedom also require that the sums of all odd power error cross terms of Equation 59 should be diminished. Approaches for CTM weighting coefficients which may be provided for more generating multi-variate CTM weighting coefficients may require considering and including uncertainty representations, comparatively selecting single cross term coefficients, or including only selective data samples. It may be convenient for some applications to represent two-variable CTM weighting coefficients as might be represented by assuming a form of two-variable inverse deviation variation weighting, $$\frac{1}{\left| \frac{\partial v}{\partial X_{\eta k}} \bigg|_{x_{1k}, \ldots, x_{Nk}} \right|},$$

by assuming error in only two represented independent variables, as for example might be represented by Equations 61 for multi-variate applications with considered errors only in the measured variables $x_1$ and $x_2$. Corresponding two-variable CTM weighting coefficients may be represented by Equations 63, $$\omega_k \approx \frac{C}{\left|\left[\left(\frac{\partial v}{\partial X_1}\right)\left(\frac{\partial v}{\partial X_2}\right)\right]_{x_{1k},\ldots,x_{Nk}}\right|}, \qquad (63)$$

or alternately written to include precision normalization as exemplified by Equations 64.

$$\omega_k \omega_k \approx \frac{C}{U_{x_{1k}} U_{x_{2k}} \left|\left[\left(\frac{\partial v}{\partial X_1}\right)\left(\frac{\partial v}{\partial X_2}\right)\right]_{x_{1k},\ldots,x_{2k}}\right|}. \qquad (64)$$

The two-variable CTM weighting coefficient as represented by Equations 63 or Equations 64 should compensate for uncertainty as restricted to the variables $x_{1k}$ and $x_{2k}$, in correspondence with the represented deviations. It will not provide for proportionate weighting of even power error cross terms, and it may not appropriately weight the functional variations of the deviations for more than two degrees of freedom. Generally the increased number of represented odd power error cross product terms will inhibit adequate formulation of CTM weighting coefficients for more than two dimensions. Higher order estimates of CTM weighting coefficients are similarly inhibited. Alternately, inverse deviation variation weighting may be represented for any number of included variables as might be represented in Equation 18, with the exception that coordinate related coefficients as implemented to represent inverse deviation variation weighting are not represented as the inverse of an evaluated derivative of a function deviation which is raise to a power of two.

Characteristic Form Iterations

A third problem to be considered in providing nonlinear forms of data reductions is related to higher order nonlinear distortions. Assuming the error distribution of the provided data can be appropriately represented, then the accuracy of a corresponding data reduction may be subsequently improved by implementing characteristic form iterations. Characteristic form iterations are implemented only after the initial estimates for the unknown parameters have been generated by the data processing system. In accordance with the present invention, characteristic form iterations will include the following steps:

1. storing initial estimates to provide both initial estimates and current approximations;
2. utilizing the represented current approximations to generate successive data simulations as characterized by the represented fitting function and a represented error distribution of assumed characteristic form;
3. storing the current approximations to represent stored values for previous approximations;
4. generating simulated estimates by processing said successive data simulations utilizing the same processing techniques that were implemented in generating the initial estimates;
5. computing new values for the current approximations as represented by the original initial estimates minus the simulated estimates plus the stored values for the previous approximations;
6. checking convergence by comparing the current approximations to said stored values for previous approximations; and
7. repeating steps 2 through 6 until a convergence criteria is satisfied.

For compatible reduction techniques, assuming that an appropriate fitting function has been selected and that error distributions have been accurately represented, the convergent values for current approximations as generated by characteristic form iterations may be represented as valid estimates for approximating parameters.

Nested Parameter Evaluating

A forth problem to be considered in providing nonlinear forms of data reductions is that of nested parameter evaluating. Fitting parameters may be represented as coefficients, or they may be imbedded or "nested" within represented term functions. Evaluating of fitting parameters that are included as an integral part of term functions may entail representing entire sets of independent equations along with any included base and subordinate residua, in highly sophisticated reduction processes; or alternatively, in accordance with the present invention, successive approximations of fitting parameters and corresponding formulation of represented residual sums may implement representation of increasingly accurate successive estimates of fitting parameters as characterized by parametric equations which include first order Taylor series representations of said residual sums which are expressed in terms of parametric estimates of differences between said successive approximations and said successive estimates. At least for simple applications convergence to a solution corresponding to initially provided estimates will generally occur within a few iterations. Some caution should be taken, as represented multiple-term equations comprising non-orthogonal term functions may characterize more than one solution set of fitting parameters.

Three Phases of Function Similation

In accordance with the present invention, there are three phases of function similation, which are:

1. effectuating preliminary forms of automated data processing and system configuring which represent functions, variables, and fitting parameters by functional components of a data processing system to be activated by logic control thereby representing generated form for at least one adept equation to be included in at least one set of independent equations for the evaluating of at least one fitting parameter in relative proportion with at least one other fitting parameter and in correspondence with data of a represented form; and establishing parametric form or numerical representation for any estimated residuum or residua which is to be included in said set of independent equations for said evaluating;
2. accessing information and effectuating a controlled automated evaluation of at least one fitting parameter in relative proportion with at least one other fitting parameter for characterizing at least one approximating equation in correspondence with said at least one set of independent equations, said set of independent equations including at least one adept equation as formulated in correspondence with provided data; and
3. generating product output as implemented to include a data representation of a variation which is represented in correspondence with generated form for at least one adept equation and controlled automated evaluation as provided in either phase 1 or phase 2, or provided by combined phases 1 and 2.

Phase 1

In accordance with the present invention, phase 1 of the process of function similation include the following two steps:

1. establishing form for an approximative equation (or represented fitting function) and representing logic-controlled correspondence to related functions, variables, and fitting parameters;
2. establishing means for specifying and implementing logic-controlled correspondence which will provide for the evaluating of fitting parameters in correspondence with represented data and representing form for said at least one adept equation to be included in said at least one set of independent equations.

Step 1 may involve automated means of selecting fitting functions or corresponding parametric equations, but will generally require independent research to determine appropriate approximative relationships. Once an approximative equation has been established, a provisional function generator may be configured to represent correspondingly included functions by operational code which will ready a function similation system for corresponding applications.

Step 2 involves constituting a data processing system which is implemented with means for providing inverse deviation variation weighting, and constituting means for representing at least one adept equation by functional components of said data processing system in correspondence with provided data.

In accordance with the preferred embodiment of the present invention, phase 1 of the process of function similation may also include any one or any combination of additional steps such as:

3. simulating an assumed error-free data representation corresponding to an established data form and a characterized parametric equation or fitting function in correspondence with assumed values for fitting parameters;
4. simulating an error-affected data representation by adding and subtracting increments which represent simulated errors to simulated and assumed error-free data;
5. generating numerical correspondence to candidate equation components and coefficients as represented by simulated error-free data and assumed values representing fitting parameters;
6. representing form for included candidate equation residua and correspondingly represented residuals;
7. evaluating and generating representation for the sums of simulated correspondingly weighted residuals and the sums of the absolute value of simulated correspondingly weighted residuals (as including numerical representation of candidate equation components and coefficients) in correspondence with represented error-free data;
8. establishing form for likely equations based upon results of evaluating;
9. selecting a set or sets of independent equations from likely equations based upon or considering results of evaluating or based upon maximum likelihood.

Steps 3 and 4 may involve formulating simulated error-free data and simulated error-affected data of a suggested form, or accessing representative or characteristic data and effectuating alternate forms of data processing or function simulation as provided by interactive data simulation systems and provisional simulation generators which may be included to respectively establish and represent corresponding form for simulated error-free data and simulated error-affected data.

Steps 4 and 5 may involve providing combinations of coefficients and factors to represent various alternate forms for approximating equations to provide selections of independent equations. Alternately, steps 4 and 5 may involve representing coefficients and factors solely to verify previously selected equations and to estimate included residua.

Step 7 involves evaluating sums of simulated correspondingly weighted residuals and sums of the absolute value of simulated correspondingly weighted residuals, and accessing or generating correspondence to estimates of pertinent partial derivatives of analytically represented function deviations, including partial derivatives of isolated term functions that may be represented in formulating weighting coefficients which are included in providing estimates for said sums.

Step 8 involves comparing results of evaluating to provided criteria in order to establish the validity of represented equations; step 8 may also involve accessing or generating correspondence to estimates of pertinent partial derivatives of analytically represented function deviations, including partial derivatives of isolated term functions that may be represented in formulating weighting coefficients which may be included in representing independent equation term functions; and step 8 may involve either evaluating constant estimates of residua or evaluating term functions of parametrically representing residua as formulated in correspondence with represented uncertainty to be included in the formulating of matrix equations.

Step 9 may involve establishing criteria for independent equation selecting or representing results of simulations as provided by steps 3 through 9 for interactive selecting of represented independent equations.

Phase 2

In accordance with the present invention, phase 2 of the process of function similation includes the following steps:

1. accessing a data representation;
2. generating estimates of functions as related to said data representation and as related to analytically represented function deviations corresponding to represented approximative equations;
3. generating representation of those weighting coefficients, which are to be included in generating form for representing independent equations so as to implement inverse deviation variation weighting in correspondence with provided data,
4. generating representation of evaluated correspondingly weighted independent equation term functions;
5. generating form for representing a set of said independent equations as represented by functional components of a data processing system.
6. generating a data representation comprising a plurality of proportionately represented fitting parameters as evaluated in correspondence with represented data and said a set of independent equations; said set of independent equations comprising at least one adept equation.

Phase 3

In accordance with the preferred embodiment of the present invention, phase 3 of the process of function similation will generate product output which is characterized by a data representation of variation which is represented in correspondence with an application and a controlled automated evaluation including the representing of at least one plurality of proportionately represented fitting parameters in correspondence with at least one represented adept equation.

Data Function Simulation Systems

A data function similation system is a data processing system comprising means for accessing and processing information whereby an approximating data representation is generated. In accordance with the present invention data function simulation systems are equipped to receive data and to provide steps of automated or semi-automated function simulation, thereby providing data reductions and means or media to transfer, store, display, or produce data representations that are assumed to be consistent with variations which are characterized by information being processed. Also, in accordance with the present invention, the included components and peripherals of a data function similation system may be interrelated in providing non-independent functional components of integral system parts.

Referring now to FIG. 1, the required complexity of a representative system is dependent upon the incoming (or available) information and the corresponding analytic or alternate form of the related approximative equation, as well as the considered form for product output. Appropriate approximative equations are generally determined by inherent characteristics of the data being processed. The top portion of FIG. 1 depicts the fundamental components of an adaptable data function similation system including an operator interface 1, a data function similator 2, an output device 3, an automated or interactive data simulation system 4 configured for providing forms of adept data processing, a display unit 5, and an optional peripheral interface 6.

The operator interface 1 provides for input commands and/or manual data entry as supported by the logic control system (LCS) of the data function similator 2. The data function similator (DFS) includes the central system control machine or device. The DFS provides for the cataloging, selecting, and resolving of systems of equations. Cataloging of preferred summed residual equation selections is provided to the output device 3. Utilizing operational logic, the DFS manipulates data in memory and controls operation of peripheral data reduction components and system(s), either directly or through an optional peripheral interface 6.

The interactive data simulation system 4 includes provision for an active interface between the operator and display unit 5. It provides for the selecting of fitting functions, analysis procedures, and weighting coefficients; and for processing of data, including comparative processing of minimizing and non-minimizing convergent and likelihood estimators as provided or alternately formulated to include adept equations. It also provides for accessing or generating of simulated data and characterizing error for characteristic form iterations and for comparison of simulations with typical or represented data which may be entered into the system via the operator interface 1, or via means which might be included as part of the interactive data simulation system 4, or via provided auxiliary equipment. Alternately, for some embodiments of the present invention, the interactive data simulation system 4 may be replaced by a completely automated system.

Auxiliary equipment may be included to provide additional options such as data retrieval, automatic analog or digital data throughput, and signal conditioning. Provided auxiliary equipment may be either hard wired, adapted to and connected, or attached through the optional peripheral interface 6. The lower portion of FIG. 1 depicts optional auxiliary equipment as including a digital input port 7, storage buffer 8 and modem 9, for information transfer, or automated digital data entry. The collator 10, provides certain forms of data base management including input data organizing, sample hold, and sorting prior to and/or during reduction. The input/output management system 11 is auxiliary equipment including provisions such as data retrieval, data representing, and/or data containment; providing options such as portable memory management, or enhanced forms of data-related display; and providing means to transfer data representation to or from media and/or to provide alternate forms of product output.

Figure 2:
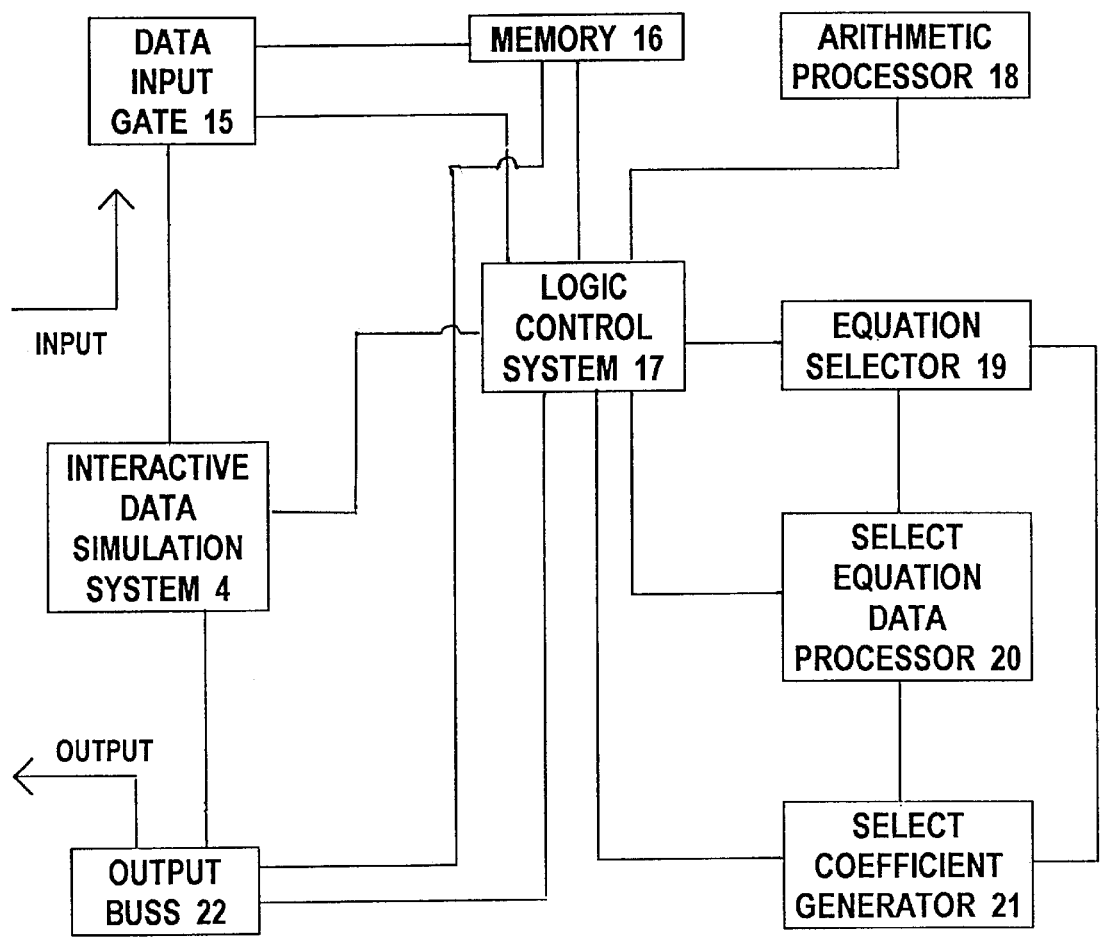
FIG. 2 depicts components which are typical of a data function similator in accordance with the present invention.

The included analog circuitry 12 and the represented analog to digital converter (or A to D converter 13) provide for input of analog information. The optional analog circuitry 12 may include alternate provisions for analog signal generating, signal conditioning, signal summing, adept-equation term function evaluating, noise simulating, and other forms of real time analog signal processing or preprocessing. Components of said analog circuitry 12 may include, means for generating and/or manipulating analog signals to provide weighting coefficients, means for multiplying analog signals, and means for integrating analog signals to represent sums that may be converted from analog to digital information and utilized by a digital system to estimate fitting parameters. A digital preprocessor 14 is also provided as may be utilized to transform digital data to a preferred form and/or determine coefficients and factors prior to data reduction by the DFS. With reference to FIG. 2, a data function similator is a data processing system comprising means for accessing and processing information, and comprising means for providing equation selecting and multipurpose data reduction in response to machine control signals from the LCS. The DFS provides for access to user designed, automatically generated and simulated, data which is assumed to be of a form to provide estimation for residual sums which are relatively comparable with residual sums which correspond to equation form and data that is to be analyzed. The DFS may also include direct or indirect access to operations of an automated or interactive data simulation system 4 which can be utilized for data processing as well as user design of and representation of simulated data.

FIG. 2 depicts the components of a data function similator 2, which is a data function similator including: a data input gate 15; a memory 16, a logic control system 17, an arithmetic processor 18, an equation selector 19, a select-equation data processor 20, a select coefficient generator 21, and an output bus 22.

For some embodiments of the present invention, incoming data, as representing variation, is passed through the data input gate into the memory, where it is acted upon, as represented and manipulated by the LCS and arithmetic processor. Estimated or provided derivatives or partial derivatives along with provided parameter estimates are incorporated and/or utilized to formulate coefficients and term functions. The provided data along with estimated or incoming coefficients are manipulated by arithmetic processing, which is activated by machine control signals from the LCS, to formulate corresponding sums, sums of products, matrices, and solution sets which provide estimates of fitting parameters. Successive approximations may be required as determined by the selection of independent equations.

For other embodiments of the present invention, represented variation as provided in analog form is passed through analog circuitry where it is combined with formulated analog coefficients, and generated function representations to provide integral sums which are utilized to estimate fitting parameters.

In accordance with the present invention, a logic control system is a combination of systems or functional items, a machine or composite of machines, or a provided data processing component such as a computer chip, circuitry, or device, any of which provides controls, directly, or indirectly by signals, which activate logic gate and/or switch control circuitry, to provide at least some functions of data processing which are related to equation representation and/or resolution. It may also provide control for the receipt and transfer of commands, initial estimates, and coded function definitions as may be required. The LCS is configured to effectuate sequential operation of functional components in compliance with operational design or command code which may be provided in the form of control-command logic such as binary code and/or integrated binary logic circuitry. In accordance with the present invention, the logic control system 17 is a logic control system which is configured to provide control to execute consecutively (or in order as designated) at least some steps that are essential to effectuate at least one represented phase of function similation.

The LCS (that is, the included logic control system) may be configured to effectuate evaluation of, products, sums, coefficients, and resultant fitting parameters. It may be configured by any method, which may include any, or any combination of, but is not limited to any of the following:

1. It may be constructed or manufactured to include printed or integrated binary logic circuitry or read only memory or facsimile which can provide the essential control-command logic.
2. It may be packaged with and connected to printed or integrated circuitry or read only memory or facsimile which can provide the essential control-command logic.
3. It may be provided with or connected to random access memory containing operational command code.
4. It may be configured by design to provide control as activated by physical means of automation.

Referring now to Appendices A through W, in accordance with the present invention, forms of control-command logic include operational command code which can be acted upon by a logic control system to provide corresponding control signals. Appendices A through W characterize exemplary provisions of control-command logic, expressed in QBASIC. Appendices A through K include numbers which refer to exemplary command code for effectuating processing steps which implement functions of correspondingly numbered components depicted in the figures.

Function similation is not restricted to include all or only these exemplary provisions, and included provisions are not restricted by the exemplary form of the QBASIC command code as presented in this disclosure.

These exemplary provisions can be readily adapted or used as type example to configure various state of the art logic control units or systems. They also provide sufficient description of the evaluation and reduction techniques to establish alternate forms of design for implementation of state of the art printed or integrated circuitry, computer chips or alternate provisions which may be utilized as or to configure logic control units or systems with control-command logic or direct controls to provide various steps of function similation. Included provisions of command code can also be supplied in the form of dedicated software or packaged in read only memory, and provided for independent logic control system configuring.

For reductions which require iteration, data are provided to an arithmetic processor where they are combined with selected coefficient estimates. Output from the arithmetic processor representing fitting parameters is evaluated by comparative manipulation as activated by machine control signals from the LCS. Represented values for updated estimates of fitting parameters and corresponding evaluated derivatives are cycled through the provided functional component processing. Considered iteration procedures are not limited to the solving of transcendental equations. They may also be used in the formulating of equations and representing of fitting parameters as established by a simulation system including estimation of base and/or subordinate residua.

Figure 3:
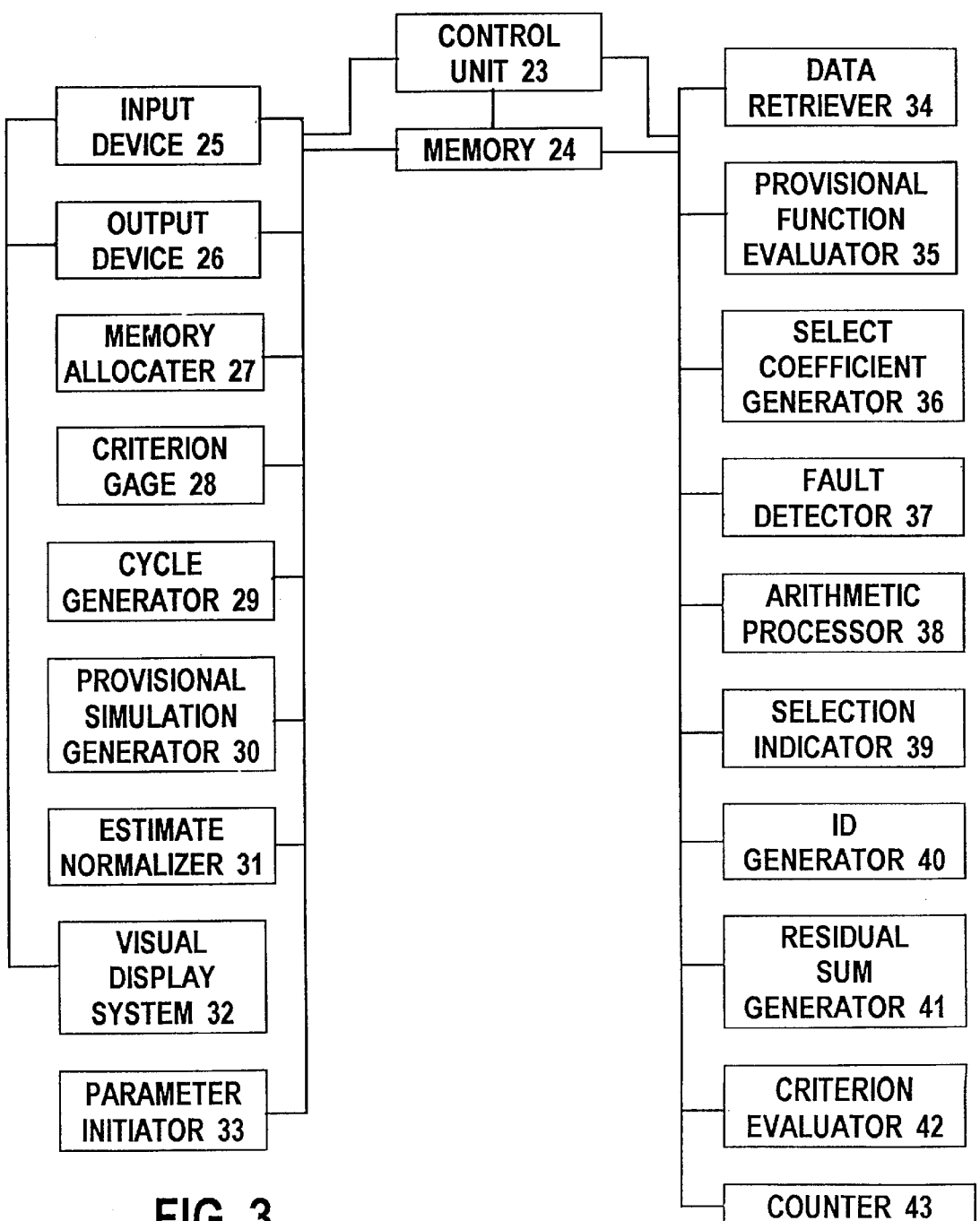
FIG. 3 depicts an equation selector comprising a control unit and functional components which are activated by logic control in accordance with the present invention.

Referring now to FIG. 3 with corresponding reference being made to Appendix A, in accordance with the present invention, a residual equation selector is a data processing system with means for accessing and processing simulated or characteristic data whereby a data representation of estimated residua can be generated in correspondence with a set of estimated (or representative) fitting parameters and corresponding data, thereby establishing representative form for corresponding independent equations.

FIG. 3 depicts an equation selector 19, which is a summed residual equation selector comprising a control unit 23 and functional components which are activated by logic control including:

1. memory 24 for containing data and providing data storage;
2. an input device 25 providing means for accessing pertinent information;
3. an output device 26 providing means for information transfer;
4. a memory allocator 27 providing memory management;
5. a criterion gage 28 to establish candidate equation validity;
6. a cycle generator 29 providing for repetitive operations;
7. a provisional simulation generator 30 which may include a fully automated or an interactive data simulation system, for providing simulated data;
8. an estimate normalizer 31 provided to normalize estimated numerical representation on selected coefficients or sums;
9. a visual display system 32 providing for display of represented and/or simulated data;
10. a parameter initiator 33 provided to prepare allocated memory for specific parameter evaluating;
11. a data retriever 34 providing for the retrieval of simulated data;
12. a provisional function evaluator 35 as included to effectuate the evaluation of provisional functions and corresponding derivatives and/or partial derivatives;
13. a select coefficient generator 36, which is a select coefficient generator that is configured for generating candidate weighting coefficients to provide base residual weighting;
14. a fault detector 37 for indicating intermittent coefficient generating or indicating fault in the data or reduction process;
15. an arithmetic processor 38 providing for the addition, multiplication, and/or summation of pertinent parameters and products;
16. a selection indicator 39 for establishing equation selection;
17. an ID generator 40 for generating equation identifiers;
18. a residual sum generator 41 for generating equation-related residual sums;
19. a criterion evaluator 42 for selecting candidate equations;

20. a counter 43 for counting likely candidate equations.

In accordance with the preferred embodiment of the present invention operations characterizing the functional components of the equation selector 19 are included and provided by a data function simulation system; and inter-related automation of the represented functional components is provided by control-command logic. An example of command code providing control-command logic for activating functional components of a digital summed residual equation selector is provided in Appendix A. In this example functions of the control unit 23 are provided by a DFS multipurpose logic control system which effectuates operations for a plurality of functional components and establishes active system control, initializing an output device, activating and allocating memory, setting selection criterion, accessing and cycling through multiple data simulations, effectuating equation verification, and providing select-equation Residua Estimation as including the following steps:

1. Registers containing parameter estimates are subjected to operations of an estimate normalizer 31 whereby said parameter estimates are normalized on the coefficient of the dependent variable and stored for access by the residual sum generator 41.
2. The visual display system 32, or system display unit, is activated to provide visual display of the simulated data.
3. Operations of a parameter initiator 33, as represented by the logic control system, are activated to initiate memory registers for parameter computations.
4. The cycle generator 29, as provided by the logic control system, is set to repeat specified process steps for each simulated data point.
5. The data retriever 34 or an information transfer gate consecutively retrieves simulated data corresponding to each repeat cycle (first for represented error-free data then for error-affected data).
6. The provisional function evaluator 35, which may require provisional or generated command code implementation, is activated to effectuate the evaluation of represented functions and derivatives corresponding to each simulated datum and corresponding repeat cycle. (The fault detector 37 may be set by the provisional function evaluator 35 to indicate fault or to specify intermittent coefficient generating.)
7. The select coefficient generator 36 is activated to generate representation for base residual weighting coefficients for each repeat cycle. (The fault detector 37 may be set by the select coefficient generator 36 to identify intermittent coefficient generating.)
8. The fault detector 37 is checked for indication of fault or intermittent coefficient generating.
9. The arithmetic processor 38, or an arithmetic processor as may be provided by the DFS, is activated to sum represented residuals, absolute values of residuals, residual weighting coefficients, and evaluated term functions, over each repeat cycle in order to generate a data representation of characteristics for base equation selecting.
10. The cycle generator 29, as represented by the logic control system, provides for repeat of step 4 through step 9 for each datum.
11. The selection indicator 39, as represented by allocated memory, is set to specify a default base equation selection.
12. A data representation of characteristics for base equation selecting is provided to the output device 26.
13. A default base equation selection representation corresponding to the selection indicator 39 is stored in allocated memory 24.
14. A data representation of characteristics for subordinate equation selecting is initiated on the output device 26.
15. The cycle generator 29 is set to repeat specified processing steps for each subordinate equation form, and corresponding combination of coefficients, and term functions.
16. The ID generator 40 is activated to generate an ID for each combination of coefficients and term functions as might be represented by a subordinate equation.
17. The residual sum generator 41 is activated to generate estimated residua corresponding to each subordinate equation.
18. Likely equations are selected by activating the criterion evaluator 42 to select equations whose sum of correspondingly weighted residuals and whose sum of absolute value of correspondingly weighted residuals will significantly vanish when evaluated for error-free data as established by the criterion gage 28. (Step 18 is omitted from cycles corresponding to represented error-affected data.)
19. The counter 43, provided as allocated memory, is activated for cycles which correspond to represented error-free data to maintain a count of the number of likely candidate equations. For cycles corresponding to represented error-affected data, the counter 43 is checked to determine the amount of remaining storage before including additional information.
20. A data representation of characteristics for subordinate equation selecting is provided to the output device 26.
21. The cycle generator 29 provides for repeat of step 15 through step 20 for each subordinate equation form, and corresponding combination of coefficients, and term functions.
22. The cycle generator 29 provides for repeat of step 1 through step 21 for both simulated error-free data and as many simulated error-affected data sets as may be provided.

Figure 4:
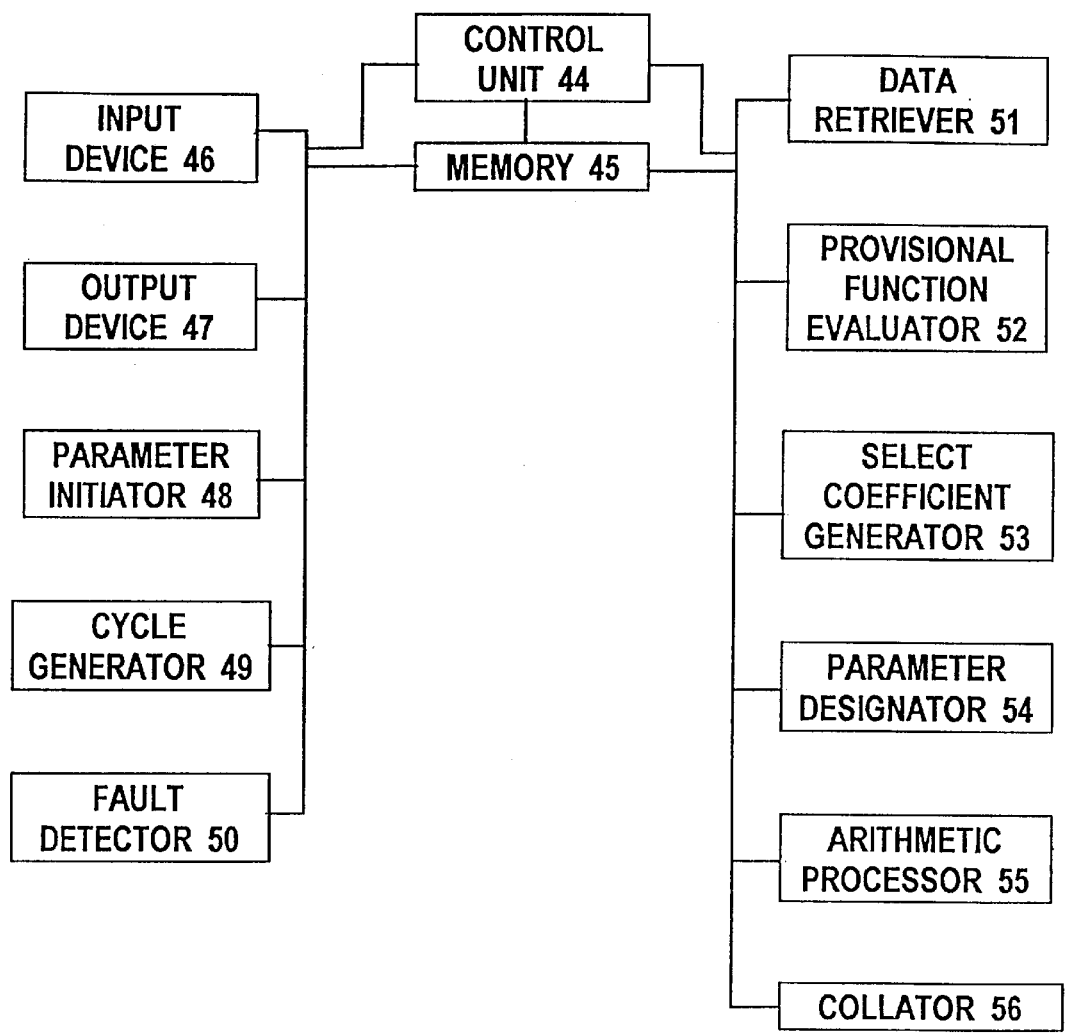
FIG. 4 depicts a residual sum generator comprising a control unit and functional components which are activated by logic control in accordance with the present invention.

Referring now to FIG. 4 with corresponding reference being made to Appendix B, in accordance with the present invention, a residual sum generator is a select-equation residuum estimation system with means for accessing and processing simulated data whereby a data representation of estimated residua can be generated in correspondence with a set of assumed values for fitting parameters and at least some of said simulated data.

FIG. 4 depicts a residual sum generator 41, which is a residual sum generator comprising a control unit 44 and functional components which are activated by logic control, including:

1. a memory 45 for containing data and providing data storage;
2. an input device 46 providing means for accessing pertinent information;
3. an output device 47 providing means for information transfer;
4. a parameter initiator 48 provided to prepare allocated memory for specific parameter evaluating;
5. a cycle generator 49 providing for repetitive operations;
6. a fault detector 50 for indicating intermittent coefficient generating or indicating fault in the data or reduction process;

7. a data retriever 51 providing for the retrieval of simulated data;
8. a provisional function evaluator 52 as included to effectuate the evaluation of provisional functions and corresponding derivatives;
9. a select coefficient generator 53, which is a select coefficient generator that is configured for generating candidate weighting coefficients;
10. a parameter designator 54 to include candidate coefficients and factors;
11. an arithmetic processor 55 providing for the addition, multiplication, and/or summation of pertinent parameters and products;
12. a collator 56 to assemble equation selections.

Considering embodiments of a residual sum generator as configured to provide the sum of correspondingly weighted residuals as represented by sums of evaluated residual term functions multiplied by characteristic fitting parameters, information as related to each generated cycle and corresponding datum is provided via an input device 46 and data retriever 51 where it is acted upon by the provisional function evaluator 52, a parameter designator 54, and an arithmetic processor 55 to represent dependent and independent residual term functions which are combined with weighting coefficients by included multiplication operators as may be supplied by the arithmetic processor 55, and summed (or proportionately summed) for each generated cycle to represent subordinate and base equation term functions. Represented term functions are then combined by multiplication with assumed representative fitting parameters and summed to provide representation of base and/or subordinate equation residua which may be collated for consideration and/or utilized in providing select equations and effectuating corresponding data processing. There is advantage in first formulating the sums of residual term functions thus providing evaluations which are similar to the term function evaluations as may be included in select-equation data processing. Alternately, represented residual term functions may be initially combined with said assumed representative fitting parameters and then summed as evaluated residuals to provide representation of base and/or subordinate equation residua.

In accordance with the preferred embodiment of the present invention all operations characterizing the functional components of a residual sum generator 41 are included and provided by a data function similation system; and interrelated automation of the represented functional components is provided by control-command logic. An example of command code providing control-command logic for activating functional components of a digital residual sum generator is listed in Appendix B. In accordance with the example provided in Appendix B, functions of the control unit 44 are provided by the DFS multipurpose logic control system which effectuates operations for a plurality of functional components and establishes active system control, initializing the output device, manipulating allocated memory 45, activating and accessing provisional data simulations, retrieving and cycling through simulated data, and effectuating residual sum evaluation as including the following steps:

1. The parameter initiator 48 is activated to initiate provided memory registers for parameter computations.
2. The cycle generator 49 is set to repeat specified process steps for each simulated data point.
3. The fault detector 50 is preset for continued evaluating.
4. The data retriever 51 consecutively retrieves simulated data corresponding to each repeat cycle (first for represented error-free data then for error-affected data).
5. The provisional function evaluator 52 is activated to effectuate the evaluation of represented functions and derivatives corresponding to each simulated datum and corresponding repeat cycle. (The fault detector 50 may be set by the provisional function evaluator 52 to specify intermittent coefficient generating or to indicate fault.)
6. The select coefficient generator 53 is activated to generate representation for residual weighting coefficients to be included as subordinate residual weighting for each repeat cycle. (The fault detector 50 may be set by the select coefficient generator 53 to identify intermittent coefficient generating.)
7. The fault detector 50 is checked for indication of intermittent coefficient generating or fault.
8. Candidate weighting coefficients are consigned to registers by a parameter designator 54 to be acted upon by logic control.
9. Combinations of term functions, term-related coefficients, and residual coefficients are consigned to registers by the provided parameter designator 54.
10. Evaluations are initiated by the parameter initiator 48.
11. Represented numerical correspondence to sums of subordinate residuals and term functions are evaluated by the arithmetic processor 55 as provided by the DFS.
12. The cycle generator 49 provides for repeat of step 2 through step 11 for each datum.
13. Selection criteria is evaluated by the provided arithmetic processor 55. (For this example, sums as represented for comparison are normalized on sums of absolute values of evaluated terms.)
14. Selected equation IDs and included selection criteria are collated and provided in accessible form to the equation selector.

Also, in accordance with the present invention, estimated residua may be generated and represented or approximately represented in estimated or parametric form by evaluating sums of represented Taylor series terms or sums of factors of represented Taylor series terms, which comprise even ordered partial derivatives of related function deviations as evaluated in correspondence with provided or simulated data, and by either representing said sums as including simulated or actual error or by representing said sums of factors along with coefficients which may include or represent mean values for even powers of simulated or actual error.

For some embodiments of this invention, parameters which may be included to provide parametric form for proportionately estimated residue, may be represented in a correspondingly sized set of independent equations and evaluated along with represented fitting parameters as provided by corresponding forms of adept data processing.

Figure 5:
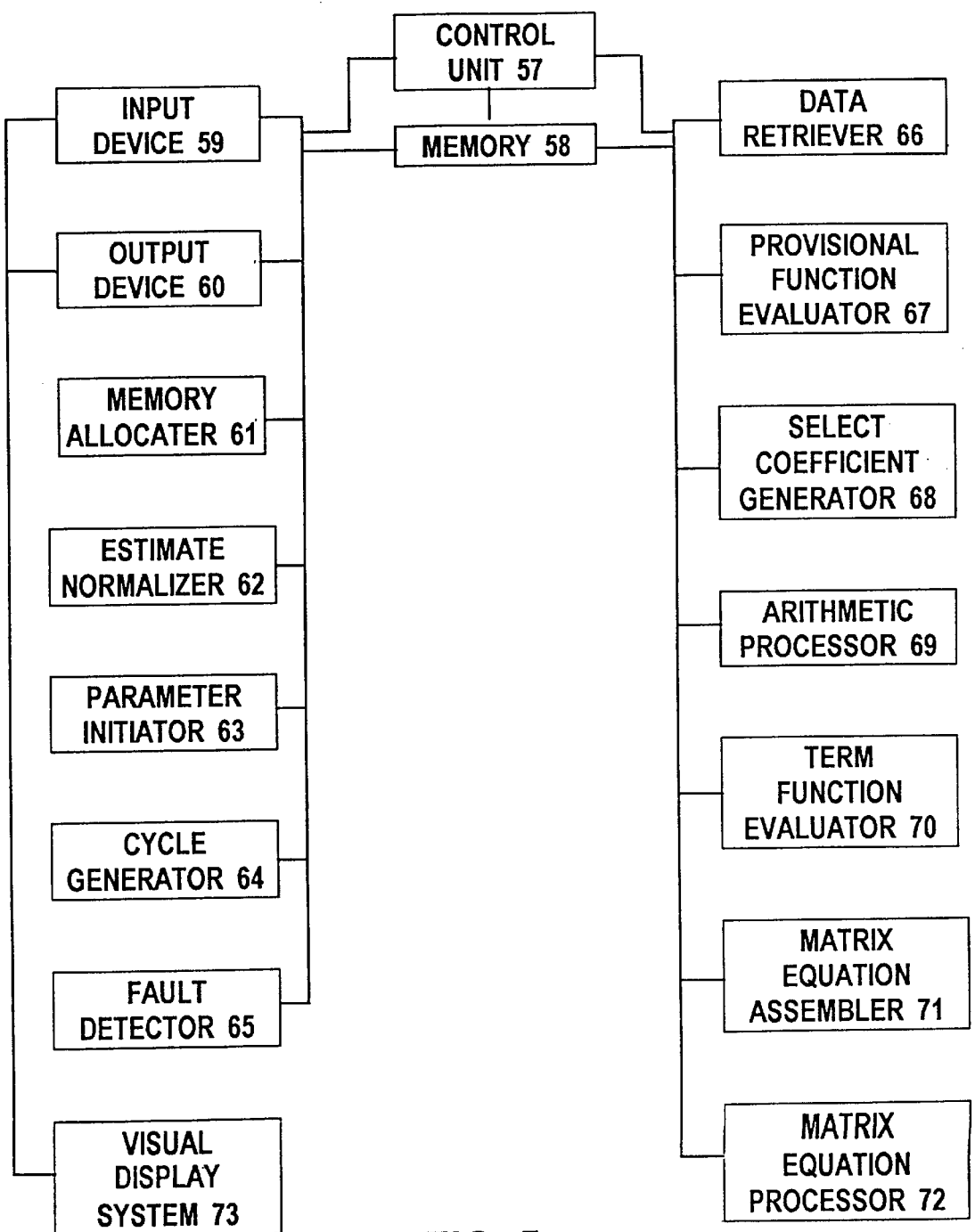
FIG. 5 depicts a select-equation data processor comprising a control unit and functional components which are activated by logic control in accordance with the present invention.

Referring now to FIG. 5 with corresponding reference being made to Appendix C, in accordance with the present invention, a the depicted data processor is a select-equation data processor which is configured for providing term function evaluations and multiple equation resolution, comprising means for accessing and processing information whereby a data representation is generated by the method comprising:

1. establishing correspondence between at least one fitting parameter and said information;

2. representing a set of independent equations by controlled mechanism, at least one of which said independent equations is an adept equation;

3. generating a data representation as provided by evaluating said at least one fitting parameter.

FIG. 5 depicts a select-equation data processor 20, which is a data processor which is configured for evaluating both base equation and subordinate equation term functions, comprising a control unit 57 and functional components which are activated by logic control, including:

1. a memory 58 for containing data and providing data storage;
2. an input device 59 providing means for accessing pertinent information;
3. an output device 60 providing means for information transfer;
4. a memory allocator 61 providing memory management;
5. an estimate normalizer 62 provided to normalize estimated numerical representation on a selected coefficient or sum;
6. a parameter initiator 63 provided to prepare allocated memory for specific parameter evaluating;
7. a cycle generator 64 providing for repetitive operations;
8. a fault detector 65 for indicating intermittent coefficient generating or indicating fault in the data or reduction process;
9. a data retriever 66 providing for the retrieval of available data;
10. a provisional function evaluator 67 as included to effectuate the evaluation of provisional functions and corresponding derivatives;
11. a select coefficient generator 68, which is a select coefficient generator that is configured and implemented for generating base residual weighting coefficients;
12. an arithmetic processor 69 providing for the addition, multiplication, and/or summation of pertinent term functions, parameters, and products;
13. a term function evaluator 70, which is a term function evaluator for evaluating term functions of subordinate equations;
14. an equation matrix assembler 71 to set matrix equation elements into allocated memory;
15. a matrix equation processor 72 for solving matrix equations;
16. a visual display system 73, and/or interactive data simulation system, providing for display of data representations.

Information as related to each generated cycle and corresponding datum is provided via an input device 59 and data retriever 66 where it is acted upon by a provisional function evaluator 67 or function generation system to represent fitting function or corresponding approximating equation residual term functions which are combined with weighting coefficients by included multiplication operators as may be supplied by the arithmetic processor 69, and summed to represent subordinate and base equation term functions. The resulting represented term functions are then subjected to operations of the equation matrix assembler 71 whereby they are assembled along with provided residua to represent a matrix equation and then subjected to operations as provided by the matrix equation processor 72 to generate a corresponding data representation.

In accordance with the preferred embodiment of the present invention operations characterizing the functional components of the select-equation data processor 20 are included and provided by a data function simulation system; and inter-related automation of the functional components is provided by control-command logic. An example of command code providing control-command logic for activating functional components of a select-equation data processor as implemented to provide adept equation data processing is listed in Appendix C. In the example provided in Appendix C functions of the control unit 57 are provided by the DFS multipurpose logic control system which effectuates operations for a plurality of functional components and establishes active system control, allocating parameter storage, initializing the output peripherals, activating and allocating memory, interpreting selection criterion, cycling through representative data, and effectuating corresponding data manipulation as including the following steps:

1. Parameter estimates are subjected to operations of an estimate normalizer 62 whereby they are normalized on the coefficient of the dependent variable and stored for access by the term function evaluator 70.
2. The parameter initiator 63 is activated to initiate memory registers for parameter computations.
3. The cycle generator 64, as implemented by the logic control system, is set to repeat specified process steps for each represented data point.
4. The fault detector 65 is preset for continued evaluating.
5. The data retriever 66 consecutively retrieves represented data corresponding to each repeat cycle.
6. The provisional function evaluator 67 is activated by implementing provisional or generated command code to effectuate the evaluating of represented functions and derivatives corresponding to each represented datum and corresponding repeat cycle. (The fault detector 65 may be set by the provisional function evaluator 67 to specify intermittent coefficient generating or detected fault.)
7. The select coefficient generator 68 is activated to generate representation for base residual weighting coefficients for each repeat cycle. (The fault detector 65 may be set by the select coefficient generator 68 to identify intermittent coefficient generating.)
8. The fault detector 65 is checked for indication of intermittent coefficient generating or fault.
9. The arithmetic processor 69, as may be provided by the DFS, is activated to sum represented base equation residual weighting coefficients, and evaluated base equation term functions, over each repeat cycle.
10. The cycle generator 64, as represented by the logic control system, provides for the repeat of steps 3 through 9 for each represented datum.
11. The cycle generator 64 is set to repeat specified processing steps for each subordinate equation.
12. Subordinate equation term functions are evaluated as provided by operations of a term function evaluator 70.
13. The cycle generator 64, as represented by the logic control system, provides for the repeat of steps 11 and 12 for each subordinate equation.
14. Memory is allocated, by operations of a memory allocator 61, for matrix equation array storage.
15. Operations of an equation matrix assembler 71 are activated to assemble equation matrices.
16. Operations of a matrix equation processor 72 are effectuated to evaluate and represent relative values for fitting parameters.

17. Representation for relative values for fitting parameters are subjected to operations of an estimate normalizer 62 whereby they are normalized on the coefficient of the dependent variable and provided via an output device 60 to a visual display system 73 as a data representation of variation.

Alternatively, in accordance with the present invention, considering embodiments of a select-equation data processor as configured for real time data reduction, certain functional components might be provided in the form of analog circuitry. For example, the cycle generator 64, providing repeat of processing steps corresponding to each datum, might be replaced by analog integration circuitry. The fault detector 65 might be replaced by intermittent generating of analog weighting coefficients by circuitry which provides for grounding or alternate representing of analog weighting coefficients in correspondence with cutoff signal levels. The data retriever 66 would provide access to analog information. The provisional function evaluator 67 might be configured to provide real time analog signal conditioning. The select coefficient generator 68 might be an analog select coefficient generator which would directly generate time dependent analog voltage signals in corresponding proportion to coefficient magnitudes; and the term function evaluator might be configured to represent term functions as integrated analog sums.

Figure 6:
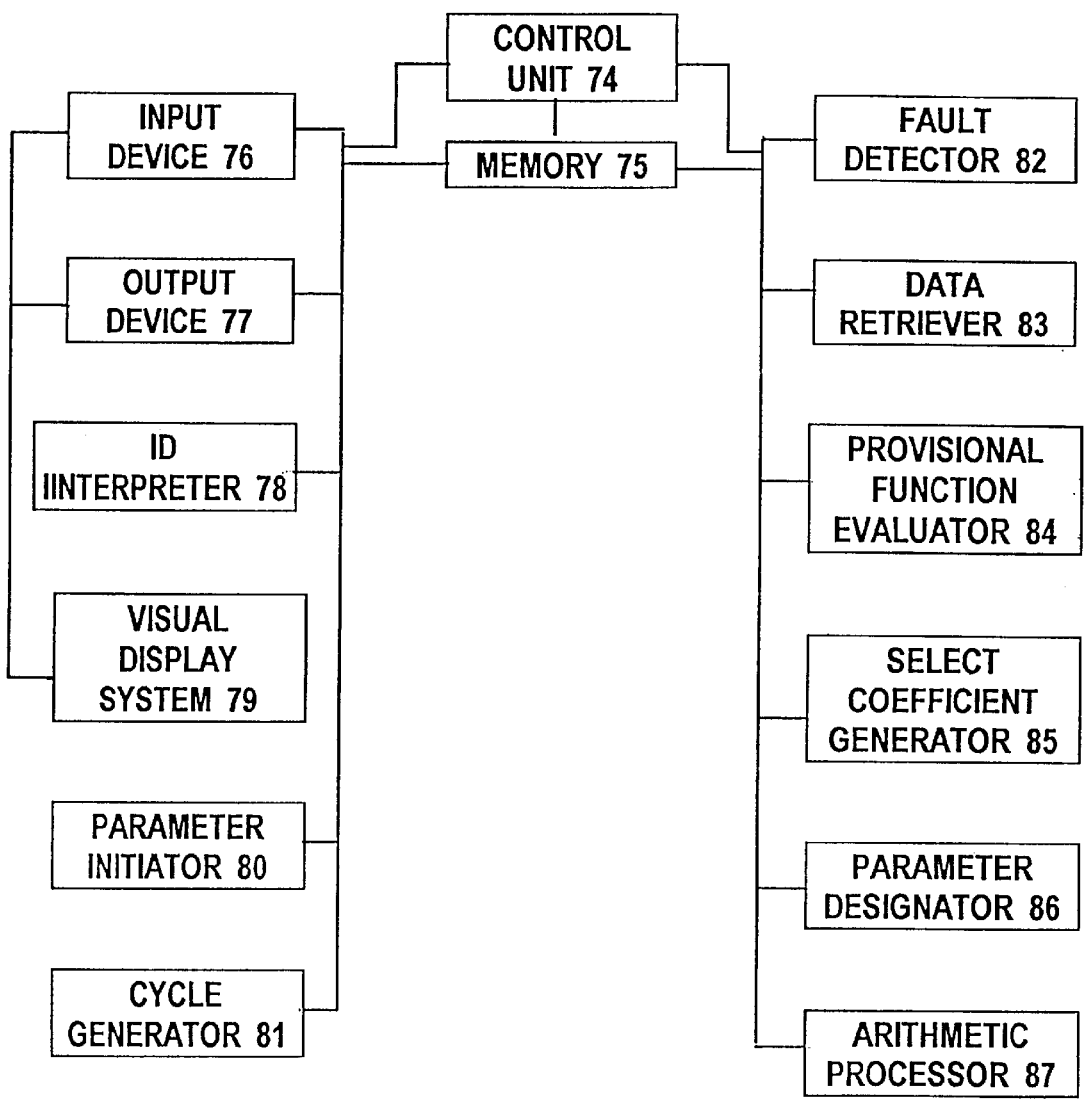
FIG. 6 depicts a term function evaluator comprising a control unit and functional components which are activated by logic control in accordance with the present invention.

Referring now to FIG. 6 with corresponding reference being made to Appendix D, in accordance with the present invention, a term function evaluator is a device or machine, or a composite system, comprises means for generating at least one estimated term function. FIG. 6 depicts a term function evaluator 70, which is a residual-equation term function evaluator comprising a control unit 74 and functional components which are activated by logic control, including:

1. a memory 75 for containing data and providing data storage;
2. an input device 76 providing means for accessing pertinent information;
3. an output device 77 providing means for information transfer;
4. an ID Interpreter 78 for relating selected IDs to likely equation selections;
5. a visual display system 79 and/or interactive data simulation system, providing for display of data representations;
6. a parameter initiator 80 provided to prepare allocated memory for specific parameter evaluating;
7. a cycle generator 81 providing for repetitive operations;
8. a fault detector 82 for indicating intermittent coefficient generating or providing an indication of fault in the reduction process or data;
9. a data retriever 83 providing for the retrieval of available data;
10. a provisional function evaluator 84 as included to effectuate the evaluation of provisional functions and corresponding derivatives;
11. a select coefficient generator 85, which is a select coefficient generator, configured and implemented for providing residual weighting coefficients for subordinate residual weighting;
12. a parameter designator 86 to designate subordinate residual coefficient candidates;
13. an arithmetic processor 87 for providing automated arithmetic algorithms for use in the evaluating of term functions.

In accordance with the preferred embodiment of the present invention all operations characterizing the functional components of a term function evaluator 70 are included and provided by a data function simulation system; and interrelated automation of the represented functional components is provided by control-command logic. An example of command code providing control-command logic for activating functional components of a digital term function evaluator as implemented to provide residual-equation term function evaluation is listed in Appendix D. In accordance with the example provided in Appendix D, functions of the control unit 74 are provided by the DFS multipurpose logic control system which effectuates operations for a plurality of functional components and establishes active system control, initializing an (output device, manipulating allocated memory 75, activating and accessing provisional data simulations, retrieving and cycling through simulated data, and effectuating the evaluation of term functions as including the following steps:

1. Operations of an ID Interpreter 78 are executed to establish or define corresponding form for independent equations.
2. Equation form is provided for review to the visual display system 79.
3. The parameter initiator 80 is activated to initiate provided memory registers for term function evaluating.
4. The cycle generator 81 is set to repeat specified process steps for each provided datum.
5. The fault detector 82 is preset to indicate continued evaluating.
6. The data retriever 83 consecutively retrieves represented data corresponding to each repeat cycle.
7. The provisional function evaluator 84 is activated to effectuate the evaluation of represented functions and derivatives corresponding to each datum and corresponding repeat cycle. (The fault detector 82 may be set by the provisional function evaluator 84 to specify intermittent coefficient generating or to indicate fault in the data or reduction system.)
8. The select coefficient generator 85 is activated to generate representation for residual weighting coefficients to be included as subordinate residual weighting for each repeat cycle. (The fault detector 82 may be set by the select coefficient generator 85 to indicate intermittent coefficient generating.)
9. The fault detector 82 is checked for indication of intermittent coefficient generating or fault.
10. Candidate coefficients are consigned to registers by a parameter designator 86 to be acted upon by logic control.
11. Combinations of term functions, term-related coefficients, and residual coefficients are consigned to registers by the provided parameter designator 86.
12. Represented numerical correspondence to the residual term factors are generated corresponding to each datum and summed by the arithmetic processor 87 as provided by the DFS.
13. The cycle generator 81, as represented by the logic control system, provides for the repeat of steps 4 through 12 for each represented datum.

In accordance with the present invention for real time data reductions, evaluated independent-term functions of a represented independent equation which corresponds to a time dependent fitting function can either be represented in digital form as evaluated time-dependent integrals of represented residual term functions, or be generated in analog form as analog signals which represent integrated sums of residual term functions with time dependence corresponding to that of the incoming real time data. Hence, operations of the term function evaluator 70 as considered for real time data reductions may be provided to include various and combined forms of analog and digital data manipulating, either representing evaluated independent-term functions as simulated analog representations or as evaluated time-dependent integrals. The cycle generator 81, the fault detector 82, the data retriever 83, the provisional function evaluator 84, the select coefficient generator 85, and certain functions of the arithmetic processor 87 as represented by a digital system can be replaced with analog counterparts which are consistent with said real time data reductions.

Figure 7:
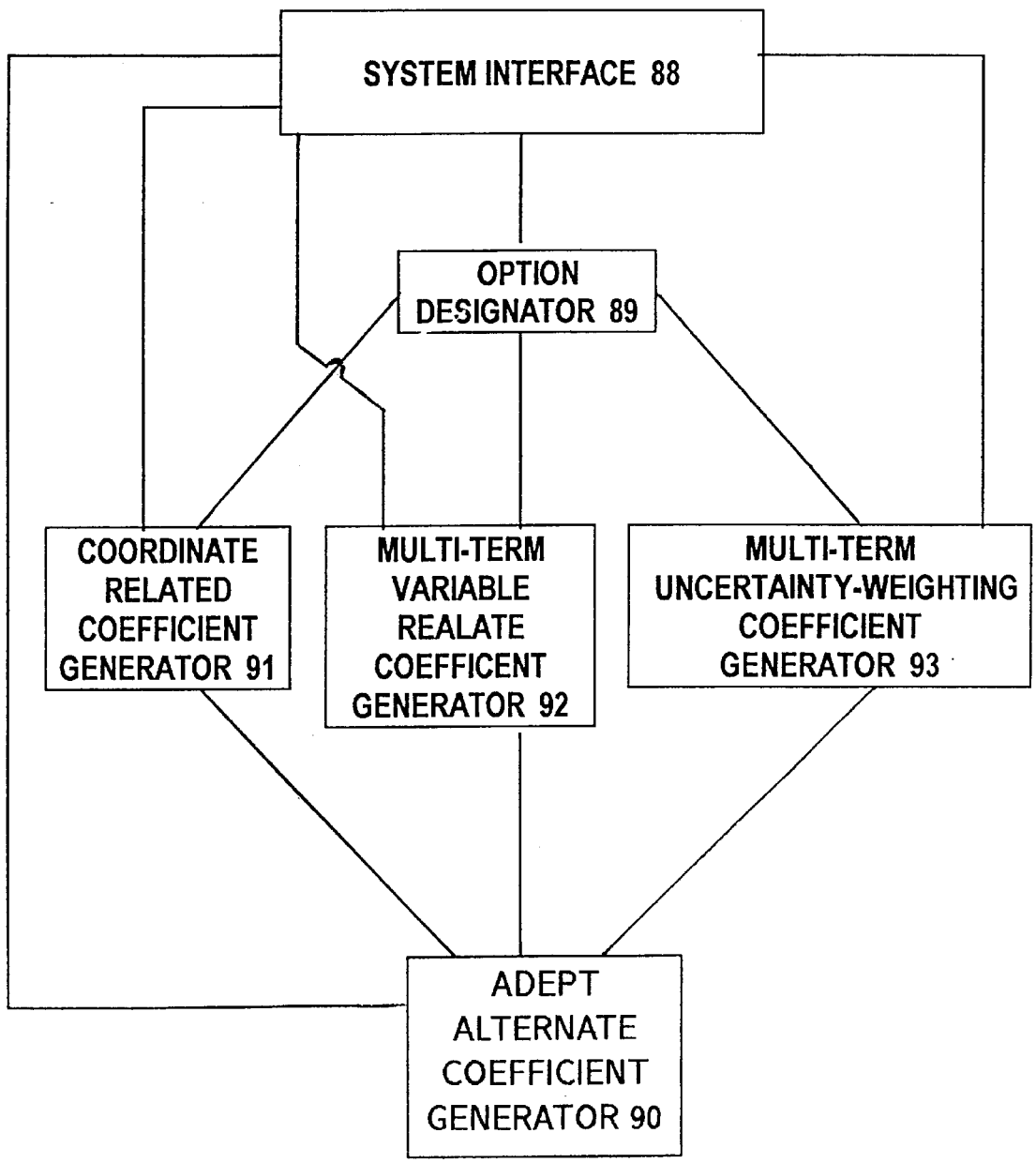
FIG. 7 is a block diagram illustrating typical system components being included by a select coefficient generator in accordance with the present invention.

Referring now to FIG. 7, in accordance with the present invention, weighting proportions designate the weight to be applied to each addend as included in a represented sum. Weighting coefficients are proportionately represented coefficients (or weighting proportions) that are either: 1. represented as multipliers of, or 2. multiplied times the addends of a sum in order to provide weighting of said addends as might be included in said sum. In accordance with the present invention these two forms of weighting coefficients are distinguished by implementation.

Inverse deviation variation weighting is represented, in accordance with the present invention, by weighting coefficients of at least one of these two distinct forms, which are:

1. weighting coefficients that are residual weighting coefficients, which are distinguished by being multiplied times residual term functions which are summed to represent base or subordinate equation term functions, or are summed to represent residua in the formulating of summed residual equations as herein defined, and
2. weighting coefficients (referred to also as weight factors) that are implemented as implied squared residual weighting which characterize multipliers of squared residuals, but which are actually residual weighting coefficients which are squared and multiplied by term functions of derivatives or partial derivatives of represented said squared residuals in formulating sets of equations by alternate methods as included by forms of maximum likelihood estimators and alternate forms of regression and conformal analysis.

A weighting coefficient generator comprises means for providing analog and/or digital representation of weighting coefficients. It may be a device, or a machine or a composite system providing the operations necessary to produce said analog and/or digital representation of weighting coefficients. It may be a self contained analog and/or digital system or unit, a computer chip, or it may be a multipurpose system or machine providing the same operations. Said operations may be instantaneous, prolonged, continuous, or intermittent. Said operations may be provided by means including the following: They may be incorporated by a preprocessing element included as a part of provided analog circuitry, or they may be included as part of a digital preprocessor, or more often, for simple digital applications, the operations are provided by a digitally controlled system, acting upon representative measure (as estimated, generated, evaluated, or provided) establishing numerical representation for weighting coefficients in correspondence with analytic or alternate form as characterized by represented differential change, uncertainty, or both represented differential change and uncertainty.

Weighting coefficients in analog form may be directly generated as provided by a form of appropriately configured analog signal generator or indirectly as provided by means of analog circuitry acting upon a provided or generated analog signal. For certain applications when the representation of weighting coefficients, as defined, would require division by zero intermittent generating of said weighting coefficients may be provided. Intermittent generating of weighting coefficients may include methods of skipping and methods of substituting to provide correspondence for zero or an alternate value in the stead of values for weighting coefficients that are not represented. Weighting coefficient generators which comprise means for intermittent generating of weighting coefficients may also comprise means for indicating said intermittent generating or providing corresponding intermittent generating of other weighting coefficients which may be included in the formulating of other independent equations of a single set of independent equations.

Also, in accordance with the present invention, the plurality of weighting coefficients as represented in a single sum of weighted addends, should all have the same sign, be it positive or negative. A weighting coefficient generator may include means of insuring that each weighting coefficient in each such said plurality of weighting coefficients does indeed have the same sign.

The idea of employing absolute value operators for generating transformation weight factors of a same sign, has been previously implemented in the conceived form of a final stage discriminate rectifier. (ref. L. Chandler, ibid.).

Consider the following statements of information:

1. Transformation weight factors are coordinate related coefficients comprising transformation weight factor coordinate normalizing proportions which are implemented specifically for representing the implied weighting of squared deviations in discriminate reduction data processing, or similarly as in discriminate reduction data processing. Said transformation weight factor coordinate normalizing proportions, can be defined as proportionately represented weighting coefficient which are generated as substantially corresponding in proportion to the inverse of the absolute value of estimated differential variation which is raised to a power of two divided by the number of pertinent degrees of freedom, said number of pertinent degrees of freedom corresponding to the number of included fundamental variables, said differential variation representing change in represented function deviations (or represented approximation deviations) as considered with respect at least one said fundamental variable, said differential variation being evaluated in correspondence with provided data (ref. L. Chandler, ibid.)
2. Operations which are peculiar to the prescribed operations of a final stage discriminate rectifier include the generating of at least one data representation of at least one transformation weight factor coordinate normalizing proportion by accessing and processing information which establishes representative measure for at least one derivative, and subjecting said representative measure to operations including absolute value rectification, whereby represented numerical correspondence to said derivative is effectively converted to represent at least one positive value, said at least one positive value, within said processing accuracy, substantially corresponding to the absolute value of the inverse of said derivative being raised to a power other than two (ref. Claim 11, U.S. Pat. No. 5,619,432).

A final stage discriminate rectifier, as considered in prescribed form, may be implemented as a single component for providing alternate means for generating certain coordinate related coefficients; however, in accordance with the present invention, said coordinate related coefficients may be generated or implemented in a variety of ways that are not peculiar to the prescribed operations of a final stage discriminate rectifier. For example:

1. they may be generated by operations which do not include steps of absolute value rectification;
2. they may be generated by operations which do not establish positive numerical correspondence (including or excluding positive correspondence to the inverse of a represented derivative being raised to a power of two);
3. they may be implemented to provide forms of residual weighting as considered in accordance with the present invention;
4. they may comprise means for generating and including effective variance or the square root of effective variance.

In accordance with the present invention, Alternate procedures for representing a plurality of weighting coefficients of the same sign include:

1. assuming data to be described by fitting functions which, in accordance with the present invention, characterize a same sign for each weighting coefficient of said plurality of weighting coefficients without need for further improvising;
2. assuming data to be described by fitting functions which characterize a same sign for each weighting coefficient of said plurality of weighting coefficients, and in accordance with the present invention, providing operations for checking the sign and providing means for aborting the reduction in case of change sign;
3. employing "negafying" arithmetic operations, in accordance with the present invention, in the generating of at least one negative weighting coefficient of said plurality of weighting coefficients;
4. employing operations which involve raising numbers to even powers, in accordance with the present invention, in order to establish positive values which can be operated on by exponential operators to generate each weighting coefficient of said plurality of weighting coefficients with a same sign.

A select coefficient generator is a coefficient generator comprising means for means for providing either residual weighting or implied squared residual weighting. In accordance with the present invention, a select coefficient generator may be comprised of a single component, or a composite system of components as implemented to generate representation for one or more forms of weighting coefficients. FIG. 7 illustrates exemplary system components being included independently in a select coefficient generator 21, which is a select coefficient generator including a system interface 88, an option designator 89, an adept alternate coefficient generator 90, a coordinate related coefficient generator 91, a multi-term variable related coefficient generator 92, and a multi-term uncertainty-weighting coefficient generator 93.

In accordance with the preferred embodiment of the present invention, the system interface 88 provides for input, output, and system interface between a select coefficient generator and operation control. The option designator 89 provides means for specifying the formulating and/or implementing of weighting coefficients. The adept alternate coefficient generator 90 provides alternate or modified forms for representing weighting coefficients for providing inverse deviation variation weighting. The coordinate related coefficient generator 91 provides means for representing forms of coordinate related coefficients. The multi-term variable related coefficient generator 92 provides means for representing forms of multi-term variable related coefficients; and the multi-term uncertainty-weighting coefficient generator 93 provides means for representing forms of multi-term uncertainty-weighting coefficients.

In accordance with the present invention, a term typifying coefficient is a weighting coefficient which is comprised of at least one term-related proportion. Both multi-term variable related coefficients and multi-term uncertainty-weighting coefficients are considered herein as term typifying coefficients, each representing at least one respective term-related proportion. Preferred forms of multi-term variable related coefficients represent composite products of term-related-coordinate normalizing proportions for providing residual weighting whereby each variable as individually represented in any single term of an approximative equation (or represented fitting function) may be represented by an included term-related-coordinate normalizing proportion. Validity of adept equations which are formulated utilizing preferred multi-term variable related coefficients is established in correspondence with coordinate normalizing form for multivariate representation and assumed similarity between fitting functions which represent multiple inclusions of a single variable and fitting functions which hypothetically represent identical data which are represented by a plurality of included identically represented variables. Multi-term variable related coefficients may be considered hypothetically to replicate represented form for a plurality of identically represented variables.

Preferred forms of multi-term uncertainty-weighting coefficients represent composite products of term-related-coordinate normalizing proportions for providing residual weighting whereby each variable term of an approximative equation (or represented fitting function) may be correspondingly represented by a normalizing proportion which is related to estimates of term uncertainty. Validity may be established for multi-term uncertainty-weighting coefficients which represent term-related-normalizing proportions of single variable term functions.

Represented proportions of variable-related and term-related weighting as herein disclosed may (but seldom need to) include exponentially corresponding reciprocal representation of variable precision uncertainty as, for example, may be provided with implementation of residual weighting as illustrated in Appendices E, G, and I.

Still referring to FIG. 7, the option designator 89 is provided means for designating form and/or implementing procedures for generating and/or implementing weighting coefficients. It may be a system which implemented with a configured choice. It may be an included machine or device configured for generating or implementing a specific form of weighting coefficient. It may be a configured logic control system or unit, or the LCS of a data function similation system. It may be a configured processing system or a data representation designating a specific selection in correspondence with an operator interface or a selected choice. It may comprise the components of a select coefficient generator and include means of generating weighting coefficients and processing data as well as providing options for and designating said generating. In accordance with the present invention, a select coefficient generator my be represented as including only one or any combination of components as depicted in FIG. 7 and FIG. 8.

Figure 8:
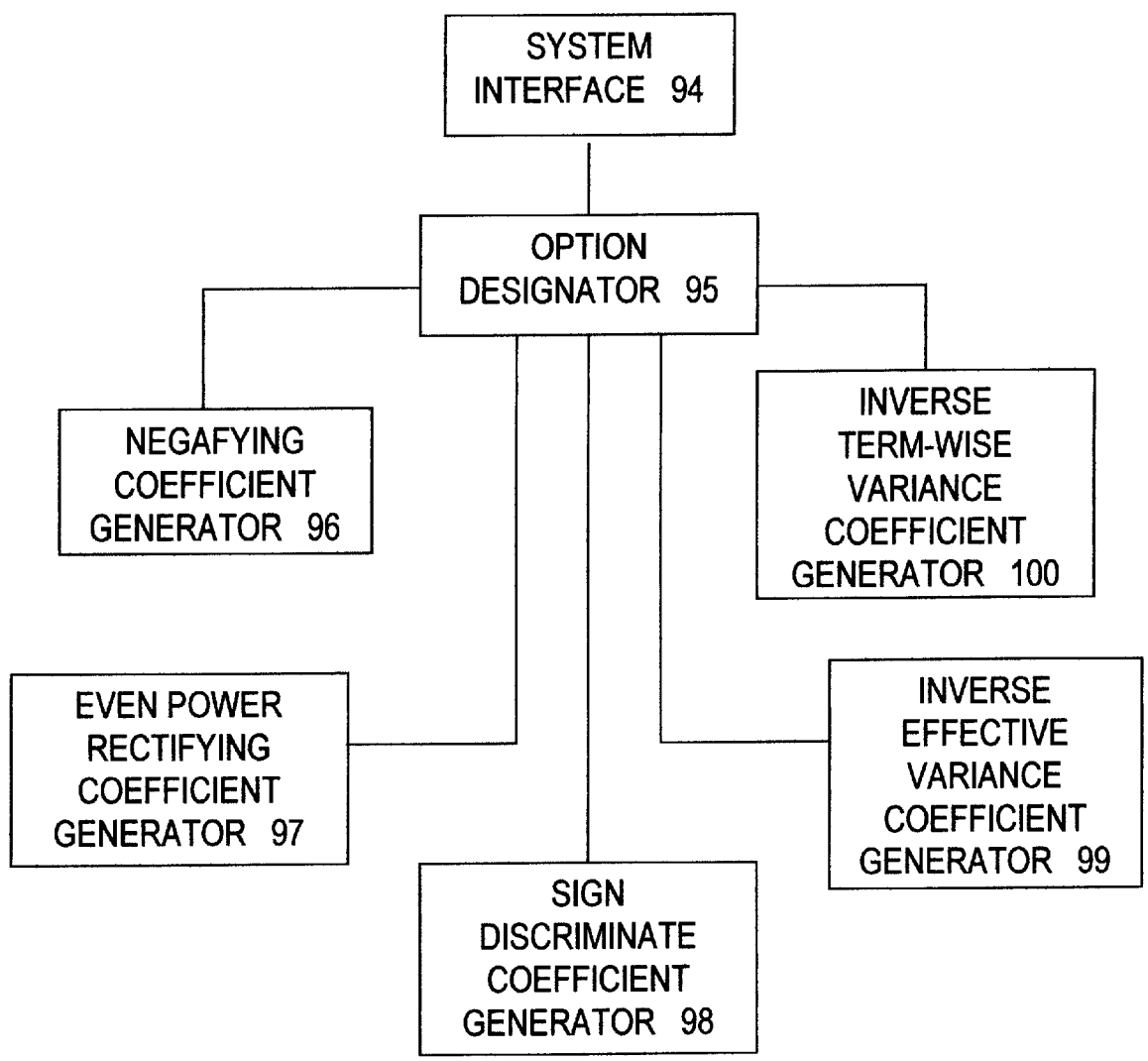
FIG. 8 is a block diagram illustrating typical system components being included by an adept alternate coefficient generator in accordance with the present invention.

Referring now to FIG. 8, The adept alternate coefficient generator provides for either or both the generating of or the implementing of weighting coefficients by means which include representing at least one distinct reduction procedure, that is not peculiar to the prescribed operations of a final stage discriminate rectifier, said adept alternate coefficient generator is a weighting coefficient generator or processing system comprising means which are configured for representing information and executing procedures whereby automated generating of representation for at least one weighting coefficient can be effectuated, said representation for at least one weighting coefficient being implemented in providing at least one form of inverse deviation variation weighting, said means for representing information and executing procedures comprising at least one of the following sequentially numbered provisions:

1. means for accessing and processing information whereby representation of at least one coordinate related coefficient can be implemented for providing residual weighting, said means including means for implementing said providing, said means being configured for implementing said providing;

2. means for accessing and processing information, whereby representation of at least one negative coordinate related coefficient can be generated in correspondence with at least one derivative, said representation of at least one negative coordinate related coefficient being generated by means comprising accessing at least some said information which establishes representative measure for said derivative, and subjecting said representative measure to operations which are limited solely to operations in which represented numerical correspondence to said derivative is not effectively converted to represent positive value during said operations, said means including means for generating said negative coordinate related coefficient, said means being configured for providing said generating;

3. means for accessing and processing information, whereby representation of at least one negative coordinate related coefficient can be generated in correspondence with at least one derivative, said representation of at least one negative coordinate related coefficient being generated by means including accessing at least some information which establishes representative measure for said derivative, and subjecting said representative measure to operations which are limited solely to operation, in which represented numerical correspondence to said derivative is not converted to represent positive value, other than positive value corresponding to the inverse of said derivative being raised to a power of two (during said operations), said means including provision for representing said coordinate related coefficient as substantially corresponding in proportion to the absolute value of the inverse of evaluated said derivative being raised to a power other than two said means including means for generating said negative coordinate related coefficient, said means being configured for providing said generating;

4. means for accessing and processing information, whereby representation of at least two coordinate related coefficients can be generated in correspondence with at least two evaluations for a represented derivative, said derivative being a variable dependent non-zero partial derivative of a represented function deviation, said derivative taken with respect to said variable, said representation of at least two coordinate related coefficients being generated by means including accessing at least some information which establishes representative measure for said evaluations, and subjecting said representative measure to operations whereby represented numerical correspondence to said evaluations is effectively converted to represent said at least two coordinate related coefficients as having the same sign, said operations not including any forms of absolute value rectification, said means including provision for representing said coordinate related coefficients as substantially corresponding in proportion to the absolute value of the inverse of said evaluations being raised to a power other than two, said means including means for generating said at least two coordinate related coefficients, said means being configured for providing said generating;

5. means for accessing and processing information whereby representation of at least one coordinate related coefficient can be generated in correspondence with at least one derivative and is subsequently implemented as implied squared residual weighting, said representation of at least one coordinate related coefficient being generated by means including accessing at least some information which establishes representative measure for said derivative, said derivative being a variable dependent non-zero partial derivative of a represented function deviation, said derivative taken with respect to said variable, said variable being included in more than a single isolated term of said function deviation, said implied squared residual weighting being implemented in representing a determinate set of independent equations, said implied squared residual weighting being implemented by a processing system that is configured for evaluating at least three non-resolute fitting parameters in correspondence with said determinate set of independent equations by viable operations, said viable operations providing for the evaluating of fitting parameters that do not correspond to minimized sums of weighted squared deviations, and said means including provision for representing said coordinate related coefficient as substantially corresponding in proportion to the value of the inverse of evaluated said derivative being raised to a power other than two, said means including means for generating said coordinate related coefficient, said means being configured for providing said generating;

6. means for accessing and processing information whereby representation of the inverse of at least one effective variance or the inverse of the square root of at least one effective variance can be represented and combined as a cofactor with at least one coordinate related coefficient for representing said at least one weighting coefficient, said means being configured for providing said representing;

7. means for accessing and processing information whereby representation of at least one multi-term variable related coefficient can be implemented for providing residual weighting, said means including means for implementing said providing, said means being configured for implementing said providing;

8. means for accessing and processing information whereby representation of at least one multi-term variable related coefficient can be generated, said means including provisions for generating said term multi-term variable related coefficient in correspondence with a variable that is included in more than a single isolated term function of a represented function deviation, said means being configured for implementing said generating;

9. means for accessing and processing information whereby representation of the inverse of at least one effective variance or the inverse of the square root of at least one effective variance can be generated and combined as a cofactor with at least one multi-term variable related coefficient for representing said at least one weighting coefficient, said means being configured for providing said representing.

10. means for accessing and processing information, whereby representation of at least one weighting coefficient can be generated as an element of, and in corresponding proportion with at a plurality of weighting coefficients, said plurality of weighting coefficients substantially corresponding in proportion to the absolute value of the inverse of evaluated derivatives being raise to a power, said derivatives being variable dependent non-zero derivatives or variable dependent non-zero partial derivatives of plurality of terms of a represented function deviation taken with respect to said variable, said variable being included in each term of said plurality of terms, said variable being included in at least one additional term of said function deviation, said means including provisions for generating said weighting coefficient in correspondence with said variable, said means including means for implementing said generating, said means being configured for implementing said generating; Means, which are provided by an adept alternate coefficient generator for representing information, executing procedures, and effectuating automated generating of weighting coefficient representations, are not limited to digital applications. They may also be implemented for analog applications. Said means for representing information, executing procedures, and effectuating said generating, as considered in correspondence with analog applications, may include correspondingly represented provisions such as the following.

1. analog circuitry for generating a plurality of coordinate related coefficients as represented by an analog signal, wherein said at least one weighting coefficient is a coordinate related coefficient which is represented by the measure of said analog signal corresponding to a single point in time, and wherein said plurality of coordinate related coefficients are represented by corresponding measures of said analog signal, and whereby said analog signal is implemented in providing residual weighting, 2. analog circuitry for generating a plurality of negative coordinate related coefficients as represented by an analog signal, wherein said at least one weighting coefficient is a negative coordinate related coefficient which is represented by the measure of said analog signal corresponding to a single point in time, and wherein said plurality of negative coordinate related coefficients are represented by corresponding "negafied" measures of said analog signal, and whereby said analog signal may be generated For application other than residual weighting, said analog circuitry comprising a quantity "negafier", said representation of at least one negative coordinate related coefficient being generated by means including accessing at least some said information which establishes representative measure for at least one derivative and and subjecting said representative measure to operations which are limited solely to operations in which represented numerical correspondence to said derivative is not effectively converted to positive value during said operations, said negative coordinate related coefficient being generated in correspondence with said derivative;

3. analog circuitry for generating a plurality of term typifying coefficients as represented by an analog signal, wherein said at least one weighting coefficient is a term typifying coefficient which is represented by the measure of said analog signal corresponding to a single point in time, and wherein said plurality of term typifying coefficients are represented by corresponding measures of said analog signal, and whereby said analog signal is implemented in providing residual weighting;

4. analog circuitry for generating a plurality of term typifying coefficients as represented by an analog signal, wherein said at least one weighting coefficient is a term typifying coefficient which is represented by the measure of said analog signal corresponding to a single point in time, and wherein said plurality of term typifying coefficients are represented by corresponding measures of said analog signal, and whereby said analog signal may be generated for applications other than residual weighting, and means for representing said term typifying coefficient in correspondence with a variable that is included in more than a single isolated term function of a represented function deviation.

FIG. 8 depicts an adept alternate coefficient generator 90 as comprising a system interface 94, an option designator 95, a "negafying" coefficient generator 96, an even power rectifying coefficient generator 97, a sign discriminate coefficient generator 98, an inverse effective variance coefficient generator 99, and a inverse term-wise variance coefficient generator 100

In accordance with the present invention, the "negafying" coefficient generator 96 employs "negafying" arithmetic operations for generating negative weighting coefficients without generating related positive numerical correspondence. The even power rectifying coefficient generator 97 employs operations which involve raising numbers to even powers, in order to establish positive values which can be operated on by exponential operators to generate weighting coefficients with a same sign without including absolute value operations. The sign discriminate coefficient generator 98 provides weighting coefficients for the assumed condition that an appropriate sign for each weighting coefficient is naturally represented by the form of the approximative relationship and corresponding data. The sign discriminate coefficient generator may abort operations when encountering inappropriately represented change in coefficient signs. The inverse effective variance coefficient generator 100, provides for the generating of the inverse effective variance or for the generating of the root inverse effective variance for implementation as a cofactor with coordinate related or multi-term variable related weighting coefficients.

In accordance with the present invention, the verb "negafy" is here defined for clarity to mean "directly convert to negative representation without representing corresponding positive representation." The word "negafying" is the considered gerund form of the verb, and the word "negafied" is the conjugated past tense of the verb, which can be represented also as an adjective implying a condition resulting from a previous act of "negafication" as effectuated by the considered process of negafying.

In accordance with the present invention, Adept weighting coefficients provide for implementing forms of inverse deviation variation weighting. An adept weighting coefficient is a weighting coefficient or a composite product of coefficients which establishes relative weighting as an element of and in corresponding proportion with a plurality of weighting coefficients, substantially corresponding in proportion to the absolute value of evaluated derivatives being raised to a negative power other than a negative power of two, said derivatives being variable dependent non-zero derivatives or variable dependent non-zero partial derivatives of at least one term of a represented function deviation taken with respect to said variable.

In accordance with the present invention, an alternately represented adept weighting coefficient is a weighting coefficient or a composite product of coefficients which establishes relative weighting as an element of and in corresponding proportion with at least one of the following:

1. a plurality of residual weighting coefficients, substantially corresponding in proportion to the absolute value of the inverse of evaluated derivatives being raised to a power, said derivatives being variable dependent non-zero derivatives or variable dependent non-zero partial derivatives of a represented function deviation taken with respect to said variable;
2. a plurality of residual weighting coefficients, substantially corresponding in proportion to the absolute value of the inverse of evaluated derivatives, said derivatives being variable dependent non-zero derivatives or variable dependent non-zero partial derivatives of a represented function deviation taken with respect to said variable;
3. a plurality of negative weighting coefficients, substantially corresponding in proportion to the absolute value of the inverse of evaluated derivatives being raised to a power, said derivatives being variable dependent non-zero derivatives or variable dependent non-zero partial derivatives of a represented function deviation taken with respect to said variable;
4. a plurality of negative weighting coefficients, substantially corresponding in proportion to the absolute value of the inverse of evaluated derivatives, said derivatives being variable dependent non-zero derivatives or variable dependent non-zero partial derivatives of a represented function deviation taken with respect to said variable;
5. a plurality of weighting coefficients, substantially corresponding in proportion to the absolute value of the inverse of evaluated derivatives being raised to a power other than two, said derivatives being variable dependent non-zero derivatives or variable dependent non-zero partial derivatives of a represented function deviation taken with respect to said variable, said weighting coefficients being generated by means that do not include operations of absolute value rectification;
6. a plurality of weighting coefficients, substantially corresponding in proportion to the absolute value of the inverse of evaluated derivatives, said derivatives being variable dependent non-zero derivatives or variable dependent non-zero partial derivatives of a represented function deviation taken with respect to said variable, said weighting coefficients being generated by means that do not include operations of absolute value rectification;
7. a plurality of weighting coefficients, substantially corresponding in proportion to the absolute value of the inverse of evaluated derivatives being raise to a power other than two, said derivatives being variable dependent non-zero derivatives or variable dependent non-zero partial derivatives of a represented function deviation taken with respect to said variable, said inverse as raised to said power being combined by multiplication with representation for the inverse of an effective variance;
8. a plurality of weighting coefficients, substantially corresponding in proportion to the absolute value of the inverse of evaluated derivatives, said derivatives being variable dependent non-zero derivatives or variable dependent non-zero partial derivatives of a represented function deviation taken with respect to said variable, said inverse being combined by multiplication with representation for the inverse of an effective variance;
9. a plurality of residual weighting coefficients, substantially corresponding in proportion to the absolute value of the inverse of evaluated derivatives being raised to a power, said derivatives being variable dependent non-zero derivatives or variable dependent non-zero partial derivatives of a represented function deviation taken with respect to said variable, said inverse as raised to said power being combined by multiplication with representation for the inverse of the square root of an effective variance;
10. a plurality of weighting coefficients, substantially corresponding in proportion to the absolute value of the inverse of evaluated derivatives being raised to a power, said derivatives being variable dependent non-zero derivatives or variable dependent non-zero partial derivatives of at least one isolated term function of a represented function deviation, said derivatives taken with respect to a variable that is included in a plurality of non-proportional terms of said function deviation;
11. a plurality of weighting coefficients, substantially corresponding in proportion to the absolute value of the inverse of evaluated derivatives, said derivatives being variable dependent non-zero derivatives or variable dependent non-zero partial derivatives of at least one isolated term function of a represented function deviation, said derivatives taken with respect to a variable that is included in a plurality of non-proportional terms of said function deviation;
12. a plurality of residual weighting coefficients, substantially corresponding in proportion to the absolute value of the inverse of evaluated derivatives being raised to a power, said derivatives being variable dependent non-zero derivatives or variable dependent non-zero partial derivatives of at least one isolated term function of a represented function deviation taken with respect to said variable;
13. a plurality of residual weighting coefficients, substantially corresponding in proportion to the absolute value of the inverse of evaluated derivatives, said derivatives being variable dependent non-zero derivatives or variable dependent non-zero partial derivatives of at least one isolated term function of a represented function deviation taken with respect to said variable;
14. a plurality of negative weighting coefficients, substantially corresponding in proportion to the absolute value the of inverse of evaluated derivatives being raised to a power, said derivatives being variable dependent non-zero derivatives or variable dependent non-zero partial derivatives of at least one isolated term function of a represented function deviation taken with respect to said variable;
15. a plurality of negative weighting coefficients, substantially corresponding in proportion to the absolute value the of inverse of evaluated derivatives, said derivatives being variable dependent non-zero derivatives or variable dependent non-zero partial derivatives of at least one isolated term function of a represented function deviation taken with respect to said variable;

16. a plurality of weighting coefficients, substantially corresponding in proportion to the absolute value the of inverse of evaluated derivatives being raised to a power other than two, said derivatives being variable dependent non-zero derivatives or variable dependent non-zero partial derivatives of at least one isolated term function of a represented function deviation taken with respect to said variable, said weighting coefficients being generated by means that do not include operations of absolute value rectification;

17. a plurality of weighting coefficients, substantially corresponding in proportion to the absolute value the of inverse of evaluated derivatives, said derivatives being variable dependent non-zero derivatives or variable dependent non-zero partial derivatives of at least one isolated term function of a represented function deviation taken with respect to said variable, said weighting coefficients being generated by means that do not include operations of absolute value rectification;

18. a plurality of weighting coefficients, substantially corresponding in proportion to the absolute value the of inverse of evaluated derivatives being raised to a power other than two, said derivatives being variable dependent non-zero derivatives or variable dependent non-zero partial derivatives of at least one isolated term function of a represented function deviation taken with respect to said variable, said inverse as raised to said power being combined as multiplied with representation for the inverse of an effective variance;

19. a plurality of weighting coefficients, substantially corresponding in proportion to the absolute value the of inverse of evaluated derivatives, said derivatives being variable dependent non-zero derivatives or variable dependent non-zero partial derivatives of at least one isolated term function of a represented function deviation taken with respect to said variable, said inverse being combined as multiplied with representation for the inverse of an effective variance;

20. a plurality of residual weighting coefficients, substantially corresponding in proportion to the absolute value the of inverse of evaluated derivatives being raised to a power other than two, said derivatives being variable dependent non-zero derivatives or variable dependent non-zero partial derivatives of at least one isolated term function of a represented function deviation taken with respect to said variable, said inverse as raised to said power being combined as multiplied with representation for the inverse of the square root of an effective variance;

21. a plurality of residual weighting coefficients, substantially corresponding in proportion to the absolute value the of inverse of evaluated derivatives being raised to a power said derivatives being variable dependent non-zero derivatives or variable dependent non-zero partial derivatives of plurality of terms of a represented function deviation taken with respect to said variable, said variable being included in each term of said plurality of terms, said variable being included in at least one additional term of said function deviation.

In accordance with the present invention being raised to a power means being raised to any represented exponential power, be it whole number or fraction, positive or negative, rational or irrational, real or imaginary. Substantially corresponding is assumed to connote correspondence with represented parameters or variables as being inclusively represented within limits of implemented accuracy as represented to include configured processing. Also, in accordance with the present invention not being raised to a power is considered to be substantially the same as being raise to a power of one.

In accordance with the present invention, a derivative is a ratio of represented change in a function, a variable, or a phenomenon to a corresponding change in a related function, parameter, variable, or phenomenon. A partial derivative is a derivative which is formulated while considering certain related functions, parameters, or variables to be constant.

Figure 9A:
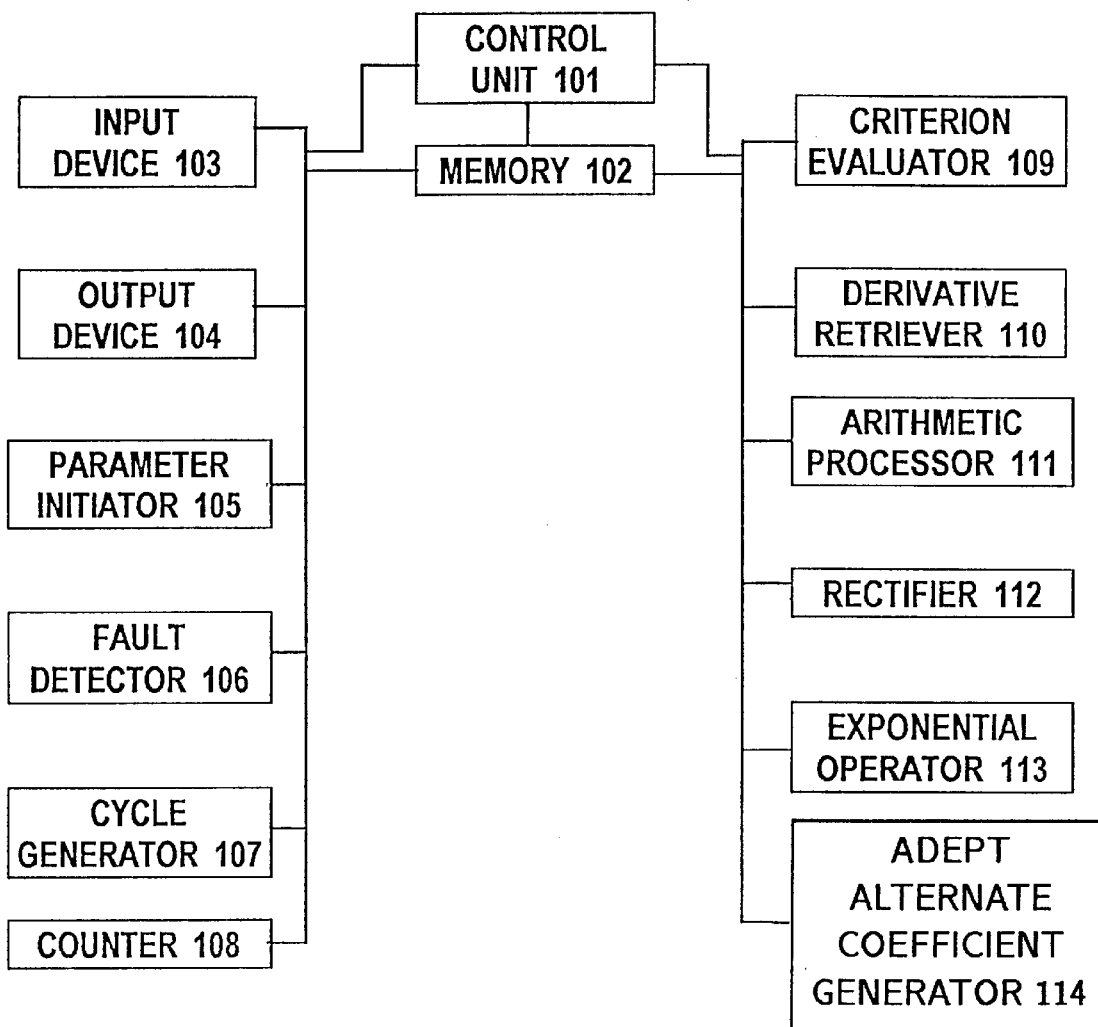
FIG. 9A depicts a coordinate related coefficient generator for generating positive and alternate select weighting coefficients, comprising a control unit and functional components which are activated by logic control in accordance with the present invention.
Figure 9B:
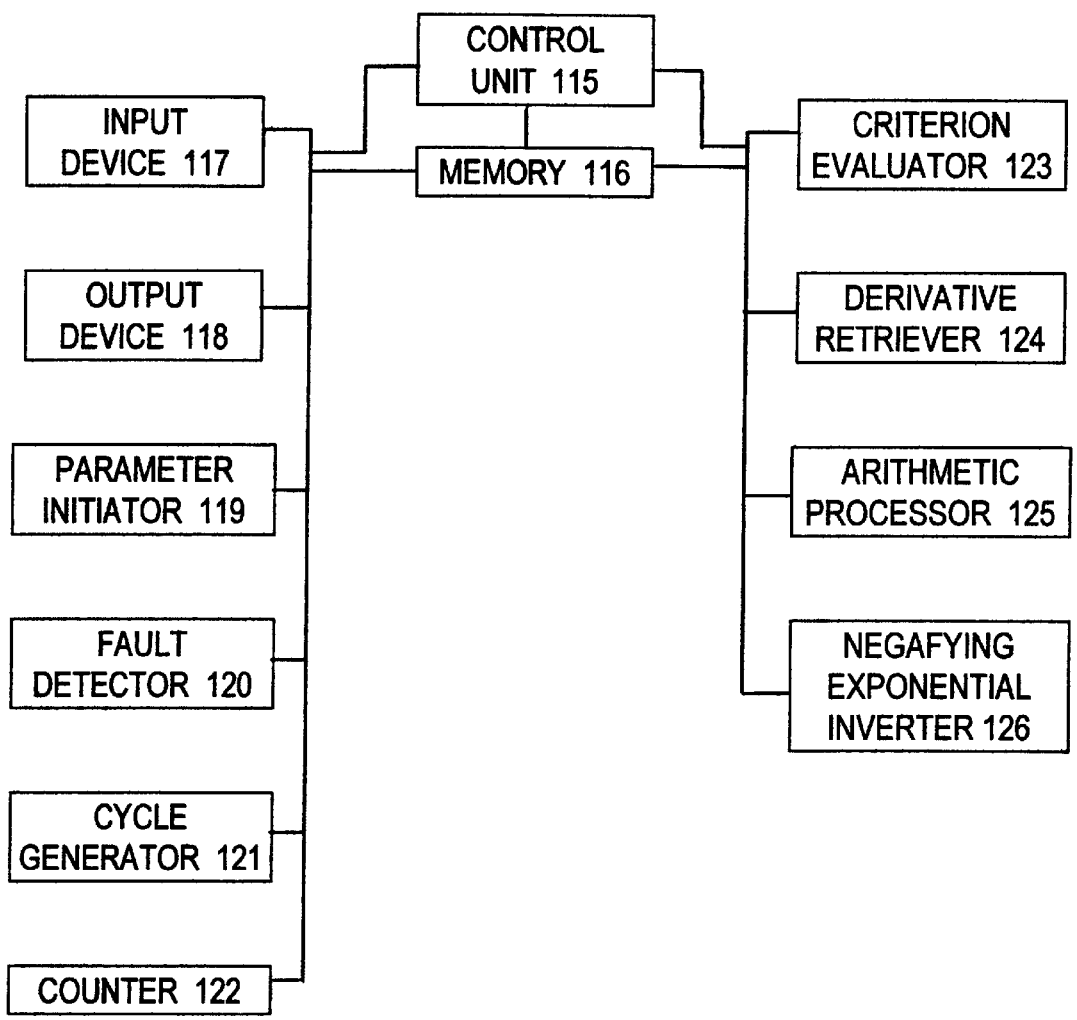
FIG. 9B depicts a coordinate related coefficient generator for generating negative select weighting coefficients, comprising a control unit and functional components which are activated by logic control in accordance with the present invention.

Referring now to FIG. 9A and FIG. 9B with corresponding reference being made to Appendices E and F, a coordinate related coefficient generator is a coefficient generator comprising means for generating a representation of at least one coordinate related coefficient. Coordinate related coefficients are weighting coefficients which represent the weighting of at least one coordinate related proportion. In accordance with the present invention, a coordinate related coefficient is a weighting coefficient or composite product of coefficients which establishes relative weighting as an element of and in corresponding proportion with at least one of the following:

1. a plurality of weighting coefficients, substantially corresponding in proportion to the absolute value of the inverse of evaluated derivatives being raised to a power, said derivatives being variable dependent non-zero derivatives or variable dependent non-zero partial derivatives of a represented function deviation taken with respect to said variable;

2. a plurality of weighting coefficients, substantially corresponding in proportion to the absolute value of the inverse of evaluated derivatives, said derivatives being variant non-zero derivatives or variant non-zero partial derivatives of a represented function deviation taken with respect to said variable;

In accordance with the present invention, an alternately generated adept weighting coefficient is rendered as a coordinate related coefficient by establishing relative weighting as an element of and in corresponding proportion with at least one of the following:

1. a plurality of residual weighting coefficients, substantially corresponding in proportion to the absolute value of the inverse of evaluated derivatives being raised to a power, said derivatives being variable dependent non-zero derivatives or variable dependent non-zero partial derivatives of a represented function deviation taken with respect to said variable;

2. a plurality of residual weighting coefficients, substantially corresponding in proportion to the absolute value of the inverse of evaluated derivatives, said derivatives being variable dependent non-zero derivatives or variable dependent non-zero partial derivatives of a represented function deviation taken with respect to said variable;

3. a plurality of negative weighting coefficients, substantially corresponding in proportion to the absolute value of the inverse of evaluated derivatives being raised to a power, said derivatives being variable dependent non-zero derivatives or variable dependent non-zero partial derivatives of a represented function deviation taken with respect to said variable;

4. a plurality of negative weighting coefficients, substantially corresponding in proportion to the absolute value of the inverse of evaluated derivatives, said derivatives being variable dependent non-zero derivatives or variable dependent non-zero partial derivatives of a represented function deviation taken with respect to said variable;

5. a plurality of weighting coefficients, substantially corresponding in proportion to the absolute value of the inverse of evaluated derivatives being raised to a power other than two, said derivatives being variable dependent non-zero derivatives or variable dependent non-zero partial derivatives of a represented function deviation taken with respect to said variable, said weighting coefficients being generated by means that do not include operations of absolute value rectification;

6. a plurality of negative weighting coefficients, substantially corresponding in proportion to the absolute value of the inverse of evaluated derivatives, said derivatives being variable dependent non-zero derivatives or variable dependent non-zero partial derivatives of a represented function deviation taken with respect to said variable, said weighting coefficients being generated by means that do not include operations of absolute value rectification;

7. a plurality of weighting coefficients, substantially corresponding in proportion to the absolute value of the inverse of evaluated derivatives being raise to a power other than two, said derivatives being variable dependent non-zero derivatives or variable dependent non-zero partial derivatives of a represented function deviation taken with respect to said variable, said inverse as raised to said power being combined by multiplication with representation for the inverse of an effective variance;

8. a plurality of weighting coefficients, substantially corresponding in proportion to the absolute value of the inverse of evaluated derivatives, said derivatives being variable dependent non-zero derivatives or variable dependent non-zero partial derivatives of a represented function deviation taken with respect to said variable, said inverse being combined by multiplication with representation for the inverse of an effective variance;

9. a plurality of residual weighting coefficients, substantially corresponding in proportion to the absolute value of the inverse of evaluated derivatives being raised to a power, said derivatives being variable dependent non-zero derivatives or variable dependent non-zero partial derivatives of a represented function deviation taken with respect to said variable, said inverse as raised to said power being combined by multiplication with representation for the inverse of the square root of an effective variance;

The coordinate related coefficient generator 91, is a coordinate related coefficient generator that can be designed to provide either positive or negative coordinate related coefficients as products of respective coordinate related proportions, each representing a corresponding degree of freedom.

The preferred form for coordinate relate coefficients is assumed to provide individual datum coordinate system normalizing of residuals in correspondence with provided data and a represented approximating equation. The preferred form for a coordinate related coefficient for providing residual weighting is proportional to the inverse of the absolute value of the product of derivatives being raised to the power of one divided by the number of independent variables which are included in a represented function deviation, said derivatives being non-zero partial derivatives of said represented function deviation which are taken with respect to each of the included said variables of said function deviation and evaluated in correspondence with a provided datum. Constant valued derivatives need not be included. For some represented fitting functions, coordinate related coefficients may be functions of included fitting parameters, and hence, may require iteration for resolution.

FIG. 9A depicts a select coefficient generator, which is rendered as a coordinate related coefficient generator 91, for generating certain positive and alternate adept weighting coefficients comprising a control unit 101 and functional components which are activated by logic control, including:

1. a memory 102 for containing data and providing data storage;
2. an input device 103 providing means for accessing pertinent information;
3. an output device 104 providing means for information transfer;
4. a parameter initiator 105 provided to prepare allocated memory for specific parameter evaluation;
5. a fault detector 106 for indicating interruption in coefficient generating;
6. a cycle generator 107 providing for repetitive operations;
7. a counter 108 providing a count of zero valued derivatives;
8. a criterion evaluator 109 provided to check for zero valued derivatives;
9. a derivative retriever 110 provided to retrieve evaluated representation of term function derivatives;
10. an arithmetic processor 111 to establish term derivative sums and compute derivatives and products;
11. a rectifier 112 providing positive values corresponding to numerical magnitude;
12. an exponential operator 113 provided to raise parameters to powers;
13. an alternate coefficient generator 114 including a negafying exponential inverter that is implemented for use in generating alternate negative coordinate related coefficients.

In accordance with the present invention operations characterizing the functional components of a coordinate related coefficient generator or of a select coefficient generator, as configured to provide positive and alternate coordinate related coefficients, may be included and provided by a data function simdation system; and inter-related automation of the represented functional components may be provided by control-command logic. An example of typical command code providing control-command logic for activating functional components of a select coefficient generator (which is rendered as a coordinate related coefficient generator 91 configured to provide positive and alternate adept weighting coefficients) is listed in Appendix E. In accordance with the example provided in Appendix E, functions of the control unit 101 are provided by the DFS multipurpose logic control system which effectuates operations for a plurality of functional components and establishes active system control, manipulating allocated memory 102, accessing and cycling through data, and effectuating the evaluation of coordinate related coefficients as including the following steps:

1. The fault detector 106 is checked for indicated interruption in coefficient generating.

2. The cycle generator 107 is set to repeat specified processing steps for each variable degree of freedom.
3. Evaluation of deviation partial derivatives is initialized by operations of a parameter initiator 105.
4. The zero derivative counter 108 is preset.
5. The cycle generator 107 is set to repeat specified processing steps for each term function.
6. The counter 108 is incremented for each encountered zero valued term function partial derivative.
7. A non-zero valued term function partial derivative is retrieved and established by operations of a derivative retriever 110.
8. The sum of term function partial derivatives is provided by operations of an arithmetic processor 111.
9. Single term partial derivatives are represented without included estimates of fitting parameters.
10. The cycle generator 107, as represented by the logic control system, provides for repeat of step 5 through step 9 corresponding to each term function.
11. The product of partial derivatives is established by operations of an arithmetic processor 111 with precision uncertainty included as optionally provided for residual weighting.
12. The cycle generator 107, as represented by the logic control system, provides for repeat of step 2 through step 11 corresponding to each variable degree of freedom.
13. Specified positive or alternate weighting coefficient are provided by operations of an arithmetic processor 111.

FIG. 9B depicts a select coefficient generator, which is rendered as a coordinate related coefficient generator 91, for generating negative select weighting coefficients, comprising a control unit 115 and functional components which are activated by logic control, including:

1. a memory 116 for containing data and providing data storage;
2. an input device 117 providing means for accessing pertinent information;
3. an output device 118 providing means for information transfer;
4. a parameter initiator 119 provided to prepare allocated memory for specific parameter evaluating;
5. a fault detector 120 for indicating interruption in coefficient generating;
6. a cycle generator 121 providing for repetitive operations;
7. a counter 122 providing a count of zero valued derivatives;
8. a criterion evaluator 123 provided to check for zero valued derivatives;
9. a derivative retriever 124 provided to retrieve evaluated representation of term function derivatives;
10. an arithmetic processor 125 to establish term derivative sums and compute derivatives and products, and to provide certain negafying operations;
11. a negafying exponential inverter 126, which is a negafying exponential inverter that is included for use in generating negative coordinate related coefficients.

In accordance with the preferred embodiment of the present invention operations characterizing the functional components of a select coefficient generator, as configured to provide negative coordinate related coefficients are included and provided by a data function similation system; and inter-related automation of the represented functional components is provided by control-command logic. An example of typical command code providing control-command logic for activating functional components of a select coefficient generator (which is rendered as a coordinate related coefficient generator 91 configured as a negafying coefficient generator to provide negative select weighting coefficients) is listed in Appendix F. In accordance with the example provided in Appendix F, functions of the control unit 115 are provided by the DFS multipurpose logic control system which effectuates operations for a plurality of functional components and establishes active system control, manipulating allocated memory 116, accessing and cycling through data, and effectuating the evaluation of coordinate related coefficients as including the following steps:

1. The fault detector 120 is checked for indicated interruption in coefficient generating.
2. The cycle generator 121 is set to repeat specified processing steps for each variable degree of freedom.
3. Evaluation of deviation partial derivatives is initialized by operations of a parameter initiator 119.
4. The zero derivative counter 122 is preset.
5. The cycle generator 121 is set to repeat specified processing steps for each term function.
6. The counter 122 is incremented for each encountered zero valued term function partial derivative.
7. A non-zero valued term function partial derivative is retrieved and established by operations of a derivative retriever 124.
8. The sum of term function partial derivatives is provided by operations of an arithmetic processor 125.
9. Single term partial derivatives are represented without included estimates of fitting parameters.
10. The cycle generator 121, as represented by the logic control system, provides for repeat of step 5 through step 9 corresponding to each term function.
11. The product of partial derivatives is established by operations of an arithmetic processor 125.
12. The cycle generator 121, as represented by the logic control system, provides for repeat of step 2 through step 11 corresponding to each variable degree of freedom.
13. Specified negative weighting coefficients are provided by an arithmetic processor 125 configured to provide the operations of a negafying exponential inverter 126.

Figure 10A:
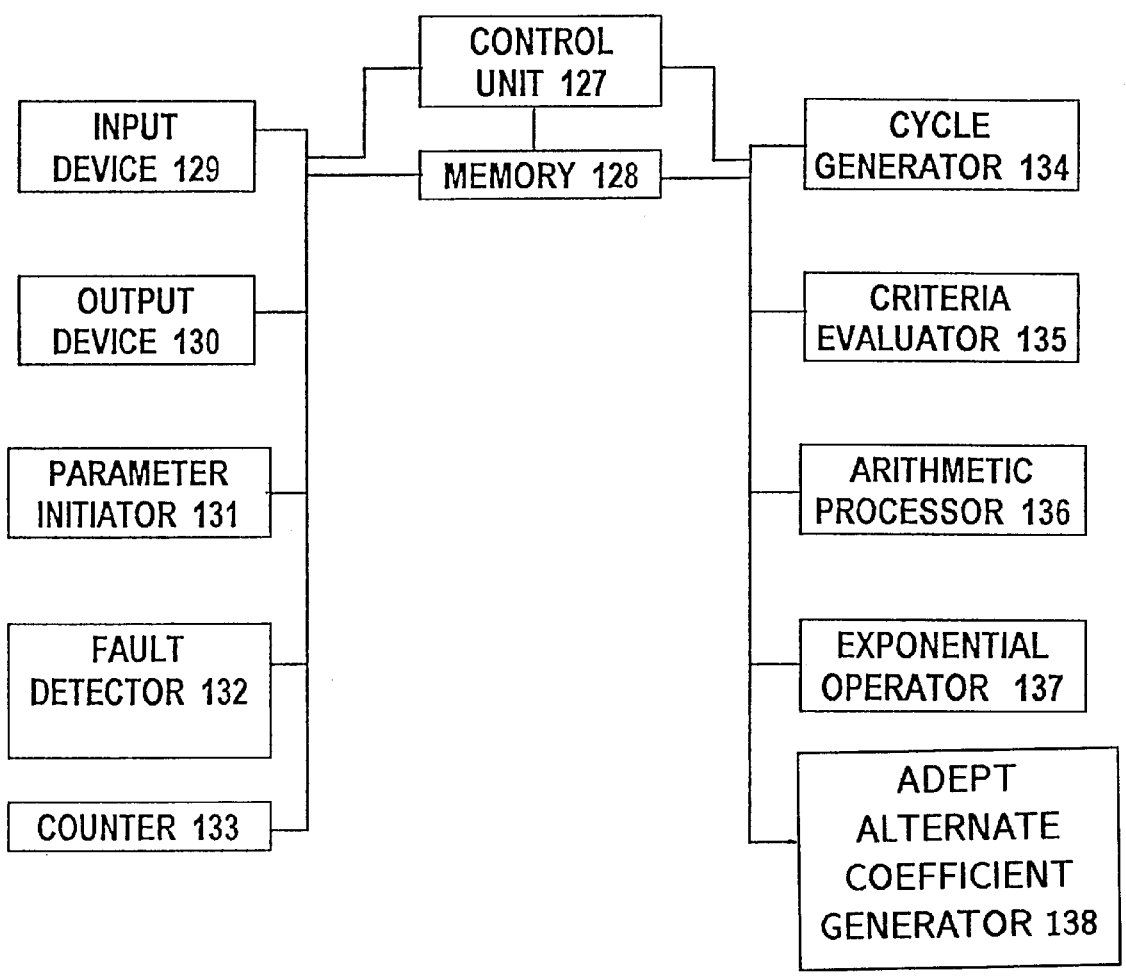
FIG. 10A depicts a multi-term variable related coefficient generator for generating positive and alternate select weighting coefficients, comprising a control unit and functional components which are activated by logic control in accordance with the present invention.
Figure 10B:
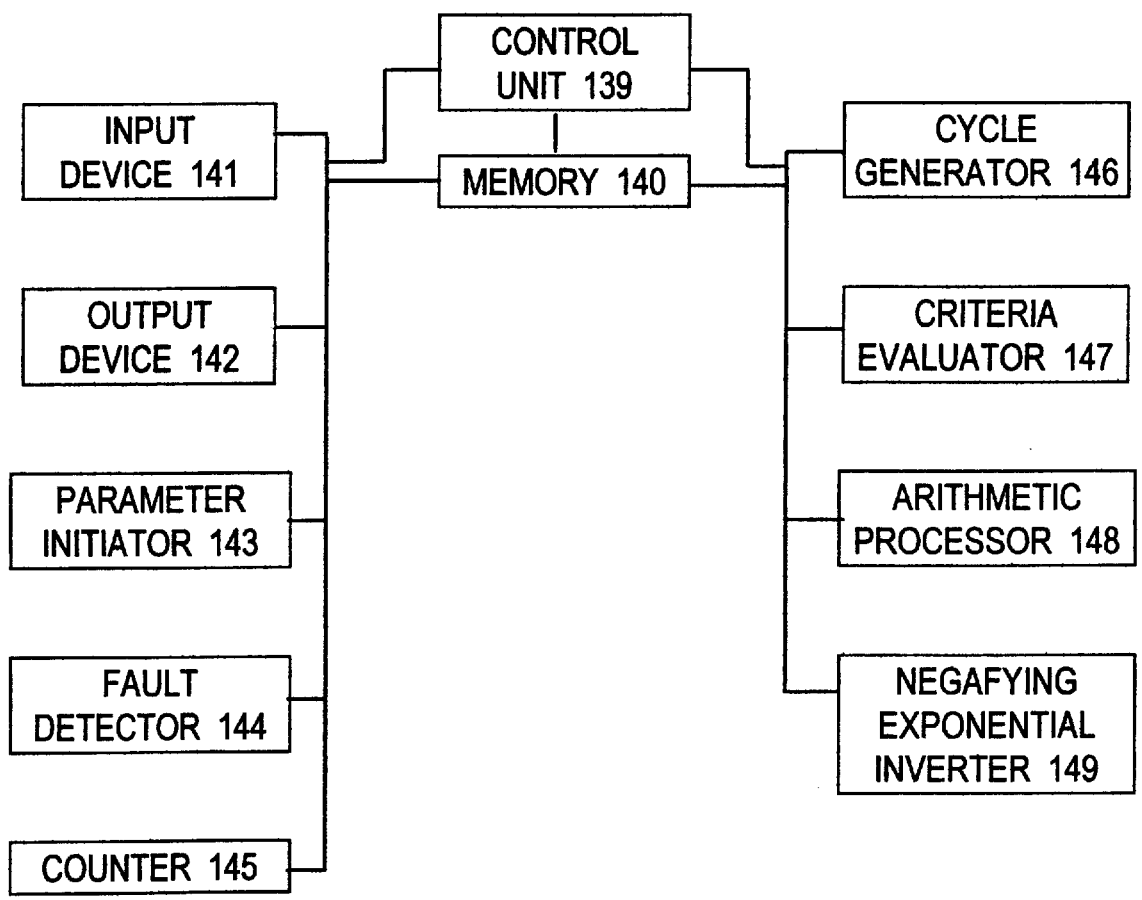
FIG. 10B depicts a multi-term variable related coefficient generator for generating negative select weighting coefficients, comprising a control unit and functional components which are activated by logic control in accordance with the present invention.

Now referring to FIG. 10A and FIG. 10B with corresponding reference being made to Appendices G and H, the multi-term variable related coefficient generator is a coefficient generator comprising means for generating representation of at least one multi-term variable related coefficient. Multi-term variable related coefficients are weighting coefficients which represent term included variable proportions. In accordance with the present invention, a multi-term variable related coefficient is a weighting coefficient or a composite product of coefficients which establishes relative weighting as an element of and in corresponding proportion to at least one of the following:

1. a plurality of weighting coefficients, substantially corresponding in proportion to the absolute value of the inverse of evaluated derivatives being raised to a power, said derivatives being variant non-zero derivatives or variant non-zero partial derivatives of at least one isolated term function of a represented function deviation;

2. a plurality of weighting coefficients, substantially corresponding in proportion to the absolute value of the inverse of evaluated derivatives, said derivatives being variant non-zero derivatives or variant non-zero partial derivatives of at least one isolated term function of a represented function deviation.

In accordance with the present invention, an alternately represented adept weighting coefficient is rendered as a multi-term variable related coefficient by establishing relative weighting as an element of and in corresponding proportion with at least one of the following:

1. a plurality of weighting coefficients, substantially corresponding in proportion to the absolute value of the inverse of evaluated derivatives being raised to a power, said derivatives being variable dependent non-zero derivatives or variable dependent non-zero partial derivatives of at least one isolated term function of a represented function deviation, said derivatives taken with respect to a variable that is included in a plurality of non-proportional terms of said function deviation;
2. a plurality of weighting coefficients, substantially corresponding in proportion to the absolute value of the inverse of evaluated derivatives, said derivatives being variable dependent non-zero derivatives or variable dependent non-zero partial derivatives of at least one isolated term function of a represented function deviation, said derivatives taken with respect to a variable that is included in a plurality of non-proportional terms of said function deviation;
3. a plurality of residual weighting coefficients, substantially corresponding in proportion to the absolute value of the inverse of evaluated derivatives being raised to a power, said derivatives being variable dependent non-zero derivatives or variable dependent non-zero partial derivatives of at least one isolated term function of a represented function deviation taken with respect to said variable;
4. a plurality of residual weighting coefficients, substantially corresponding in proportion to the absolute value of the inverse of evaluated derivatives, said derivatives being variable dependent non-zero derivatives or variable dependent non-zero partial derivatives of at least one isolated term function of a represented function deviation taken with respect to said variable;
5. a plurality of negative weighting coefficients, substantially corresponding in proportion to the absolute value the of inverse of evaluated derivatives being raised to a power, said derivatives being variable dependent non-zero derivatives or variable dependent non-zero partial derivatives of at least one isolated term function of a represented function deviation taken with respect to said variable;
6. a plurality of negative weighting coefficients, substantially corresponding in proportion to the absolute value the of inverse of evaluated derivatives, said derivatives being variable dependent non-zero derivatives or variable dependent non-zero partial derivatives of at least one isolated term function of a represented function deviation taken with respect to said variable;
7. a plurality of weighting coefficients, substantially corresponding in proportion to the absolute value the of inverse of evaluated derivatives being raised to a power other than two, said derivatives being variable dependent non-zero derivatives or variable dependent non-zero partial derivatives of at least one isolated term function of a represented function deviation taken with respect to said variable, said weighting coefficients being generated by means that do not include operations of absolute value rectification;
8. a plurality of weighting coefficients, substantially corresponding in proportion to the absolute value the of inverse of evaluated derivatives, said derivatives being variable dependent non-zero derivatives or variable dependent non-zero partial derivatives of at least one isolated term function of a represented function deviation taken with respect to said variable, said weighting coefficients being generated by means that do not include operations of absolute value rectification;
9. a plurality of weighting coefficients, substantially corresponding in proportion to the absolute value the of inverse of evaluated derivatives being raised to a power other than two, said derivatives being variable dependent non-zero derivatives or variable dependent non-zero partial derivatives of at least one isolated term function of a represented function deviation taken with respect to said variable, said inverse as raised to said power being combined by multiplication with representation for the inverse of an effective variance;
10. a plurality of weighting coefficients, substantially corresponding in proportion to the absolute value the of inverse of evaluated derivatives, said derivatives being variable dependent non-zero derivatives or variable dependent non-zero partial derivatives of at least one isolated term function of a represented function deviation taken with respect to said variable, said inverse being combined by multiplication with representation for the inverse of an effective variance;
11. a plurality of residual weighting coefficients, substantially corresponding in proportion to the absolute value the of inverse of evaluated derivatives being raised to a power other than two, said derivatives being variable dependent non-zero derivatives or variable dependent non-zero partial derivatives of at least one isolated term function of a represented function deviation taken with respect to said variable, said inverse as raised to said power being combined by multiplication with representation for the inverse of the square root of an effective variance;

The multi-term variable related coefficient generator 92, is a multi-term variable related coefficient generator that can be designed to provide either positive or negative multi-term variable related coefficients as products of respective term and variable related proportions, each proportion representing a term and a corresponding term included variable, with the number of existing (but not necessarily included) proportions for each term corresponding to the number of independent variables included in that term. Multi-term variable related coefficients are generally formulated from evaluated estimates of non-zero partial derivatives of expressed deviation term functions (or from evaluated estimates of derivatives of expressed deviation term functions taken with respect to at least one included variable) as provided by user supplied or system contained command code or alternate form of control-command logic. The preferred form for residual weighting multi-term variable related coefficients is proportional to the inverse of the absolute value of the product of evaluated non-zero, term-function partial derivatives being raised to a power of one divided by the number of independent variables included in each term of the represented function deviation which corresponds to the approximating equation (or represented fitting function) summed over the total number of terms; said partial derivatives being evaluated non-zero partial derivatives of at least one isolated term function of a represented function deviation; said partial derivatives taken with respect to included said independent variables of said approximating equation. Represented constant partial derivatives need not be included in said product.

FIG. 10A depicts a select coefficient generator, which is rendered as a multi-term variable related coefficient generator 92, for generating positive and alternate multi-term variable related coefficients, comprising a control unit 127 and functional components which are activated by logic control, including:

1. a memory 128 for containing data and providing data storage;
2. an input device 129 providing means for accessing pertinent information;
3. an output device 130 providing means for information transfer;
4. a parameter initiator 131 provided to prepare allocated memory for specific parameter evaluation;
5. a fault detector 132 for indicating interruption in coefficient generating;
6. a counter 133 providing a count of zero valued derivatives;
7. a cycle generator 134 providing for repetitive operations;
8. a criteria evaluator 135 provided to check term derivatives and operational limits;
9. an arithmetic processor 136 to establish term derivatives and uncertainty products;
10. an exponential operator 137 provided to raise parameters to powers;
11. an alternate coefficient generator 138 including a negafying exponential inverter that is implemented for use in generating alternate negative coordinate related coefficients.

In accordance with the present invention, operations characterizing the functional components of a multi-term variable related coefficient generator or of a select coefficient generator, as configured to provide positive multi-term variable related coefficients, may be included and provided by a data function simulation system; and inter-related automation of the represented functional components may be provided by control-command logic. An example of typical command code providing control-command logic for activating functional components of a select coefficient generator (which is rendered as a multi-term variable related coefficient generator 92 configured to provide positive and alternate multi-term variable related coefficients) is listed in Appendix G. In accordance with the example provided in Appendix G, functions of the control unit 127 are provided by the DFS multipurpose logic control system which effectuates operations for a plurality of functional components and establishes active system control, manipulating allocated memory 128, accessing and cycling through data, and effectuating the evaluation of multi-term variable related coefficients as including the following steps:

1. The fault detector 132 is checked for indicated interruption in coefficient generating.
2. The cycle generator 134 is set to repeat specified processing steps for each term function and each variable degree of freedom.
3. A counter 133 is incremented for each non-zero valued term function partial derivative.
4. A product of encountered non-zero valued partial derivatives is formulated by the provided arithmetic processor 136, with precision uncertainty included as optionally provided for residual weighting.
5. The cycle generator 134, as represented by the logic control system, provides for repeat of step 2 through step 4 corresponding to each term function and variable degree of freedom.
6. Specified positive or alternate weighting coefficients are provided as designated by the criteria evaluator 135 by operations of an arithmetic processor 136 as including designated operations of a negafying exponential inverter 138.

FIG. 10B depicts a select coefficient generator, which is rendered as a multi-term variable related coefficient generator 92, for generating negative select weighting coefficients, comprising a control unit 139 and functional components which are activated by logic control, including:

1. a memory 140 for containing data and providing data storage;
2. an input device 141 providing means for accessing pertinent information.;
3. an output device 142 providing means for information transfer;
4. a parameter initiator 143 provided to prepare allocated memory for specific parameter evaluating;
5. a fault detector 144 for indicating interruption in coefficient generating;
6. a counter 145 providing a count of zero valued derivatives;
7. a cycle generator 146 providing for repetitive operations;
8. a criteria evaluator 147 provided to check for zero or non-zero valued derivatives;
9. an arithmetic processor 148 to establish term derivative and uncertainty products and to provide certain negafying operations;
10. a negafying exponential inverter 149, which is a negafying exponential inverter that is included for use in generating negative multi-term variable related coefficients.

In accordance with the preferred embodiment of the present invention operations characterizing the functional components of a select coefficient generator, as configured to provide negative multi-term variable related coefficients, are included and provided by a data function simulation system; and inter-related automation of the represented functional components is provided by control-command logic. An example of typical command code providing control-command logic for activating functional components of a select coefficient generator (which is rendered as a negafying multi-term variable related coefficient generator 92 configured to provide negative select weighting coefficients) is listed in Appendix H. In accordance with the example provided in Appendix H, functions of the control unit 139 are provided by the DFS multipurpose logic control system which effectuates operations for a plurality of functional components and establishes active system control, manipulating allocated memory 140, accessing and cycling through data, and effectuating the evaluation of multi-term variable related coefficients as including the following steps:

1. The fault detector 144 is checked for indicated interruption in coefficient generating.
2. The cycle generator 146 is set to repeat specified processing steps for each term function and each variable degree of freedom.
3. A counter 145 is incremented for each non-zero valued term function partial derivative.

4. A product of encountered non-zero valued partial derivatives is formulated by the provided arithmetic processor 148.

5. The cycle generator 146, as represented by the logic control system, provides for repeat of step 2 through step 4 corresponding to each term function and variable degree of freedom.

6. Specified negative weighting coefficients are provided by operations of an arithmetic processor 148 configured to provide the operations of a negafying exponential inverter 149.

Figure 11A:
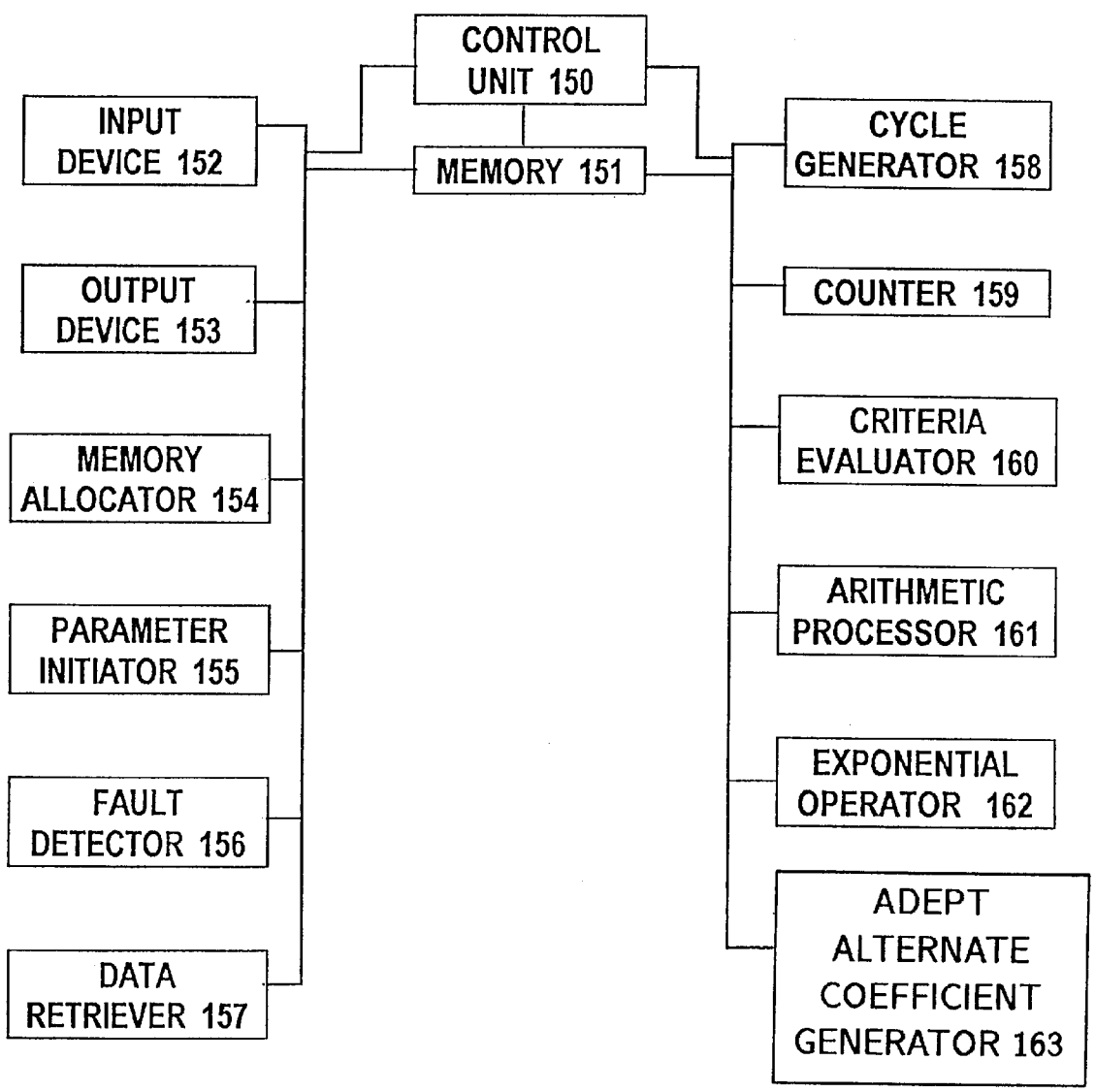
FIG. 11A depicts a multi-term uncertainty-weighting coefficient generator for generating positive and alternate weighting coefficients, comprising a control unit and functional components which are activated by logic control in accordance with the present invention.
Figure 11B:
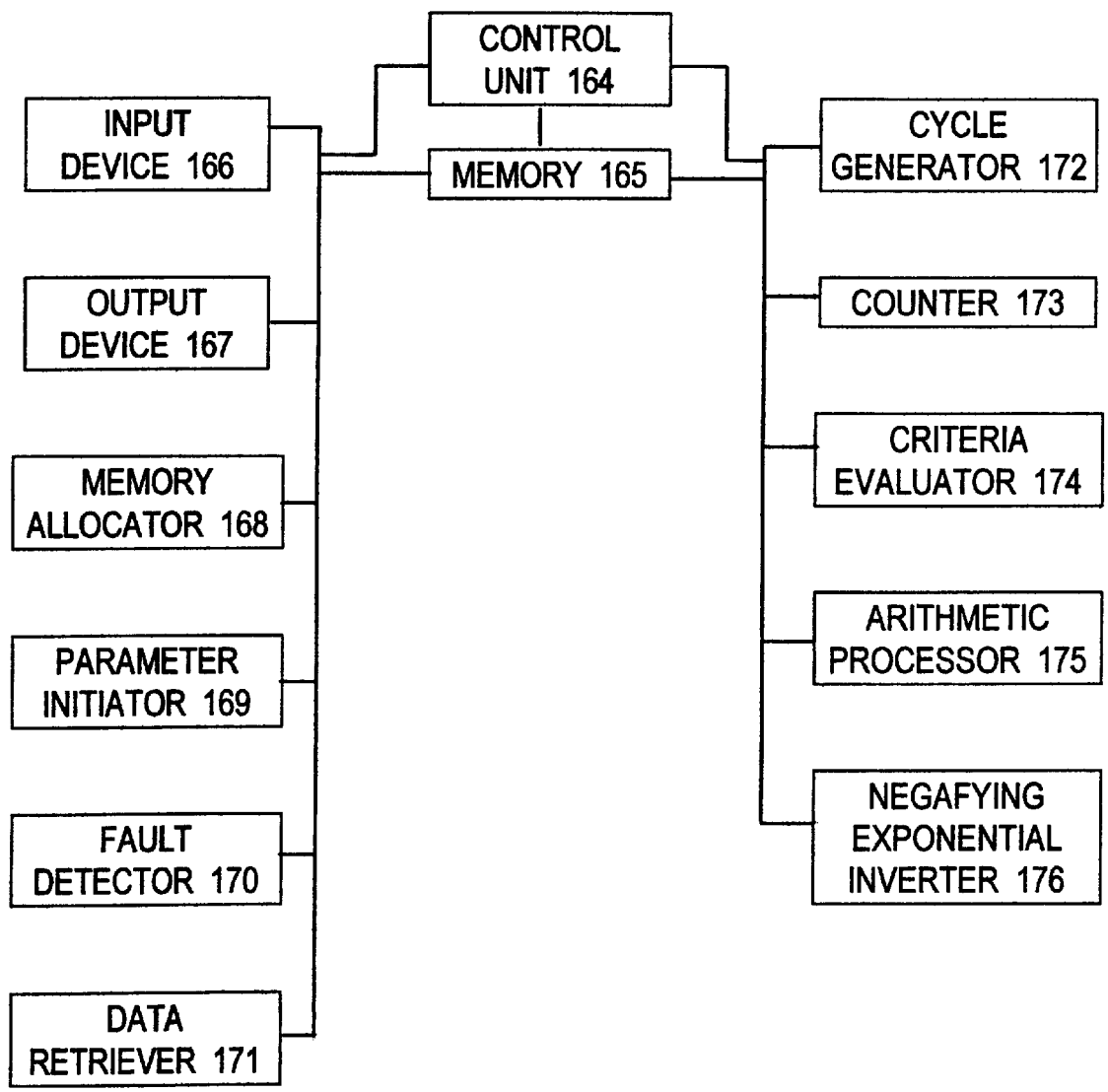
FIG. 11B depicts a multi-term uncertainty-weighting coefficient generator for generating negative weighting coefficients, comprising a control unit and functional components which are activated by logic control in accordance with the present invention.

Now referring to FIG. 11A and FIG. 11B with corresponding reference being made to Appendices I and J, the multi-term uncertainty-weighting coefficient generator is a coefficient generator with means for generating a representation of multi-term uncertainty-weighting coefficients. Multi-term uncertainty-weighting coefficients are weighting coefficients which represent proportions which correspond to the uncertainty of included variable terms. In accordance with the present invention, a multi-term uncertainty-weighting coefficient is a weighting coefficient or a composite product of coefficients which establishes relative weighting as an element of and in corresponding proportion with a plurality of weighting coefficients, substantially corresponding in proportion to the absolute value of the inverse of estimated term function uncertainties being raised to a power; said uncertainties representing estimates of uncertainty of an evaluated term function of a represented function deviation.

The multi-term uncertainty-weighting coefficient generator 93, is a multi-term uncertainty-weighting coefficient generator that can be designed to provide either positive or negative multi-term uncertainty-weighting coefficients as products of respective term uncertainty related proportions, each proportion representing an estimated term function uncertainty, which is formulated by combining estimated variable uncertainty with corresponding term partial derivatives. Preferred forms for multi-term uncertainty-weighting coefficients are proportional to the inverse of the product of estimated uncertainty raised to a power of one divided by the number of variable terms which are included in the represented function deviation. Constant coefficients need not be included.

FIG. 11A depicts a multi-term uncertainty-weighting coefficient generator 93, for generating positive and alternate weighting coefficients, comprising a control unit 150 and functional components which are activated by logic control, including:

1. a memory 151 for containing data and providing data storage;
2. an input device 152 providing means for accessing pertinent information;
3. an output device 153 providing means for information transfer;
4. a memory allocator 154 providing memory management;
5. a parameter initiator 155 provided to prepare allocated memory for specific parameter evaluation;
6. a fault detector 156 for indicating interruption in coefficient generating;
7. a data retriever 157 providing for the retrieval of available data;
8. a cycle generator 158 providing for repetitive operations;
9. a counter 159 providing counts of non-zero valued derivatives and non-provided uncertainty;
10. a criteria evaluator 160 provided to check derivatives, uncertainty, and operational limits;
11. an arithmetic processor 161 to establish term uncertainty products;
12. an exponential operator 162 provided to raise parameters to powers;
13. an alternate coefficient generator 163 including a negafying exponential inverter that is implemented for use in generating alternate negative coordinate related coefficients.

In accordance with the present invention operations characterizing the functional components of a multi-term uncertainty-weighting coefficient generator or of a select coefficient generator, as configured to provide positive multi-term uncertainty-weighting coefficients may be included and provided by a data function simulation system; and inter-related automation of the represented functional components may be provided by control-command logic. An example of typical command code providing control-command logic for activating functional components of a weighting coefficient generator (which is rendered as a multi-term uncertainty-weighting coefficient generator 93 configured to provide positive and alternate coefficients) is listed in Appendix I. In accordance with the example provided in Appendix I, functions of the control unit 150 are provided by the DFS multipurpose logic control system which effectuates operations for a plurality of functional components and establishes active system control, manipulating allocated memory 151, accessing and cycling through data, and effectuating the evaluation of multi-term uncertainty-weighting coefficients as including the following steps:

1. The fault detector 156 is checked for indicated interruption in coefficient generating.
2. Available uncertainty representation is retrieved by a provided data retriever 157.
3. The cycle generator 158 is set to repeat specified processing steps for each term function.
4. Counter 159 registers are preset to count the number of non-zero term partial derivatives and the number of non-provided uncertainties.
5. The cycle generator 158 is set to repeat specified processing steps for each variable degree of freedom.
6. A count is incremented for each non-zero term partial derivative and each non-provided uncertainty.
7. Term uncertainties are represented by operations of an arithmetic processor 161.
8. Single term uncertainties are represented without included estimates of fitting parameters.
9. The cycle generator 158, as represented by the logic control system, provides for repeat of steps 5 through 8 corresponding to each variable degree of freedom.
10. The product of term uncertainties is established by operations of an arithmetic processor 161.
11. The cycle generator 158, as represented by the logic control system, provides for repeat of step 3 through step 10 corresponding to each term function.
12. Specified positive or alternate weighting coefficient are provided as designated by the criteria evaluator 160 by operations of an arithmetic processor 161 as including designated operations of a negafying exponential inverter 163.

FIG. 11B depicts a coefficient generator, which is rendered as a multi-term uncertainty-weighting coefficient generator 93, for generating negative weighting coefficients, comprising a control unit 164 and functional components which are activated by logic control, including:

1. a memory 165 for containing data and providing data storage;
2. an input device 166 providing means for accessing pertinent information;
3. an output device 167 providing means for information transfer;
4. a memory allocator 168 providing memory management;
5. a parameter initiator 169 provided to prepare allocated memory for specific parameter evaluation;
6. a fault detector 170 for indicating interruption in coefficient generating;
7. a data retriever 171 providing for the retrieval of available data;
8. a cycle generator 172 providing for repetitive operations;
9. a counter 173 providing counts of non-zero valued derivatives and non-provided uncertainty;
10. a criteria evaluator 174 provided to check derivatives and uncertainty;
11. an arithmetic processor 175 to establish term uncertainty products and to provide certain negafying operations;
12. a negafying exponential inverter 176, which is a negafying exponential inverter that is included for use in generating negative multi-term uncertainty-weighting coefficients.

In accordance with the present invention operations characterizing the functional components of a multi-term uncertainty-weighting coefficient generator, may be included and provided by a data function similation system; and inter-related automation of the represented functional components is provided by control-command logic. An example of typical command code providing control-command logic for activating functional components of a coefficient generator (which is rendered as a negafying multi-term uncertainty-weighting coefficient generator 93 configured to provide negative weighting coefficients) is listed in Appendix J. In accordance with the example provided in Appendix J, functions of the control unit 164 are provided by the DFS multipurpose logic control system which effectuates operations for a plurality of functional components and establishes active system control, manipulating allocated memory 165, accessing and cycling through data, and effectuating the evaluation of multi-term uncertainty-weighting coefficients as including the following steps:

1. The fault detector 170 is checked for indicated interruption in coefficient generating.
2. Available uncertainty representation is retrieved by a provided data retriever 171.
3. The cycle generator 172 is set to repeat specified processing steps for each term function.
4. Counter 173 registers are preset to count the number of non-zero term partial derivatives and the number of non-provided uncertainties.
5. The cycle generator 172 is set to repeat specified processing steps for each variable degree of freedom.
6. Count is incremented for each non-zero term partial derivative and each non-provided uncertainty.
7. Term uncertainties are represented by operations of an arithmetic processor 175.
8. Single term uncertainties are represented without included estimates of fitting parameters.
9. The cycle generator 172, as represented by the logic control system, provides for repeat of steps 5 through 8 corresponding to each variable degree of freedom.
10. The product of term uncertainties is established by operations of an arithmetic processor 175.
11. The cycle generator 172, as represented by the logic control system, provides for repeat of step 3 through step 10 corresponding to each term function.
12. Specified negative weighting coefficients are provided by operations of an arithmetic processor which is configured to provide the operations of a negafying exponential inverter 176.

Figure 12:
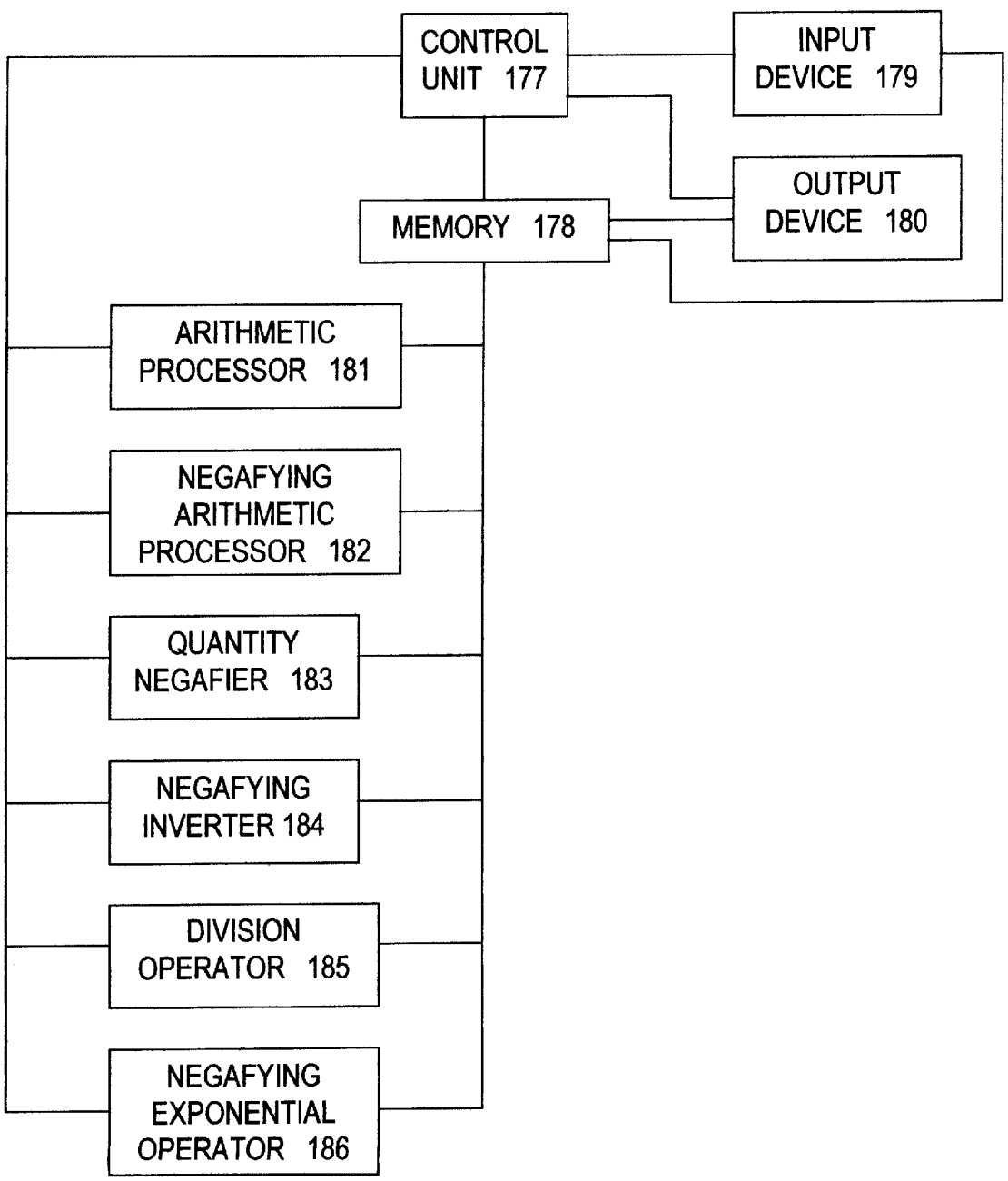
FIG. 12 depicts a negafying exponential inverter, comprising a control unit and functional components which are activated by logic control in accordance with the present invention.

Referring now to FIG. 12 with corresponding reference being made to Appendix K, the negafying exponential inverter is a device or machine, or a component of a composite system, comprising means for processing information whereby a negative numerical representation is generated by providing negative correspondence to the magnitude of a parameter being raised to a determined power, said numerical representation being generated without effectively converting numerical correspondence to said parameter to represent positive value.

FIG. 12 depicts a negafying exponential inverter as comprising a control unit 94 and functional components which are activated by logic control, including:

1. a control Unit 177,
2. a memory 178 for containing data and providing data storage,
3. an input device 179 providing means for accessing pertinent information,
4. an output device 180 providing means for information transfer,
5. an arithmetic processor 181,
6. a negafying arithmetic processor 182,
7. a quantity negafier 183,
8. a negafying invertor 184,
8. a division operator 185,
10. a negafying exponential operator 186.

In accordance with the preferred embodiment of the present invention, interrelated automation of typical functional components of a negafying exponential inverter is provided by control-command logic. An example of command code providing control-command logic for activating functional components of a negafying exponential inverter is listed in Appendix K. In accordance with the provided example of Appendix K, numerical correspondence is represented as a negative number by a quantity negafier 183, said numerical correspondence is then inverted by a negafying invertor 185, and raise to a power by a negafying exponential operator 186, said power being determine a division operator 184 in correspondence with explicit form for representing the weighting coefficient.

The arithmetic processor 181 provides fundamental bit manipulating operations as implemented for comparative operations and fundamental operations of addition, bit manipulation, and quantity negafying.

The Negafying arithmetic processor provides negafying operations of addition, subtraction, multiplication, division, and exponentiation without representing corresponding positive representation. An example of QBASIC command code providing control-command logic for activating functional components of a a negafying arithmetic processor is listed in Appendix L. The command code as exemplified in Appendix L is not efficient. It is provided for example only. In accordance with the present invention, control-command logic for effectuating the operations of a negafying arithmetic processor can be provided by fundamental command code or assembly language.

For real time data reduction applications which employ analog weighting coefficients, the negafying exponential inverter may be provided as an analog device, wherein the quantity negafier 183 is an analog rectifier which is included in analog circuitry with the connecting leads reversed to provide negative output representation of incoming analog signals. The represented negafying invertor 185 and other represented functions that may be provided by the negafying arithmetic processor 182, can also be provided by analog counterparts. The control unit 177 and memory 178 may not necessarily be included in an analog version of a negafying exponential inverter, and the represented input device 179 and output device 180 may be replaced by analog input and output ports as provided for analog applications.

Figure 13A:
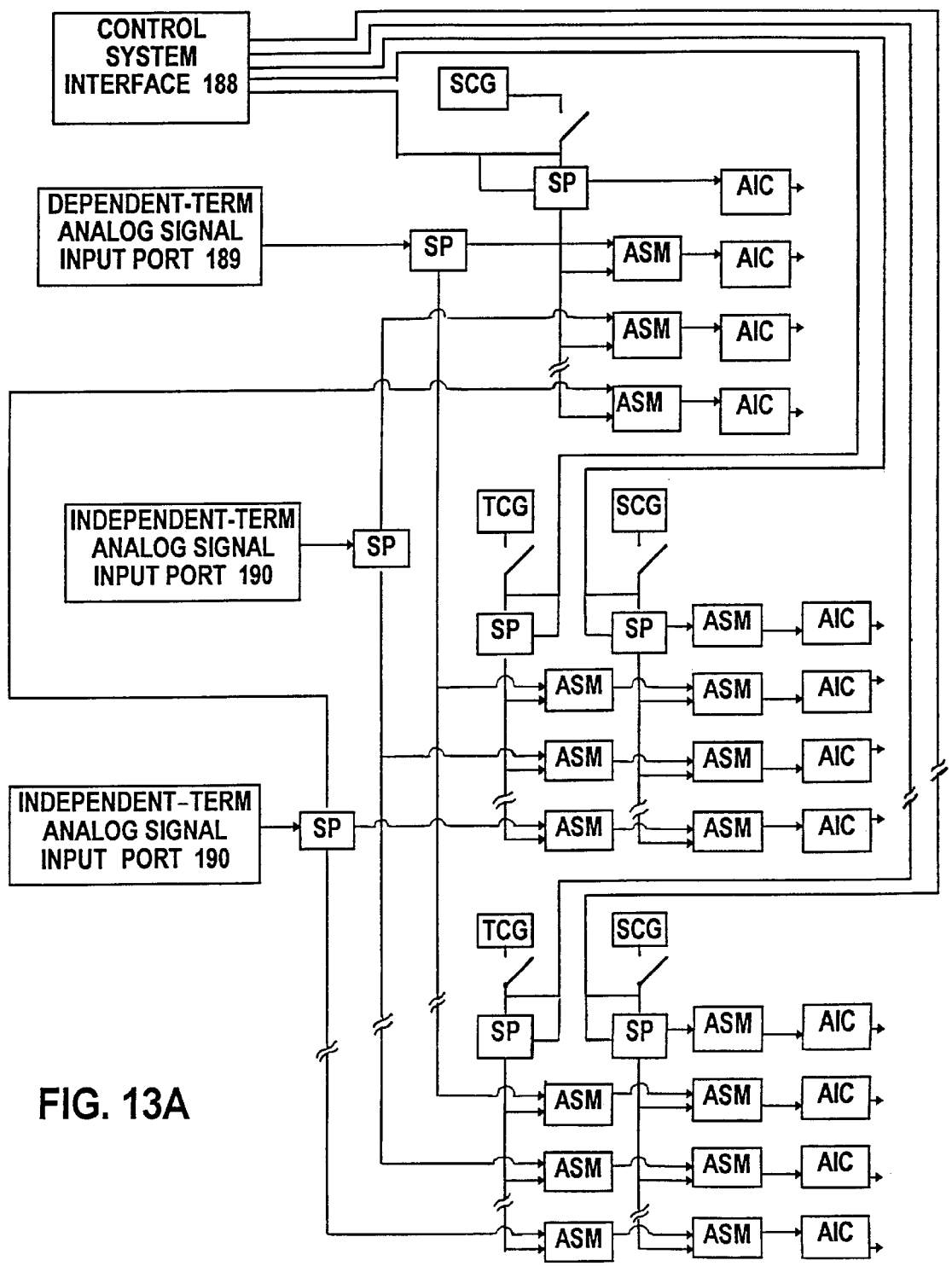
FIG. 13A depicts components of analog circuitry for generating dependent and independent term functions of base equations and subordinate equations for real time data acquisition in accordance with the present invention.
Figure 13B:
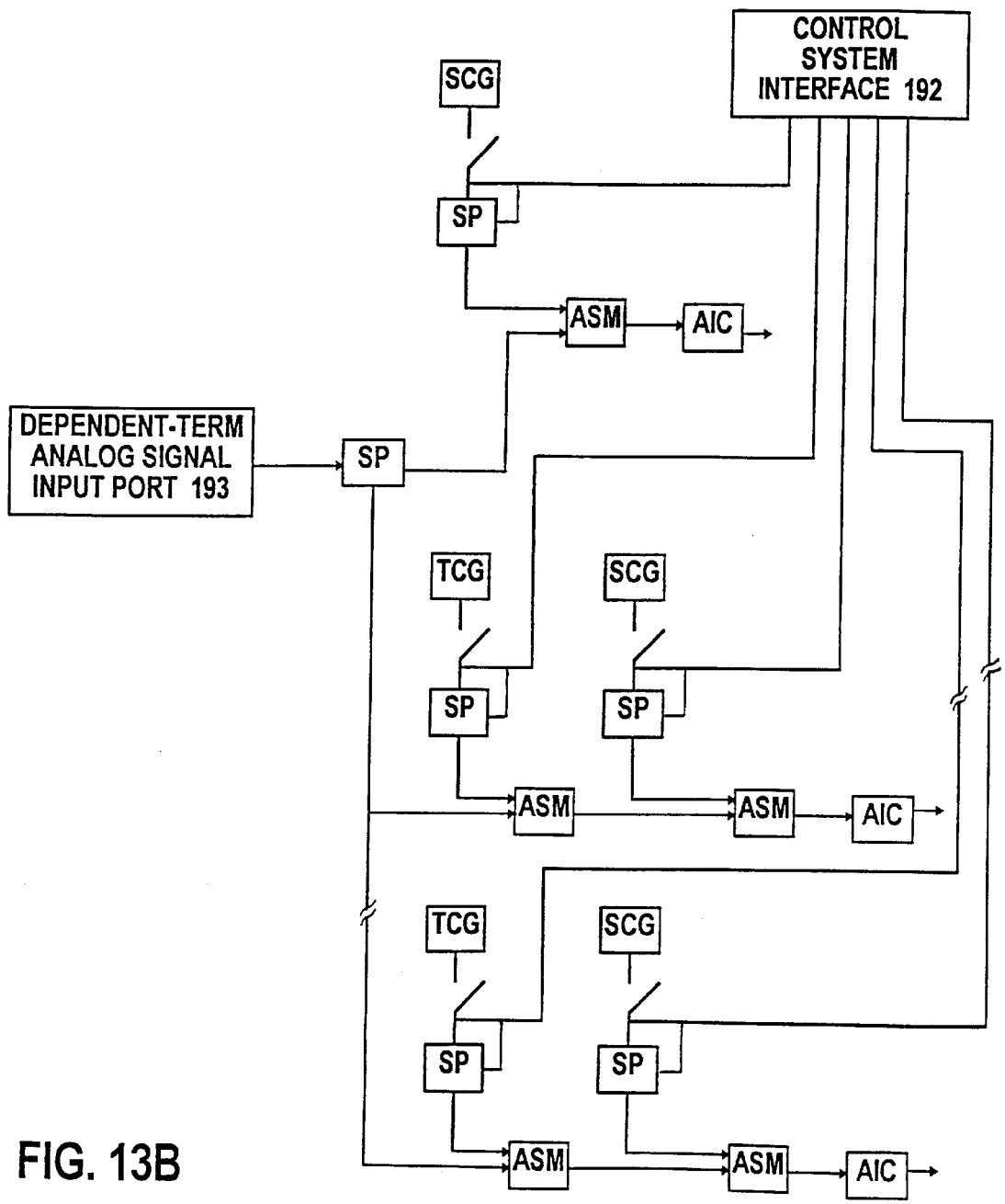
FIG. 13B depicts components of analog circuitry for generating dependent term functions of base equations and subordinate equations for real time data acquisition in accordance with the present invention.

Referring now to FIG. 13A and FIG. 13B depicting analog circuitry wherein multiply-included analog components are correspondingly represented by alpha mnemonic notation. FIG. 13A depicts components of analog circuitry for generating dependent and independent term functions of adept and select base and subordinate equations in correspondence with data, which may be represented by an analog input signal. This figure illustrates components typical of an analog multi-term term function evaluator 187, which is a term function evaluator comprising an analog circuitry for the evaluating of both dependent and independent term functions, including a control system interface 188, a dependent-term analog signal input port 189, at least one independent-term analog signal input port 190, and corresponding signal splitter (SP) for each input. (signal splitters are included to provide multiple representations of analog signals.)

A dependent variable which is represented by a real time or simulated analog data signal along with at least one generated signal representing an independent residual term function are passed through corresponding analog input ports and signal splitters. The representations of provided analog signals are then multiplied by generated analog weighting coefficients and integrated by analog integration circuitry (AIC) to provide corresponding integrated signals which can be converted to digital form to represent evaluated dependent base and subordinate equation term functions. Coefficients are provided in analog form by select coefficient generators (SCG) and term-related coefficient generators (TCG) for generating term-related coefficients as designated by control signals provided via the control system interface 188. Included switching circuitry may be activated through the control system interface to provide for optional connection to equivalent coefficients. Generated analog coefficients are passed through corresponding signal splitters to provide representations of said equivalent coefficients. Analog signal multiplication is provided by included analog signal multipliers (ASM).

For certain embodiments, which might be considered to provide data reductions for real time series analysis or other applications for which generated analog weighting might be asymptotically discontinuous at points as represented by an independent variable, included select coefficient generators and/or included generators of term typifying coefficients may be configured to provide intermittent generating of analog coefficients, whereby the generated signals are interrupted in correspondence with magnitude related criterion, and replaced during the period of interruption by grounded potentials or alternately provided signals to prevent inclusion of faulty representation in the provided integral sums.

FIG. 13B illustrates analog circuitry for an analog dependent-term term function evaluator 191, which is a term function evaluator comprising an analog circuitry providing for the generating of dependent-term functions. Functional Components of the depicted analog dependent-term term function evaluator 191 include a control system interface 192, a dependent-term analog signal input port 193 and corresponding signal splitter (SP).

An analog input signal passes through the dependent-term analog signal input port 193 and corresponding signal splitter (SP). Multiple representations of said input signal are combined by analog multiplication with select analog weighting coefficients as generated by at least one provided select coefficient generator (SCG) and corresponding signal splitter (SP). Representations of said input signal as provided for representing subordinate equation dependent-term functions are also multiplied by signals which are generated by corresponding term-related coefficient generators (TCG). (order of multiplication operations may be as depicted in FIG. 13B or reversed.) The resultant product of analog signals is past through analog integration circuitry (AIC) and converted to digital form representing corresponding base and subordinate equation dependent-term functions. Resultant term functions as represented in digital form can then be assembled and acted upon by a processing system as might be incorporated by the DFS to provide corresponding data representing. Similarly, as with provisions for the multi-term term function evaluator, analog select coefficient generators and/or included analog term-related coefficient generators, as provided by a dependent-term term function evaluator 191, may be configured to provide intermittent generating of analog coefficients; and included switching circuitry may be activated through the control system interface 192 to provide equivalent representations of coefficients as may be included in a plurality of select equations.

Figure 14:
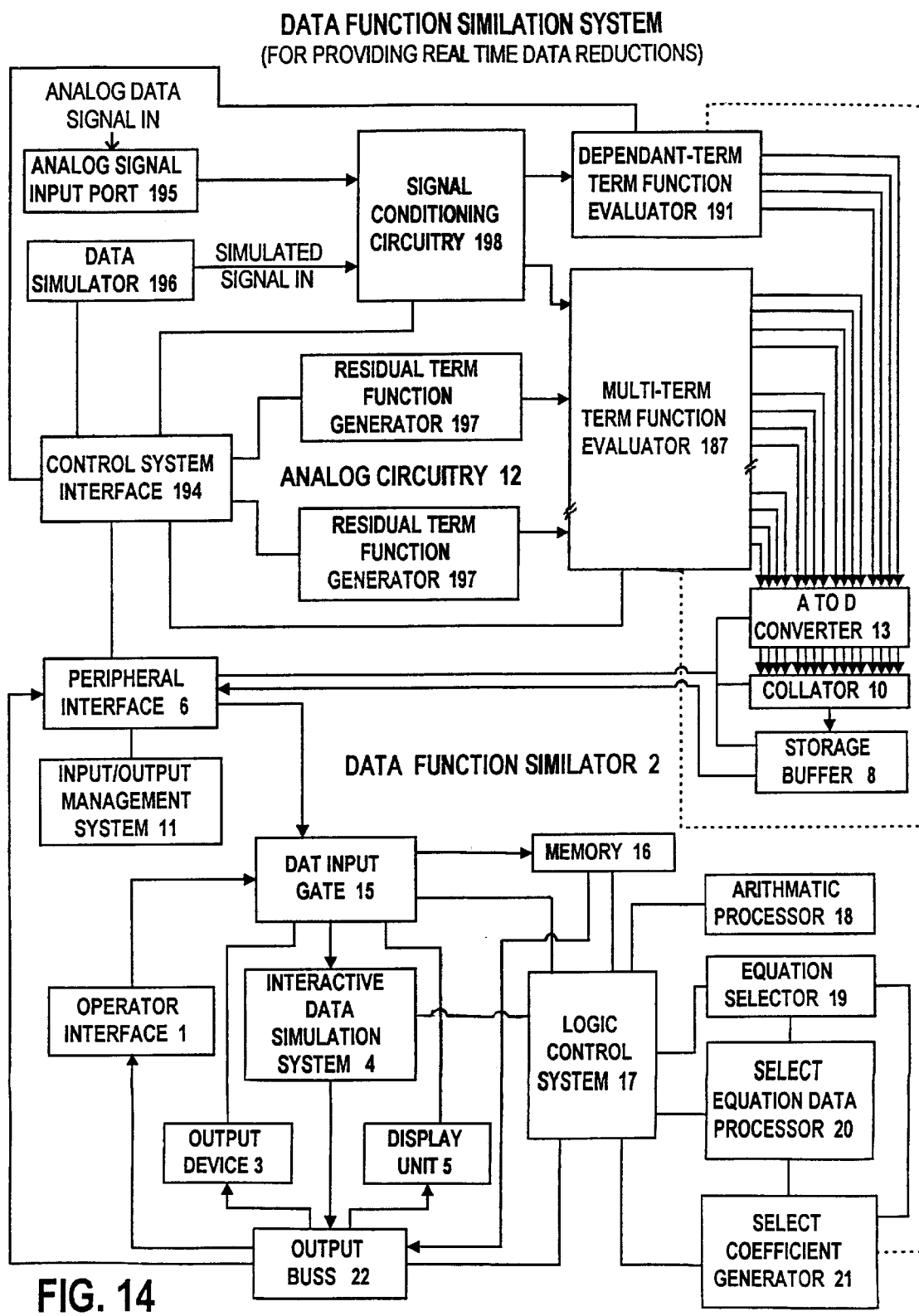
FIG. 14 depicts components of a data function similation system which is configured for providing forms of real time data acquisition and reduction in accordance with the present invention.

Now referring to FIG. 14 which depicts a data function similation system for providing forms of real time data reduction, comprising an operator interface 1, an interactive data simulation system 4, a display unit 5, a typical output device 3, a data function similator 2, also analog circuitry 12, an A to D converter 13, a collator 10, a storage buffer 8, a peripheral interface 6, and an input/output management system 11. The included data function similator 2 comprises a data input gate 15, memory 16, arithmetic processor 18, equation selector 19, select-equation data processor 20, output buss 22, at least one select coefficient generator 21 (including at least one analog select coefficient generator as an integral part of the dependent-term term function evaluator 191), and a logic control system 17 which is configured to include auxiliary equipment providing said analog circuitry 12 with analog to digital conversion for real time data acquisition and data reduction with simultaneous data simulating for residua estimating. The system provides for equation selecting, residual sum evaluating, and adept data processing whereby produced data representations are generated in the form of product output as provided by a peripheral input/output management system 11.

Functional Components provided by said analog circuitry 12 include a control system interface 194, an analog signal input port 195, a data simulator 196, at least one residual term function generator 197, signal conditioning circuitry 198, a dependent-term term function evaluator 191, and a multi-term term function evaluator 187.

Real time data as represented by an analog signal is passed through the analog signal input port 195 and signal conditioning circuitry 198 into a dependent-term term function evaluator 191, where it is combined with analog coefficients and integrated to generate an analog representation of base and subordinate equation term functions which are converted to digital form by means of the A to D converter 13. The resultant digital representations of dependent-term functions are passed simultaneously through the collator 10, where they may be arranged in ordered fashion and stored temporarily in the storage buffer 8. They are then passed through the peripheral interface 6 and the digital input gate 15 into memory 16 to be acted upon by the data function similator 2 for evaluating fitting parameters for data representation.

Represented independent-term functions which are to be included in the evaluating can either be generated digitally by the DFS as time-dependent functions, or generated by analog simulations (as provided by the residual term function generator 197, and multi-term term function evaluator 187, as depicted in FIG. 14). The dashed line in the figure indicates a possible duel representation of weighting coefficient generators.

Digital representations of weighting coefficients may be provided by the select coefficient generator 21, while analog representations are provided by included analog circuitry of the analog term function evaluators. The provided analog simulations of independent-term functions may be digitized, transferred, collated, and passed along with represented dependent-term functions to the data function similator 2, to provide the appropriate digital representations. For simultaneous generating of residua, a simulated data signal is generated by the data simulator 196 (which may be controlled through interface as an included part of the interactive data simulation system 4). Said simulated data signal is passed through corresponding signal conditioning circuitry 198 (or represented as a preconditioned analog signal) and then past through the multi-term term function evaluator 187 where it is acted upon by analog circuitry and provided as an analog representation of a simulated dependent-term function, which is converted to digital form and passed through the collator 10, storage buffer 8, peripheral interface 6, and data input gate 15, into memory 16 to be acted upon by the DFS along with estimated values for independent-term functions to provide estimated residua. Estimated residua combined with estimated independent-term functions and generated dependent-term functions provide for the evaluating and subsequent representation of variation in real time data.

Now referring back to FIG. 8, several distinct reduction procedures which may be implemented by an adept alternate coefficient generator are represented by the exemplary command code of Appendices A through W. Appendices A and C characterize exemplary command code as incorporated in an option designator for designating the generating and implementing of alternately represented forms of residual weighting coefficients as might be included in the formulating of adept equations, including coordinate related coefficients and term typifying coefficients.

Examples of negafying coefficient generators are represented in Appendices F, H, J and M. The exemplary command code as included in Appendix F and M provides for accessing and processing information, whereby representation of at least one negative coordinate related coefficient is generated in correspondence with at least one derivative, said representation of at least one negative coordinate related coefficient being generated by means including accessing at least some said information which establishes representative measure for said derivative, and subjecting said representative measure to operations which are limited solely to operations in which represented numerical correspondence to said derivative is not effectively converted to represent positive value other than positive value corresponding to the inverse of said derivative being raised to a power of two, said means including provision for representing said coordinate related coefficient as substantially corresponding in proportion to the absolute value of the inverse of evaluated said derivative being raised to a power other than two. Appendix F includes the additional restraint that numerical correspondence to said derivative is not effectively converted to any positive value.

The exemplary command code as included in Appendices G, H, I, and J provide for accessing and processing information whereby representation of at least one term typifying coefficient may be generated for applications other than residual weighting, said means including provision for generating said term typifying coefficient in correspondence with a variable that is included in more than a single isolated term function of a represented function deviation, said means also including provision for generating said term typifying coefficient in correspondence with a plurality of variables that are included in a single term.

An example of an even power rectifying coefficient generator is represented in Appendix N. An example of a sign discriminate coefficient generator is represented in Appendix O. The command code as included in Appendices N and O provide exemplary QBASIC operating code for accessing and processing information whereby representation of at least two coordinate related coefficients can be generated ill correspondence with at least two evaluations for a represented derivative, said derivative being a a variable dependent non-zero partial derivative of a represented function deviation, said derivative taken with respect to said variable, said representation of at least two coordinate related coefficients being generated by means including accessing at least some information which establishes representative measure for said evaluations, and subjecting said representative measure to operations whereby represented numerical correspondence to said evaluations is effectively converted to represent said at least two coordinate related coefficients as having the same sign, said operations not including any forms of absolute value rectification; said means including provision for representing said coordinate related coefficients as substantially corresponding in proportion to the absolute value of the inverse of said evaluations being raised to a power other than two;

Still referring to FIG. 8, the exemplary QBASIC command code of Appendix P and Q provide for the respective generating of inverse effective variance and inverse term-related variance which is implemented by command code of Appendices A through D to provide means for accessing and processing information whereby representation of the inverse of at least one represented variance or the inverse of the square root of at least one represented variance is generated which can be combined as a cofactor with at least one coordinate related or at least one term typifying coefficient for representing at least one weighting coefficient.

Referring back to FIG. 5 with corresponding reference being made to Appendix C, R, and S, in accordance with the present invention, the exemplary command code as included in Appendix C, provides for for effectuating the operations of a matrix equation assembler 71 for representing residual equations. Command code of Appendix R provides exemplary command code for effectuating the operations of a matrix equation processor 72 as may be implemented in solving sets of determinate equations. The exemplary command code as included in Appendix S, provides control-command logic for representing implied squared residual weighting and effectuating corresponding forms of data processing. The exemplary QBASIC command code of Appendix S, as implemented in an appropriately equipped data processing system, provides viable means (as limited by provided memory and allotted execution time) for evaluating a designated number of fitting parameters (one, two, three, or more) in correspondence with a determinate set of independent adept equations; said means including provision for representing coordinate related coefficients as substantially corresponding in proportion to the absolute value of the inverse of evaluated derivatives or represented powers thereof; said means providing for the accessing and processing of information whereby representation of at least one coordinate related coefficient may be generated and implemented in providing implied squared residual weighting; said means also providing for the generating and representing of at least one coordinate related coefficient as related to at least one derivative, said derivative being a variable dependent non-zero partial derivative of a represented function deviation. The version of command as represented in Appendix S does not include provision for searching for minimum values for represented sums of weighted squared deviations, however, in accordance with the present invention, such provision might be included as considered appropriate. Again referring to FIG. 8, said exemplary QBASIC command code of Appendix S also provides for the generating and implementing multi-term variable related coefficients and for the generating and implementing of weighting coefficients which represent inverse effective variance as a cofactor with multi-term variable related and coordinate related coefficients.

Equations 26 and 28 as presented above include obvious errors which were inadvertently rendered in representing the higher order terms. More viable expressions for including pertinent higher order terms can alternately be provided by persons skilled in the art of mathematics. Representing the equations in correspondence with multiple variable Taylor Series Expansions, for example, would yield a replacement for Equation 26 as:

$$x_{nk} - X_{nk} = \frac{\lambda k}{W_k} \sum_{i=1}^{I} P_i U_{x_{nk}}^2 \frac{\partial Q_i}{\partial X_n} \bigg|_{x_{1k},\ldots,x_{Nk}} = \frac{\lambda k}{W_k} \sum_{i=1}^{I} P_i U_{x_{nk}}^2 \left[ \frac{\partial Q_i}{\partial X_n} - \sum_{\eta=1}^{N} (x_{\eta k} - X_{\eta k}) \frac{\partial^2 Q_i}{\partial X_\eta \partial X_n} \right]_{x_{1k},\ldots,x_{Nk}} +$$

$$\frac{\lambda k}{W_k} \sum_{i=1}^{I} \frac{P_i U_{x_{nk}}^2}{2} \left[ \sum_{l=1}^{N} (x_{lk} - X_{lk}) \frac{\partial}{\partial X_l} \sum_{\eta=1}^{N} (x_{\eta k} - X_{\eta k}) \frac{\partial^2 Q_i}{\partial X_\eta \partial X_n} \right]_{x_{1k},\ldots,x_{Nk}} -$$

$$\frac{\lambda k}{W_k} \sum_{i=1}^{I} \frac{P_i U_{x_{nk}}^2}{6} \left[ \sum_{\epsilon=1}^{N} (x_{\epsilon k} - X_{\epsilon k}) \frac{\partial}{\partial X_\epsilon} \sum_{l=1}^{N} (x_{lk} - X_{lk}) \frac{\partial}{\partial X_l} \sum_{\eta=1}^{N} (x_{\eta k} - X_{\eta k}) \frac{\partial^2 Q_i}{\partial X_\eta \partial X_n} \right]_{x_{1k},\ldots,x_{Nk}} + \ldots ,$$

and a respective replacement for Equation 28 as:

$$v(X_{1k},\ldots,X_{Nk}) = \sum_{i=1}^{I} P_i \left[ Q_i - \sum_{\eta=1}^{N} (x_{\eta k} - X_{\eta k}) \frac{\partial Q_i}{\partial X_\eta} \right]_{x_{1k},\ldots,x_{Nk}} +$$

$$\sum_{i=1}^{I} \frac{P_i}{2} \left[ \sum_{l=1}^{N} (x_{lk} - X_{lk}) \frac{\partial}{\partial X_l} \sum_{\eta=1}^{N} (x_{\eta k} - X_{\eta k}) \frac{\partial Q_i}{\partial X_\eta} \right]_{x_{1k},\ldots,x_{Nk}} -$$

$$\sum_{i=1}^{I} \frac{P_i}{6} \left[ \sum_{\epsilon=1}^{N} (x_{\epsilon k} - X_{\epsilon k}) \frac{\partial}{\partial X_\epsilon} \sum_{l=1}^{N} (x_{lk} - X_{lk}) \frac{\partial Q_i}{\partial X_\eta} \right]_{x_{1k},\ldots,x_{Nk}} + \ldots = 0.$$

The exemplary command code of Appendix S is adequate for first order approximations. The inappropriate rendering of higher order terms in Equations 26 and 28, however, is reflected in the corresponding rendition of higher order terms in Equations 34 through 37, and by inappropriate higher order term enhancements to said exemplary command code as formulated in Appendix S. For applications in which higher order approximations are to be considered, revisions to equations 34 through 37 along with corresponding revisions to the exemplary command code may be accomplished by persons skilled in the arts of mathematics and computer science.

Figure 15:
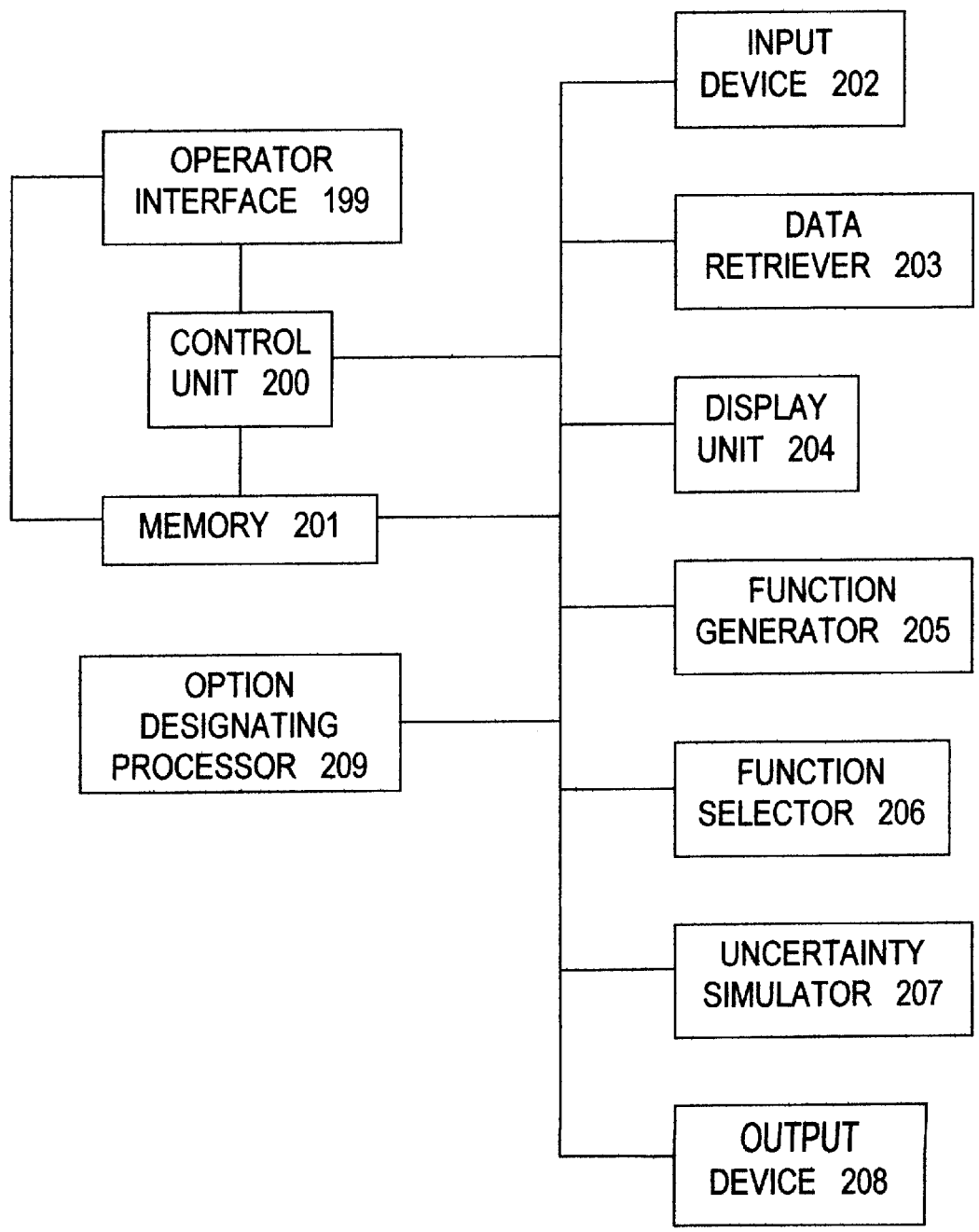
FIG. 15 is a block diagram illustrating components which are typical of an interactive data simulation system in accordance with the present invention.

Referring now to FIG. 15, with corresponding reference being made to Appendix T, interactive data simulation system 4 is a data simulation system comprising a memory and means for accessing and processing information whereby a simulated data representation is generated by:

1. establishing an approximative relationship between related variable parameters;
2. selecting fitting parameters which correspond to said approximative relationship and which characterize approximating form corresponding to information being processed;
3. establishing an error distribution which corresponds to apparent or established characteristics of said information being processed;
4. generating representation of simulated error-free data as represented by said approximating relationship as including said fitting parameters;
5. generating representation of simulated errors in correspondence with said error distribution;
6. generating representation of error-affected data by combining representation of said error-free data with representation of said simulated errors.

FIG. 15 is a block diagram depicting components which may be typical of an interactive data simulation system, including:

1. an operator interface 199 providing interactive operator decision making;
2. a control unit 200 providing operational control of functional components;
3. a memory 201 for storing information and simulated data representation;
4. an input device 202 providing means for accessing pertinent information;
5. a data retriever 203 for retrieving actual data for comparison to and/or help in the generating of simulated data;

6. a display unit 204 for providing visual operator interaction;
7. a function generator 205 for providing and generating representative data in correspondence to approximative relationships;
8. a function selector 206, that is a visually interactive selection display generator, providing for the selecting of approximating relationships and corresponding fitting parameters;
9. an uncertainty simulator 207, that is a visually interactive selection display generator, providing for the generating, displaying, and selecting of error distributions which may be representative of actual data;
10. an output device 208 providing for storage or output of data simulations;
11. an option designating processing system 209 providing for designating the generating and implementing of weighting coefficients and providing corresponding forms of adept data processing.

Information is passed via the operator interface 199 and input device 202 into memory 201 where it is operated on by control signals from the control unit 200 and data retriever 203 to provide interactive control between the operator interface 199 and the display unit 204, providing a visual selection of displayed approximating relationships, fitting parameters and uncertainty simulations. Selections are passed via the output device 208 for access by an application system. Embodiments of the present invention may include alternate forms of data processing equipment to help establish representative values for fitting parameters. Appendix T includes a provisional example of simulated data retrieval and simulated function generating. Alternate or additional command code may be implemented for the selecting and evaluating of appropriate approximative form as related to specific or general applications.

Figure 16:
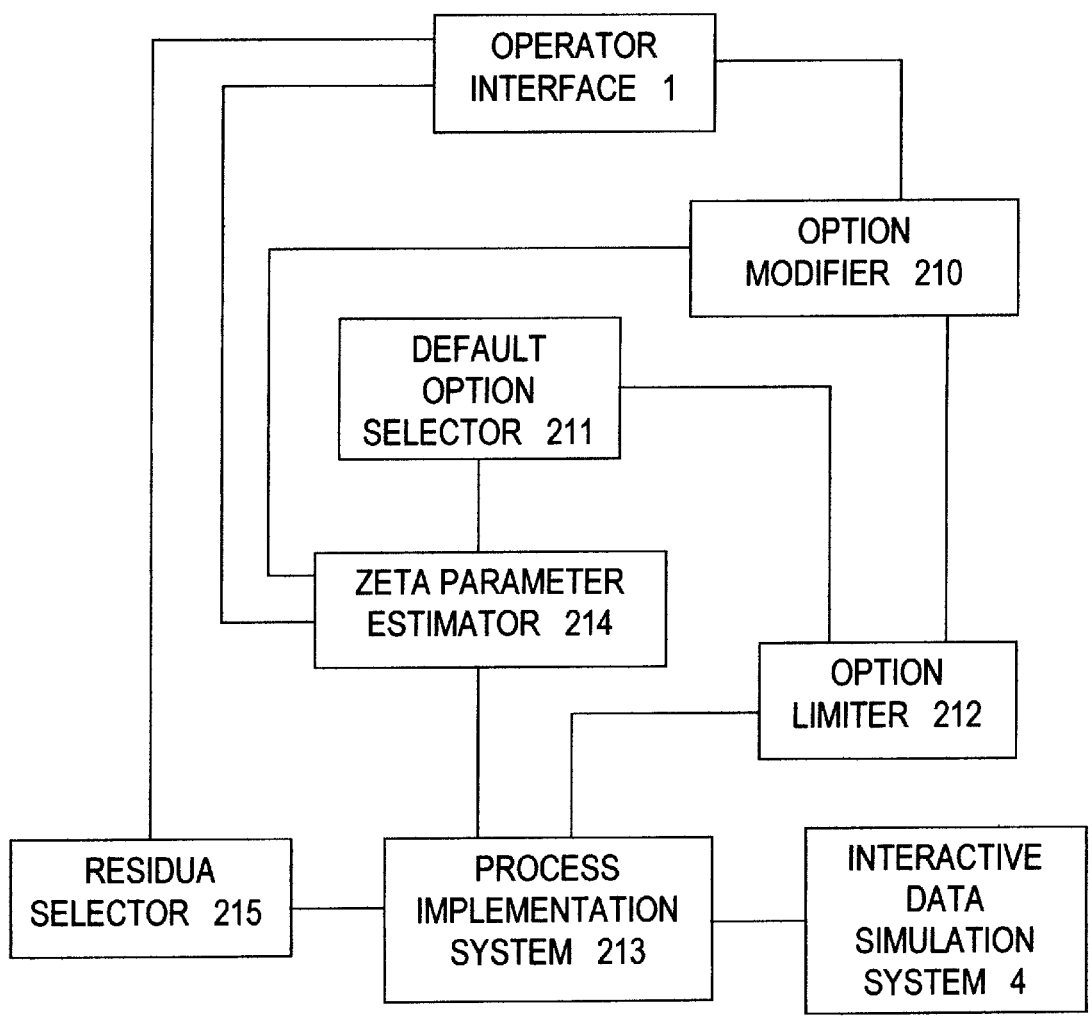
FIG. 16 depicts components of an option designator which is rendered with a process implementation system in accordance with the present invention.

Now referring to FIG. 16, with corresponding reference being made to Appendices U, V, and W, the option designator as depicted in FIG. 16 is a system for representing and implementing reduction selections. Selection of reduction techniques is provided by the option modifier 210 and the default option selector 211. The selection is verified for application by the option limiter 212. Weighting coefficients as generated or provided are implemented and approximating parameters are correspondingly evaluated by the process implementation system 213. A zeta parameter estimator 214 and a residua selector 215, may be provided in correspondence with selected options.

THE ADEPT DATA PROCESSOR

Appendix U provides an example of command code written in QBASIC for effectuating the operations of an adept data processor, comprising an option designating processing system, which provides for the generating and implementing of wide selection of alternately generated weighting coefficients, and alternate selecting of reduction methods, including traditional and herein disclosed techniques. It includes exemplary logic control for selecting, implementing, and effectuation forms of inverse deviation variation weighting and corresponding forms of adept data processing. It correspondingly provides for implementing various phases of function similation and includes options for effecting zeta parameter and characteristic form iterations. A corresponding provisional option modifier, a residua estimator, and a A zeta parameter selector, are represented for this example by the command code of appendix V.

Discriminate reduction data processing is not to be considered a form of of function similation as herein defined, and for this reason, available processing technique(, as might be implemented by the command code of Appendix U are limited for this example to exclude representing said discriminate reduction data processing. Said excluded forms are recognized by means of an option limiter 215, which for this example is implemented by the command code of appendix W.

The command code of Appendices A through W is not expected to be completely without flaw, however, the represented exemplary command code along with the descriptive information provided in this disclosure is sufficient for one skilled in the art to understand and practice the present invention.

Forms of the present invention are not intended to be limited to the preferred or exemplary embodiments described herein. Advantages and applications of the present invention will be understood from the foregoing specification or practice of the invention, and alternate embodiments will be apparent to those skilled in the art to which the invention relates. Various omissions, modifications and changes to the specification or practice of the invention as disclosed herein may be made by one skilled in the art without departing from the true scope and spirit of the invention which is indicated by the following claims.

What is claimed is:

1. A coefficient generator comprising means for implementing inverse deviation variation weighting for representing the weight of respective function related deviations;
   said implementing means including:
       means for representing information; and
       means for generating a data representation of at least one weighting coefficient;
   said implementing including:
       rendering said at least one weighting coefficient in a form compatible to be included in representing a respective weighting factor of a corresponding addend for at least one application; and
       representing at least one other weighting coefficient;
   said weighting factor being respectively represented as one of a plurality of weighting factors of the same sign;
   said at least one weighting coefficient and said at least one other weighting coefficient being included in representing said plurality of weighting factors;
   said at least one weighting coefficient and said at least one other weighting coefficient being correspondingly rendered for implementing at least one form of said inverse deviation variation weighting;
   said data representation of at least one weighting coefficient being generated in correspondence with at least one representative measure of respective proportion to at least one evaluation for at least one derivative;
   said at least one derivative being a variable dependent derivative of a function comprising at least one isolated term function of a represented function deviation;
   said variable dependent derivative being a function of at least one variable;
   said function deviation being a function of a plurality of variables;
   said data representation of at least one weighting coefficient being generated by:
       establishing correspondence between said at least one weighting coefficient and said at least one application; and
       effecting manipulative operations in which evaluated correspondence to said at least one derivative is included in representing said at least one weighting coefficient;

said at least one evaluation for said at least one derivative being determined in correspondence with represented measure for at least one of said plurality of variables;

said at least one weighting coefficient substantially corresponding in proportion to the absolute value of said at least one evaluation of said at least one derivative being raised to a negative power other than negative two;

said manipulative operations excluding subjecting representative measure for a derivative to absolute value rectification for generating a representation of at least one transformation weight factor in rendering implied squared residual weighting as exclusively comprising coordinate normalizing proportions, each included one of said coordinate normalizing proportions correspondingly representing weighting as implemented by a form of discriminate reduction data processing, said at least one transformation weight factor comprising at least one transformation weight factor coordinate normalizing proportion, said at least one transformation weight factor coordinate normalizing proportion being generated by converting represented numerical correspondence to represent at least one positive value in a manner peculiar to the prescribed operations of a final stage discriminate rectifier, said final stage discriminate rectifier being implemented for providing said at least one transformation weight factor coordinate normalizing proportion by subjecting representative measure for a derivative to operations including absolute value rectification whereby numerical correspondence to said derivative is effectively converted to represent at least one positive value, said positive value corresponding within processing accuracy to the absolute value of the inverse of said derivative being raised to a power other than two.

2. A coefficient generator as in claim 1, further comprising means for representing said weighting factor by a composite weighting coefficient;

said weighting factor comprising said composite weighting coefficient;

said composite weighting coefficient comprising a representation for said at least one weighting coefficient multiplied by a corresponding representation for the inverse of an effective variance;

said plurality of weighting factors being represented by a plurality of composite weighting coefficients in correspondence with measurements for at least one of said plurality of variables;

at least some of said measurements including corresponding measurement error.

3. A coefficient generator as in claim 1, wherein said implementing includes representing said weighting factor by an alternately represented adept weighting coefficient.

4. A coefficient generator as in claim 3, wherein said at least one weighting coefficient is a coordinate related coefficient which is a function of at least one successive approximation for at least one approximating parameter.

5. A coefficient generator as in claim 1, wherein said implementing means includes means for accessing and processing information, whereby representations of at least two weighting coefficients are generated;

said at least two weighting coefficients comprising said at least one weighting coefficient and said at least one other weighting coefficient;

said representations of at least two weighting coefficients being generated in correspondence with at least two distinct evaluations for representing said at least one derivative;

said at least one derivative being a variable dependent partial derivative of said function deviation;

said at least two distinct evaluations corresponding to at least two respectively represented measures for said at least one variable;

said representations of at least two weighting coefficients being generated by:

accessing at least some information which establishes respective representative measure for each of said at least two distinct evaluations; and said effecting manipulative operations including representing said at least two weighting coefficients in correspondence with said at least two distinct evaluations.

6. A coefficient generator as in claim 5, which is an even power rectifying coefficient generator.

7. A coefficient generator as in claim 5, which is a sign discriminate coefficient generator.

8. A coefficient generator as in claim 1, wherein said at least one weighting coefficient is a negative weighting coefficient.

9. A coefficient generator as in claim 8, wherein said implementing means includes a negafying exponential operator, and said manipulative operations include negafying operations.

10. A coefficient generator as in claim 1, wherein said data representation of at least one weighting coefficient is generated in correspondence with at least two evaluations of respective proportion to at least two derivatives;

said at least one derivative being included as one of said at least two derivatives;

said at least two derivatives being derivatives of different isolated term functions of said function deviation;

each of said at least two derivatives being taken with respect to the same variable;

said establishing including establishing respective representative measure in correspondence with each of said at least two derivatives; and said manipulative operations including operations in which represented correspondence to said at least two evaluations is included in representing said at least one weighting coefficient as substantially corresponding in proportion to the absolute value of the product of said at least two evaluations being raised to a negative power other than negative two.

11. A coefficient generator as in claim 1, further comprising a control system configured for including said weighting factor to provide weighting of at least one residual term function as represented in a sum of weighted addends;

said at least one weighting coefficient being implemented in providing at least one form of residual weighting;

said weighting factor correspondingly representing said at least one form of residual weighting; and said at least one application including said inverse deviation variation weighting in representing said at least one form of residual weighting.

12. A coefficient generator as in claim 1, wherein said implementing means includes means for accessing and processing information whereby said at least one weighting coefficient is rendered as a residual weighting coefficient by being included in representing at least one residuum;

said implementing including generating a representation for at least one sum comprising a plurality of evaluated addends;

each addend included in said plurality of addends being represented to include relative weighting of at least one corresponding weighting factor;

said effectuating including rendering a representation for at least one equation comprising said at least one sum;

each addend of said at least one sum being evaluated in correspondence with a respective measure for said at least one variable;

each said respective measure of said at least one variable representing a value for a corresponding measurement of said at least one variable;

said value being a respective value representing numerical correspondence to said measurement;

each said respective value being correspondingly represented as including at least one error associated with said measurement;

each said respective measure of said at least one variable being represented as including said at least one error;

each said plurality of evaluated addends respectively corresponding to a plurality of measures for at least one independent variable;

said representation for at least one sum of evaluated addends being generated by:
 accessing some of said information which provides represented relative value for at least one fitting parameter; and
 effectuating at least one form of equation residuum estimation;

said at least one application including said inverse deviation variation weighting in representing at least one form of residual weighting.

13. A coefficient generator as in claim 1, wherein said implementing means includes means for accessing and processing information whereby said at least one weighting coefficient is rendered for providing at least one form of implied squared residual weighting;

said at least one application including said inverse deviation variation weighting in representing said at least one form of implied squared residual weighting;

said implementing including:
 accessing and processing at least some said information whereby said at least one representative measure is determined;
 rendering at least one equation to include said plurality of weighting factors as represented to provide said at least one form of implied squared residual weighting; and
 rendering means for representing a solution in compliance with said at least one equation as provided by a form of automated evaluating;

said solution being represented in correspondence with a plurality of measurements including measurements for said at least one variable;

said solution comprising a plurality of approximating parameters;

said plurality of approximating parameters including at least two approximating parameters which do not correspondingly represent constant terms of said function deviation;

said at least one weighting coefficient being a function of at least one of said at least two approximating parameters;

said manipulative operations excluding searching for and equating at least one approximating parameter to a value which corresponds to a minimum encountered value for a represented sum of weighted squared deviations, said minimum encountered value being considered with respect to alternate values for said plurality of approximating parameters, said at least one approximating parameter being represented and included in representing said at least one weighting coefficient.

14. A data processing system comprising:

a control system;

means for accessing and processing information; and means for implementing at least one form of inverse deviation variation weighting for representing the weight of respective function related deviations;

said data processing system being configured for providing said implementing;

said implementing including:
 representing at least one weighting coefficient;
 rendering said at least one weighting coefficient in a form compatible to be included in representing a respective weighting factor of a corresponding addend;
 representing at least one equation; and
 representing said at least one weighting factor to implement said at least one form of inverse deviation variation weighting in representing said at least one equation;

said at least one equation being rendered in a form compatible to be included in representing a set of independent equations as rendered for solution by said data processing system;

said at least one weighting coefficient being included in representing said at least one equation;

representation for said at least one weighting coefficient being generated in correspondence with representative measure of respective proportion to at least one evaluation for at least one derivative;

said at least one derivative being a variable dependent derivative of a function comprising at least one isolated term function of a represented function deviation;

said variable dependent derivative being a function of at least one variable;

said function deviation being a function of a plurality of variables;

said representative measure of said at least one derivative being determined in correspondence with represented measure of at least one of said plurality of variables;

said at least one weighting coefficient being represented as substantially corresponding in proportion to the absolute value of said representative measure of said at least one derivative being raised to a negative power other than negative two;

said representation for at least one weighting coefficient being generated by:
 establishing correspondence between said representative measure and at least some of said information; and
 effecting manipulative operations in which evaluated correspondence to said at least one derivative is included in representing said at least one weighting coefficient;

said control system being configured for including said at least one equation in said set of independent equations as rendered for providing said solution;

said data processing system constituting means for including correspondence to said at least one equation in representing said set of independent equations as formulated for said solution;

said control system being configured for evaluating a plurality of approximating parameters in compliance with said set of independent equations;

said data processing system constituting means for evaluating said plurality of approximating parameters in compliance with said set of independent equations, said plurality of approximating parameters including a least two approximating parameters which do not constitute corresponding constant terms of said function deviation;

said plurality of approximating parameters being evaluated by means which do not establish a minimum value for a represented parametric expression as considered with respect to alternate values for said plurality of approximating parameters;

said set of independent equations not constituting a viable form for evaluating said alternate values which would minimize said represented parametric expression.

15. A data processing system as in claim 14, wherein said processing information includes generating a data representation of at least one fitting parameter in correspondence with a represented variation;

said data representation being generated by accessing some of said information which characterizes said represented variation;

said represented variation being characterized in correspondence with at least two variables;

said implementing including representing correspondence between some of said information and at least one sum of weighted addends;

said at least one equation comprising said at least one sum;

each addend of said at least one sum being evaluated in correspondence with a respective measure of at least one of said plurality of variables;

each said respective measure representing a value for a corresponding measurement of said at least one of said plurality of variables;

said value being a respective value representing numerical correspondence to said measurement;

said respective value for at least one of said plurality of variables being correspondingly represented as including error;

said plurality of evaluated addends respectively corresponding to a plurality of measures for at least one independent variable; and said effectuating including evaluating said at least one fitting parameter in correspondence with a plurality of respective measures for characterizing said represented variation.

16. A data processing system as in claim 15, further comprising a memory and means for storing information whereby said data representation is generated and stored in said memory;

said means for accessing including means for accessing said data representation.

17. A data processing system as in claim 14, wherein at least one equation of said set of independent equations relates parametric expression for a sum of weighted residuals to a relative estimate for a residuum;

said accessing including accessing information which establishes an approximated value for said relative estimate; and said data processing system further comprising a memory and means for representing said approximated value in formulating said at least one equation.

18. A data processing system as in claim 14, further comprising means for training channeled convergence in correspondence with reduction restraints.

19. A data processing system as in claim 18, further comprising means for effecting zeta parameter iterations.

20. A data processing system as in claim 14, wherein said implementing includes representing said weighting factor by an alternately represented adept weighting coefficient.

21. A data processing system as in claim 14, wherein said means for accessing and processing information comprises:
an adept alternate coefficient generator; and
means for generating representations of at least two coordinate related coefficients;

said weighting factor respectively comprising one of said at least two coordinate related coefficients;

said representations being generated in correspondence with at least two distinct evaluations for representing said at least one derivative;

said at least two distinct evaluations corresponding to at least two respectively represented measures for said at least one variable;

said at least one derivative being a variable dependent partial derivative of said function deviation;

said representations being generated by:
accessing at least some information which establishes respective representative measure for each of said at least two distinct evaluations; and
said effecting manipulative operations including operations in which represented correspondence to said at least two distinct evaluations is respectively included in representing said at least two coordinate related coefficients as having the same sign;

said manipulative operations excluding absolute value rectification being used for rendering a weighting factor as a transformation weight factor which is included in implementing at least one form of discriminate reduction data processing.

22. A data processing system as in claim 14, wherein said representation of at least one weighting coefficient is generated in correspondence with at least two evaluations of respective proportion to at least two derivatives;

said at least one derivative being included as one of said at least two derivatives;

said at least two derivatives being derivatives of different isolated term functions of said function deviation;

each of said at least two derivatives being taken with respect to the same variable;

said establishing including establishing respective representative measure in correspondence with each of said at least two derivatives; and said manipulative operations including operations in which represented correspondence to said at least two evaluations is included in representing said at least one weighting coefficient as substantially corresponding in proportion to the absolute value of the product of said at least two evaluations being raised to a negative power other than negative two.

23. A data processing system as in 14, claim wherein said control system is configured for representing said weighting factor as a coefficient for providing weighting of at least one residual term function as included in a sum of weighted addends; said at least one weighting coefficient correspondingly rendering at least one form of residual weighting.

24. A data processing system as in claim 14, wherein said weighting factor is implemented for providing at least one form of implied weighting;

said at least one weighting coefficient being represented as a function of at least one successive approximation for at least one of said at least two approximating parameters;

said weighting factor correspondingly rendering said at least one form for said implied weighting;

said manipulative operations excluding absolute value rectification being used for rendering a weighting factor as a transformation weight factor which is included in implementing at least one form of discriminate reduction data processing.

25. A data processing system as in claim 14, further comprising means for effecting characteristic form iterations.

26. A data processing system as in claim 14, wherein said implementing includes representing at least one estimated sum of weighted addends;

said effectuating including:
    accessing some of said information which provides represented relative value for at least one fitting parameter; and
    effectuating at least one form of equation residuum estimation;
said control system being configured for providing said effectuating.

27. A data processing system as in claim 14, further comprising analog circuitry for providing at least some said manipulative operations;

said manipulative operations including generating an analog representation of at least one term function, wherein at least some said information is a real time analog signal being subjected to analog preprocessing whereby a corresponding analog representation of at least one integrated sum is generated;

said integrated sum representing a plurality of infinitesimal addends;

said at least one equation comprising said integrated sum;

said integrated sum being determined in correspondence with at least one respective measure for at least one of said plurality of variables;

each said respective measure representing a value for a corresponding measurement of said at least one of said plurality of variables;

said value being a respective value representing numerical correspondence to said measurement, and being correspondingly represented as including error;

each of said plurality of infinitesimal addends respectively corresponding to a plurality of measures for at least one independent variable;

said analog representation of said at least one term function being generated by:
    generating at least one analog signal for providing weighting;
    formulating at least one analog product signal which is an analog product of said at least one analog signal for providing weighting and said real time analog signal; and
    formulating said analog representation of said at least one term function by integrating said analog product signal, over at least one interval of time.

28. A data processing system as in claim 14, wherein said weighting factor is a composite weighting coefficient included in providing at least one form of implied squared residual weighting;

said composite weighting coefficient comprising a representation of said at least one weighting coefficient multiplied by a corresponding representation for the inverse of an effective variance;

at least some measurements for at least one of said plurality of variables being considered as including corresponding measurement error.

29. A data processing system as in claim 14, wherein said weighting factor is a composite weighting coefficient included in providing at least one form of residual weighting;

said composite weighting coefficient comprising a representation of said at least one weighting coefficient multiplied by a corresponding representation for the inverse of the square root of an effective variance;

at least some measurements for at least one of said plurality of variables being considered as including corresponding measurement error.

30. A produced data representation of processed information generated by a data processing system, said data processing system comprising:

means for accessing, processing, and representing information;

means for implementing inverse deviation variation weighting for representing the weight of respective function related deviations; and means for rendering said data representation in substance;

said produced data representation comprising said data representation as rendered in substance;

said implementing including:
    representing at least one weighting coefficient;
    rendering said at least one weighting coefficient in a form compatible to be included in representing a respective weighting factor of a corresponding addend; and
    representing correspondence between at least some information, at least one equation, and said data representation;

representing said at least one equation; and including the representation of said at least one weighting coefficient to implement said inverse deviation variation weighting in representing said at least one equation;

said at least one equation being rendered in a form compatible to be included in representing a set comprising at least one independent equation as rendered for solution by said data processing system;

said at least one weighting coefficient being included in representing said at least one equation;

representation for said at least one weighting coefficient being generated in correspondence with a representative measure of respective proportion to at least one evaluation for at least one derivative;

said at least one derivative being a variable dependent derivative of a function comprising at least one isolated term function of a represented function deviation;

said function deviation being a function of a plurality of variables;

said representative measure of said at least one derivative being determined in correspondence with a represented measure of at least one of said plurality of variables;

said represented measure of at least one of said plurality of variables being represented as including error;

said at least one weighting coefficient being represented as substantially corresponding in proportion to the absolute value of said representative measure of said at least one derivative being raised to a negative power other than negative two;

said representation of at least one weighting coefficient being generated by:
  establishing correspondence between said representative measure and said at least some information; and
  effecting manipulative operations in which evaluated correspondence to said at least one derivative is included in representing said at least one weighting coefficient;

said means for rendering said data representation in substance including:
  means for generating said data representation; and
  means for transferring said data representation for utilization;

said data representation being generated by:
  accessing some information which characterizes a represented variation as a function of at least one measure;
  establishing correspondence between said represented variation and said function deviation;
  representing said weight of respective function related deviations as implemented in correspondence with said function deviation and said represented variation;
  effectuating said implementing; and
  effecting said rendering;

said effectuating including:
  activating means for processing and representing information whereby said data representation is generated;
  representing correspondence between said data representation, said at least one equation, and at least some of said information which characterizes said represented variation;
  rendering a representative form for said at least one independent equation; and
  generating said data representation in correspondence with said at least one equation and at least some said information which characterizes said represented variation;

said manipulative operations excluding subjecting representative measure for a derivative to absolute value rectification for generating a representation of at least one transformation weight factor in rendering implied squared residual weighting as exclusively comprising coordinate normalizing proportions, each included one of said coordinate normalizing proportions correspondingly representing weighting as implemented by a form of discriminate reduction data processing, said at least one transformation weight factor comprising at least one transformation weight factor coordinate normalizing proportion, said at least one transformation weight factor coordinate normalizing proportion being generated by converting represented numerical correspondence to represent at least one positive value in a manner peculiar to the prescribed operations of a final stage discriminate rectifier, said final stage discriminate rectifier being implemented for providing said at least one transformation weight factor coordinate normalizing proportion by subjecting representative measure for a derivative to operations including absolute value rectification whereby numerical correspondence to said derivative is effectively converted to represent at least one positive value, said positive value corresponding within processing accuracy to the absolute value of the inverse of said derivative being raised to a power other than two.

31. A produced data representation as in claim 30, wherein said implementing includes rendering a representation of said represented variation in substance;
  said data representation comprising a representation of said represented variation as rendered in substance;
  said data representation being generated by:
    accessing at least some of said information which characterizes said represented variation; and
    generating said solution;
  said solution comprising a plurality of approximating parameters being evaluated in correspondence with represented measure of at least two variables;
  said plurality of approximating parameters including a least two approximating parameters which do not correspondingly represent constant terms of said function deviation;
  said manipulative operations including evaluating said weighting factor as a function of at least one of said plurality of approximating parameters;
  said plurality of approximating parameters representing a convergent solution to a set of independent equations;
  said set of independent equations comprising said at least one independent equation;
  said convergent solution being generated by means other than searching for and equating approximating parameters to values which correspond to a minimum encountered value for a represented sum of weighted squared deviations.

32. A produced data representation as in claim 31, wherein said means for transferring includes a memory for storing data for access by an application program being executed on a processing system, said processed information being stored in said memory, and said application program correspondingly rendering said data representation in substance.

33. A produced data representation as in claim 30, wherein said data representation comprises means for designating the generating of functional representation of a group of equations;
  said group of equations comprising at least one set of independent equations for evaluating at least one fitting parameter; and
  said group of equations including said at least one equation.

34. A method of implementing the inverse of represented deviation variation as rendered to establish the respective weight of function related deviations for characterizing an approximating relationship, said method comprising:
  activating means for processing and representing information whereby at least one set of independent equations is represented in correspondence with at least some of said information; and
  effectuating at least some data processing;
  said effectuating including:
    rendering a representation for at least one equation to be included in said at least one set of independent equations;
    evaluating approximative correspondence for representing said at least one set of independent equations as related to at least some of said information;
    rendering a representation of said at least one set of independent equations for providing a solution;
    establishing and implementing said respective weight of function related deviations in said rendering; and
    correspondingly characterizing said approximating relationship by said evaluating and said rendering;

said means for processing and representing information comprising:
a control system;
means for accessing information; and
said control system being configured for providing said representing, said implementing, and said effectuating;
said representing and said implementing including:
representing at least one weighting coefficient;
representing said at least one equation;
rendering said at least one weighting coefficient in a form compatible to be included in representing a respective weighting factor of a corresponding addend; and
including the representation of said at least one weighting coefficient to implement said respective weight of function related deviations in representing said at least one equation;
said at least one equation being rendered in a form compatible to be included in representing said at least one set of independent equations as rendered for providing said solution;
representation for said at least one weighting coefficient being generated in correspondence with a representative measure of respective proportion to at least one evaluation for at least one derivative;
said at least one derivative being a variable dependent derivative of a function comprising at least one isolated term function of a represented function deviation;
said variable dependent derivative being a function of at least one variable;
said function deviation being a function of a plurality of variables;
said representative measure of said at least one derivative being determined in correspondence with a represented measure of at least one of said plurality of variables;
said at least one weighting coefficient being represented as substantially corresponding in proportion to the absolute value of said representative measure of said at least one derivative being raised to a negative power other than negative two;
said representation for at least one weighting coefficient being generated by:
establishing correspondence between said representative measure and at least some of said information; and
effecting manipulative operations in which evaluated correspondence to said at least one derivative is included in representing said at least one weighting coefficient;
said at least one set of independent equations comprising a plurality of equations;
said plurality of equations rendering means for evaluating a plurality of approximating parameters in correspondence with said approximating relationship;
said control system being rendered for evaluating said plurality of approximating parameters in compliance with said at least one set of independent equations;
said plurality of approximating parameters including at least two approximating parameters which do not correspondingly represent constant terms of said function deviation;
said at least one weighting coefficient being a function of at least one of said at least two approximating parameters;
said manipulative operations excluding rendering said evaluated correspondence by searching for and equating at least one approximating parameter to a value which corresponds to a minimum encountered value for a represented sum of weighted squared deviations, said minimum encountered value being considered with respect to alternate values for said plurality of approximating parameters, said at least one approximating parameter being represented and included in representing said at least one weighting coefficient.

35. A method as in claim 34, wherein said manipulative operations exclude subjecting representative measure for a derivative to absolute value rectification for generating a representation of at least one transformation weight factor in rendering implied squared residual weighting as exclusively comprising coordinate normalizing proportions, each included one of said coordinate normalizing proportions correspondingly representing weighting as implemented by a form of discriminate reduction data processing, said at least one transformation weight factor comprising at least one transformation weight factor coordinate normalizing proportion, said at least one transformation weight factor coordinate normalizing proportion being generated by converting represented numerical correspondence to represent at least one positive value in a manner peculiar to the prescribed operations of a final stage discriminate rectifier, said final stage discriminate rectifier being implemented for providing said at least one transformation weight factor coordinate normalizing proportion by subjecting representative measure for a derivative to operations including absolute value rectification whereby numerical correspondence to said derivative is effectively converted to represent at least one positive value, said positive value corresponding within processing accuracy to the absolute value of the inverse of said derivative being raised to a power other than two.

36. A method as in claim 35, wherein said effectuating includes accessing and processing information, whereby representations of at least two weighting coefficients are generated;
said at least one weighting coefficient being one of said at least two weighting coefficients;
said representations of at least two weighting coefficients being generated in correspondence with at least two distinct evaluations for representing said at least one derivative;
said at least one derivative being a variable dependent partial derivative of said function deviation;
said at least two distinct evaluations corresponding to at least two respectively represented measures for said at least one variable;
said representations of at least two weighting coefficients being generated by:
accessing at least some information which establishes respective representative measure for each of said at least two distinct evaluations; and
said effecting manipulative operations including representing said at least two weighting coefficients in correspondence with said at least two distinct evaluations.

37. A method as in claim 34, whereby a data representation of at least one represented variation is generated in correspondence with at least some of said information and said approximating relationship;
said data representation being generated by evaluating said plurality of approximating parameters in compliance with said set of independent equations.

* * * * *